(12) United States Patent
Kendall et al.

(10) Patent No.: US 11,396,143 B2
(45) Date of Patent: Jul. 26, 2022

(54) SYSTEM AND METHOD FOR MANUFACTURING A COMPOSITE ASSEMBLY

(71) Applicant: The Boeing Company, Chicago, IL (US)

(72) Inventors: James R. Kendall, Mt. Pleasant, SC (US); Raviendra S. Suriyaarachchi, Daniel Island, SC (US); Paul D. Shaw, Charleston, SC (US); James F. Mitman, Summerville, SC (US)

(73) Assignee: The Boeing Company, Chicago, IL (US)

( * ) Notice: Subject to any disclaimer, the term of this patent is extended or adjusted under 35 U.S.C. 154(b) by 553 days.

(21) Appl. No.: 16/449,233

(22) Filed: Jun. 21, 2019

(65) Prior Publication Data

US 2020/0398503 A1    Dec. 24, 2020

(51) Int. Cl.
| | |
|---|---|
| *B29C 70/34* | (2006.01) |
| *B29C 70/54* | (2006.01) |
| *B29K 307/04* | (2006.01) |
| *B29K 309/08* | (2006.01) |
| *B29K 663/00* | (2006.01) |
| *B29L 31/00* | (2006.01) |

(52) U.S. Cl.
CPC ............ *B29C 70/342* (2013.01); *B29C 70/54* (2013.01); *B29C 70/541* (2013.01); *B29K 2307/04* (2013.01); *B29K 2309/08* (2013.01); *B29K 2663/00* (2013.01); *B29L 2031/001* (2013.01)

(58) Field of Classification Search
None
See application file for complete search history.

(56) References Cited

U.S. PATENT DOCUMENTS

| | | |
|---|---|---|
| 7,137,182 B2 | 11/2006 | Nelson |
| 7,527,759 B2 | 5/2009 | Lee et al. |
| 7,655,168 B2 | 2/2010 | Jones et al. |

(Continued)

FOREIGN PATENT DOCUMENTS

| | | |
|---|---|---|
| EP | 3015258 | 6/2011 |
| EP | 2889127 | 7/2015 |
| EP | 2336021 | 5/2016 |

OTHER PUBLICATIONS

EPO, Extended European Search Report for Appl. No. EP 120168104 dated Aug. 31, 2020.

(Continued)

*Primary Examiner* — Barbara J Musser

(57) ABSTRACT

A system for manufacturing a composite assembly includes a first mandrel, a second mandrel, a first wrap plate, and a second wrap plate. The first wrap plate and the second wrap plate are positionable in side-by-side relation for receiving a wrap material stack. The first wrap plate and/or the second wrap plate are translatable to a wrap plate open position defining a wrap plate gap between the first and second wrap plate surface edge for receiving a bladder. The second mandrel is translatable to a mandrel open position defining a mandrel gap between the first and second mandrel surface edge. The wrap plate gap and the mandrel gap are configured to receive the wrap material stack formed around a bladder. The first and second wrap plate are configured to fold a first and second material stack base portion into overlapping relation with each other on the bladder top.

20 Claims, 50 Drawing Sheets

(56) References Cited

U.S. PATENT DOCUMENTS

| | | |
|---|---|---|
| 7,879,177 B2 | 2/2011 | McCowin et al. |
| 7,922,856 B2 | 4/2011 | Hagman et al. |
| 8,012,291 B2 | 9/2011 | Kisch et al. |
| 8,206,540 B2 | 6/2012 | Evans |
| 8,336,596 B2 | 12/2012 | Nelson et al. |
| 8,465,613 B2 | 6/2013 | Rotter et al. |
| 8,640,757 B2 | 2/2014 | McCowin et al. |
| 8,758,538 B2 | 6/2014 | Borgmann et al. |
| 8,808,490 B2 | 8/2014 | Hagman et al. |
| 9,399,338 B1 | 7/2016 | Metschan |
| 2005/0039843 A1 | 2/2005 | Johnson |
| 2006/0231981 A1 | 10/2006 | Lee |
| 2013/0153154 A1 | 6/2013 | Boge |

OTHER PUBLICATIONS

EPO, European Search Report for Appl. No. EP 19198297 dated Feb. 17, 2020.
U.S. Appl. No. 16/224,969 entitled Bladder Mandrel Package, filed Dec. 19, 2018.

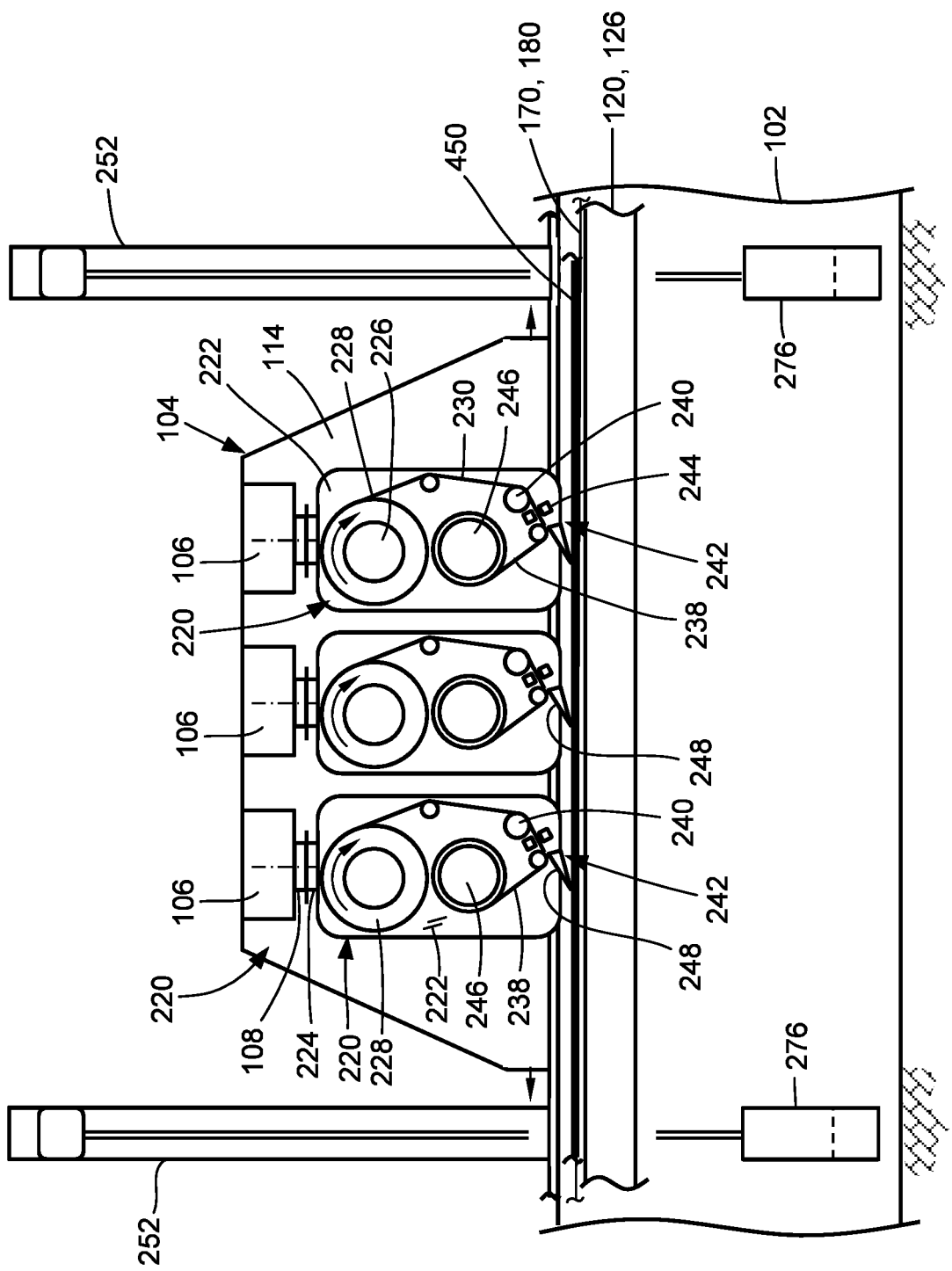

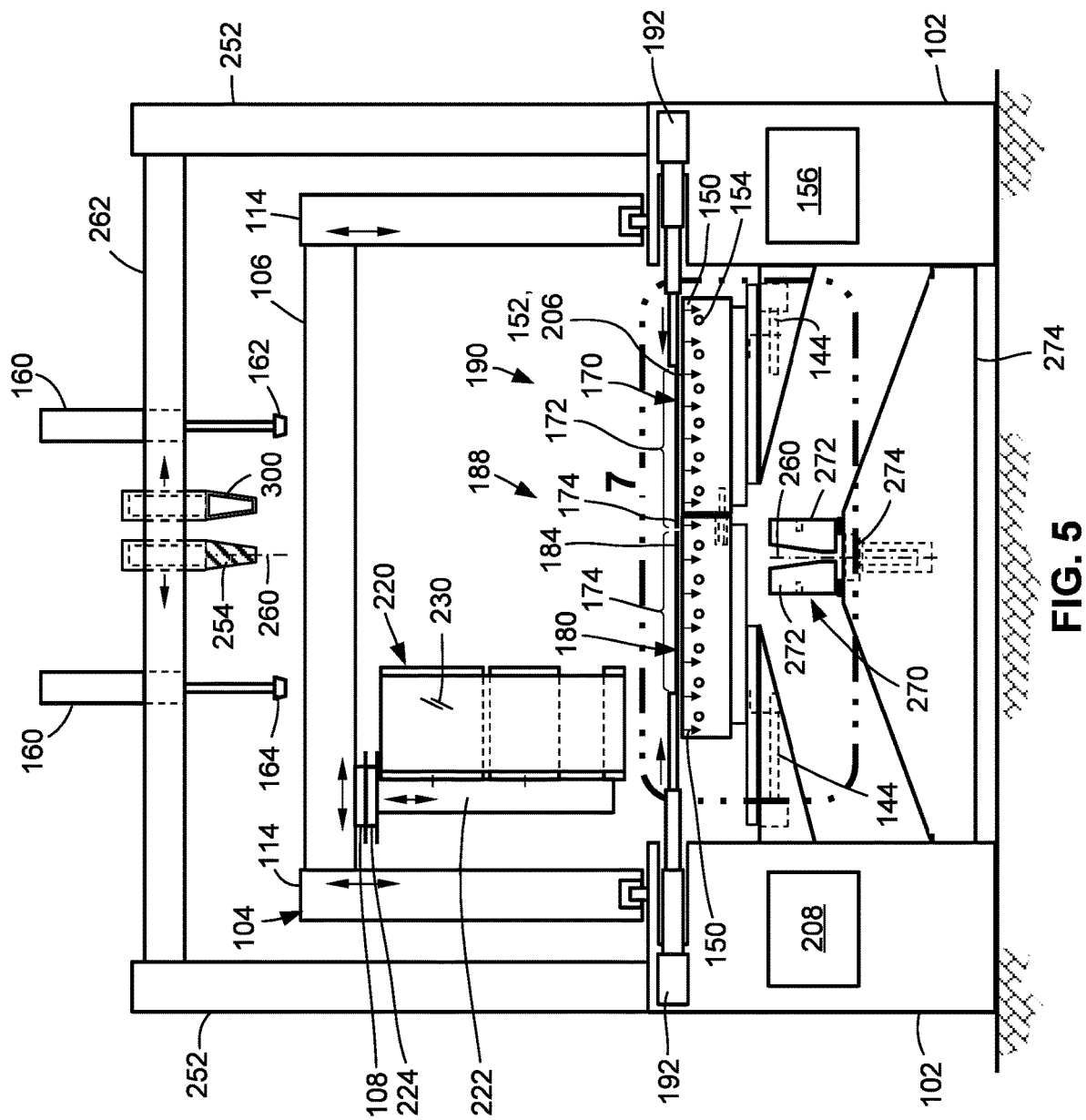

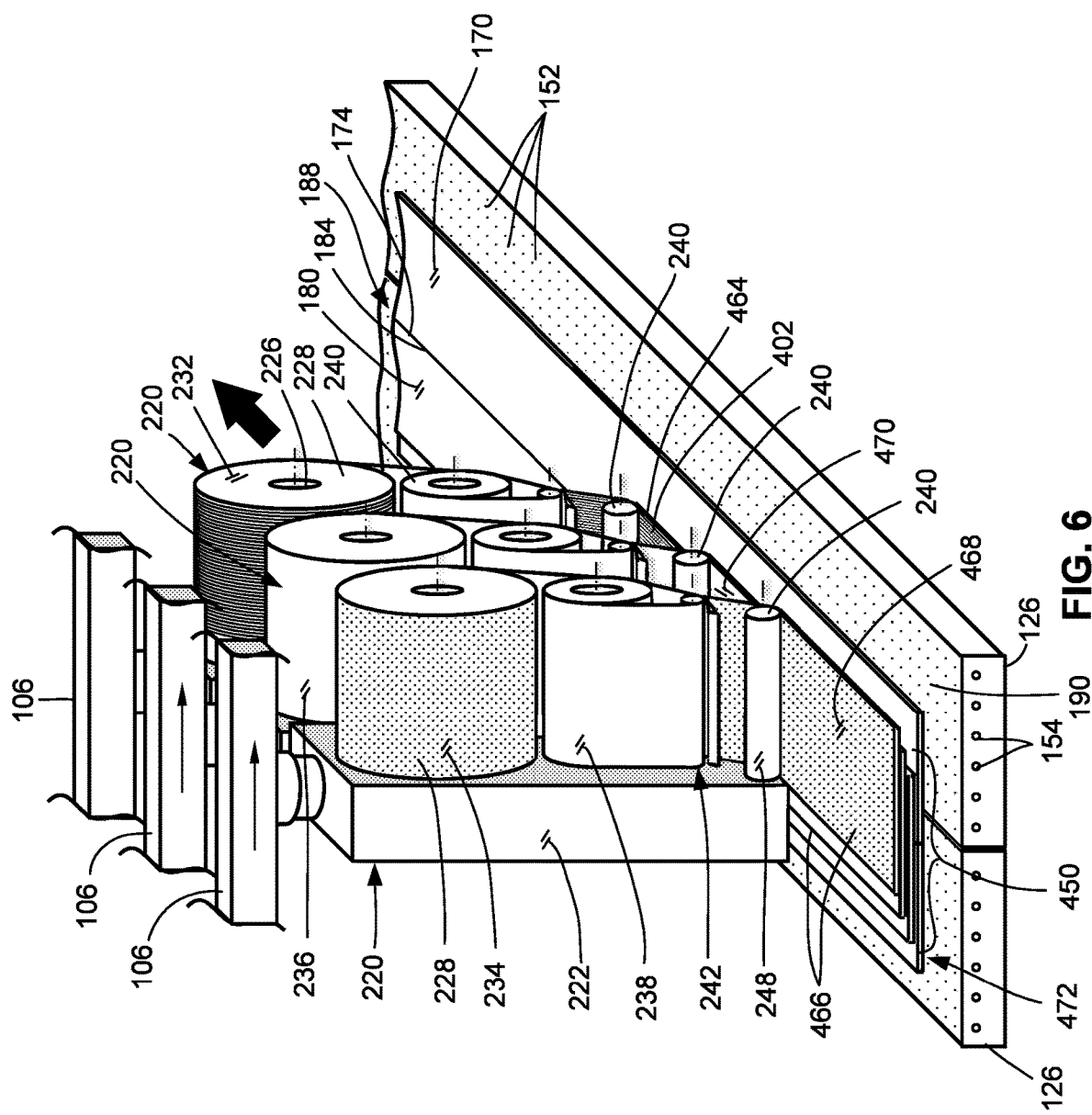

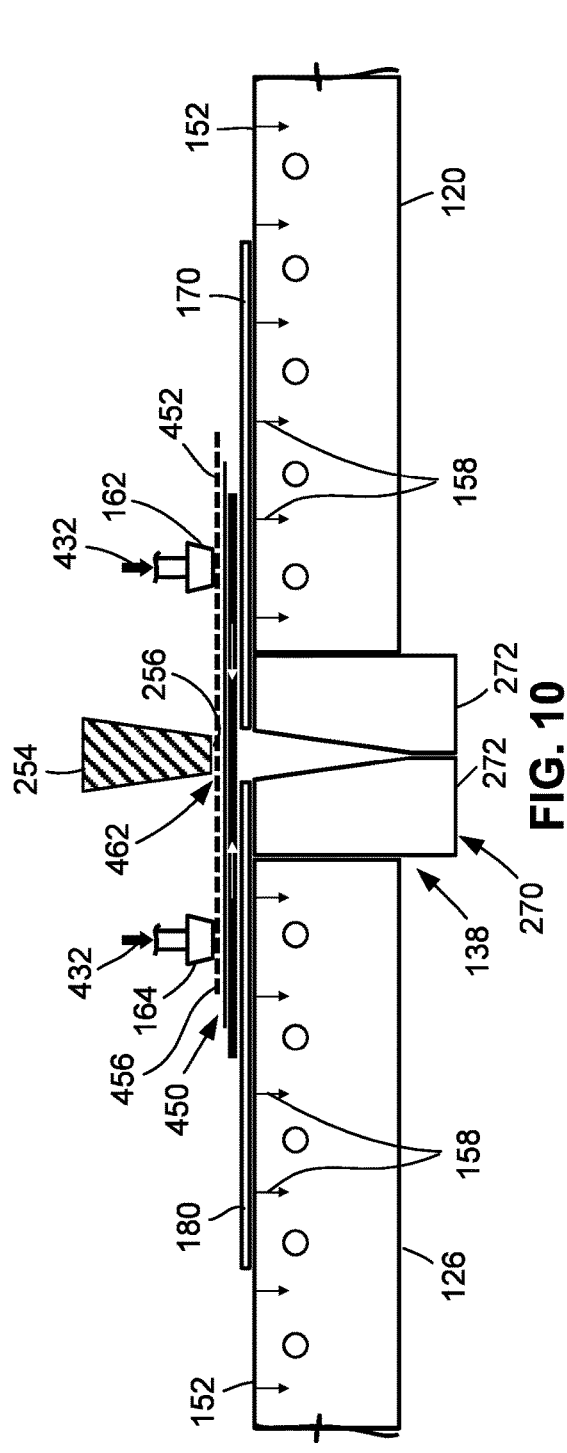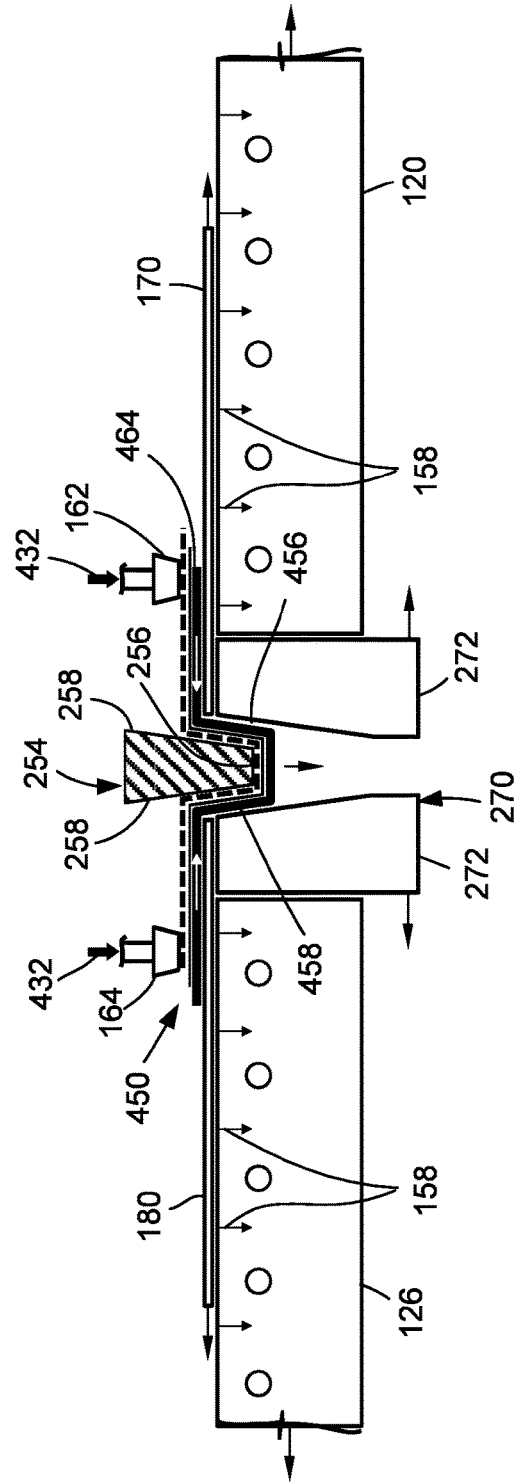

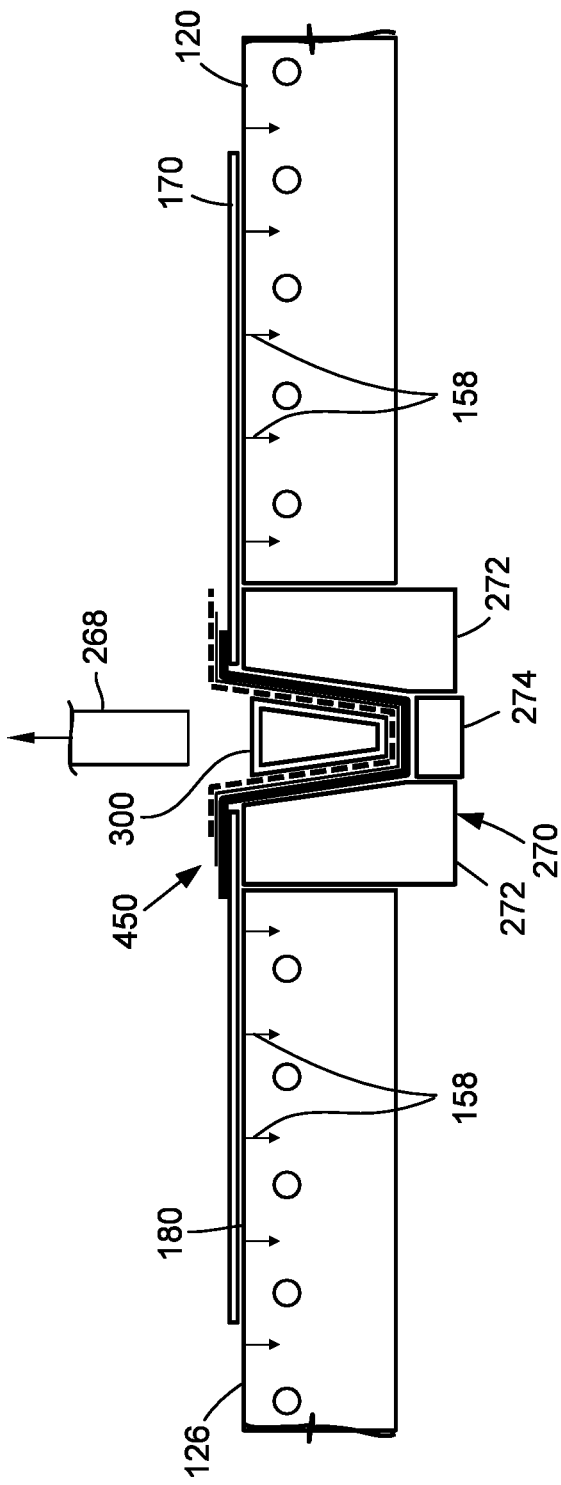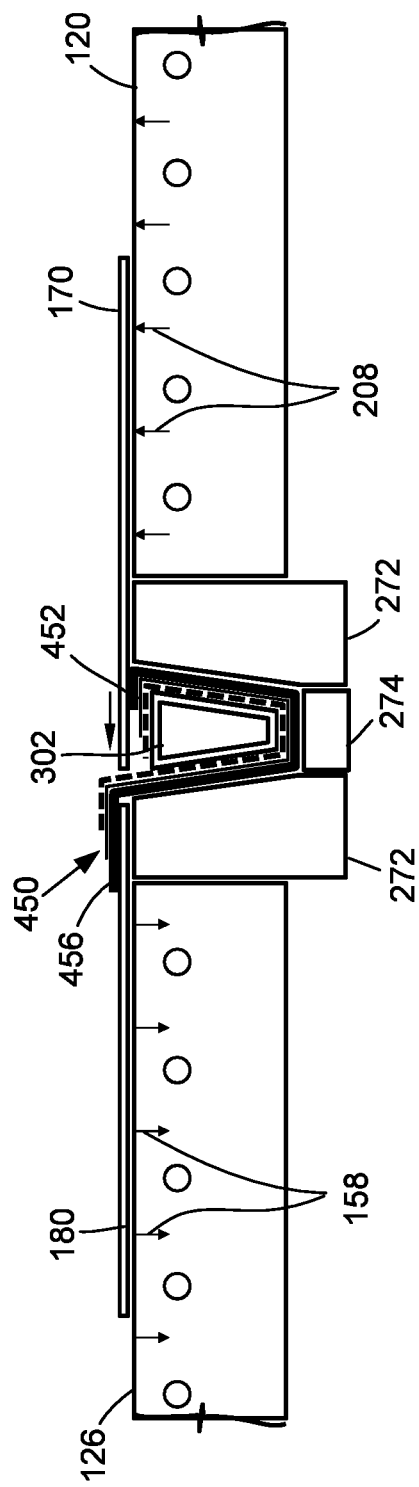

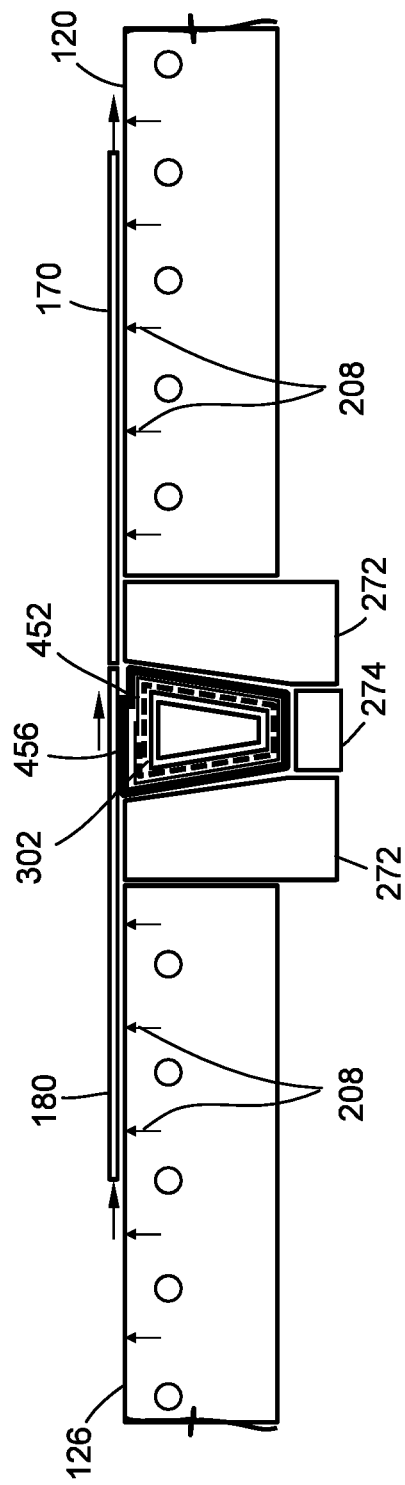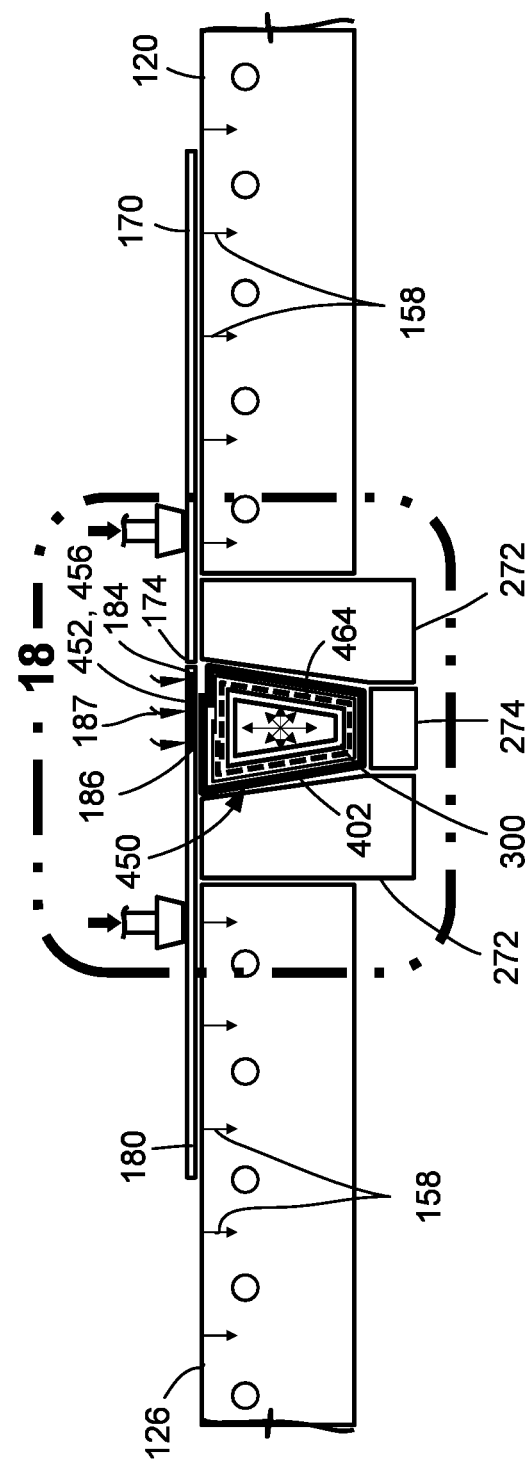

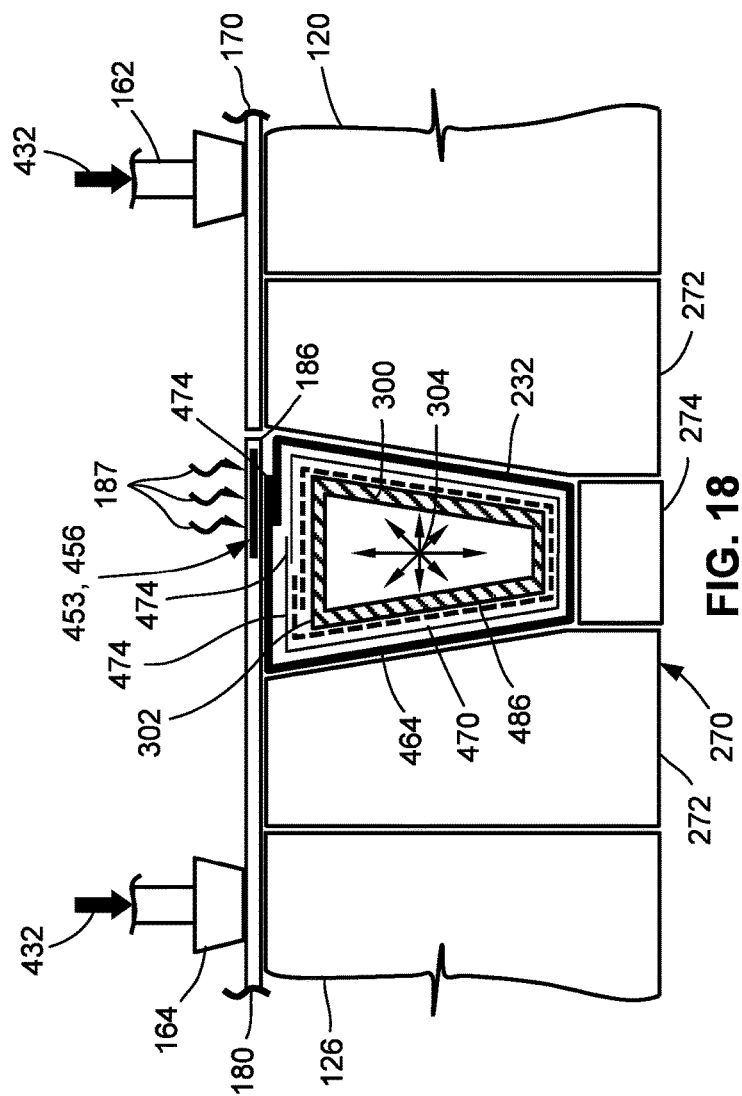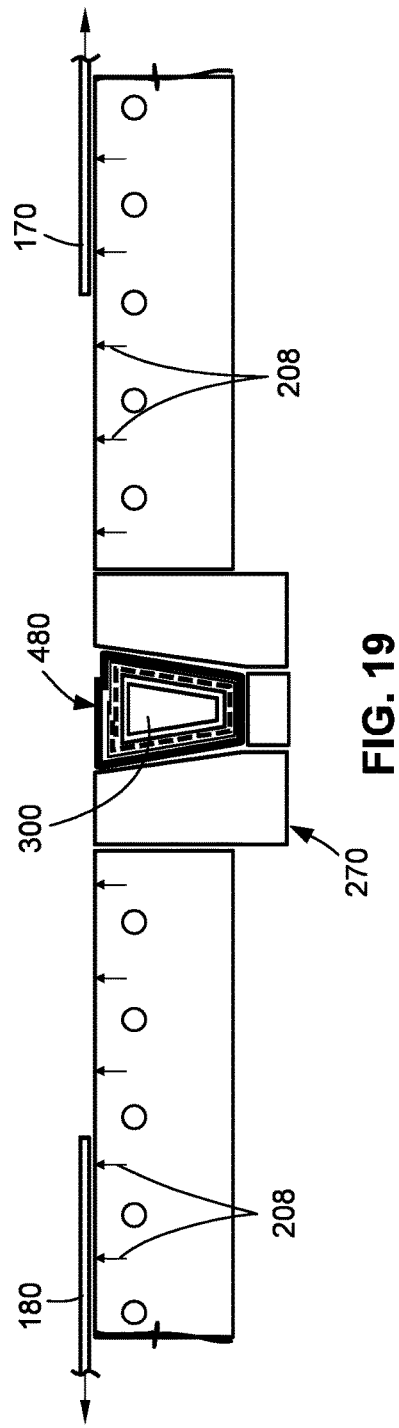

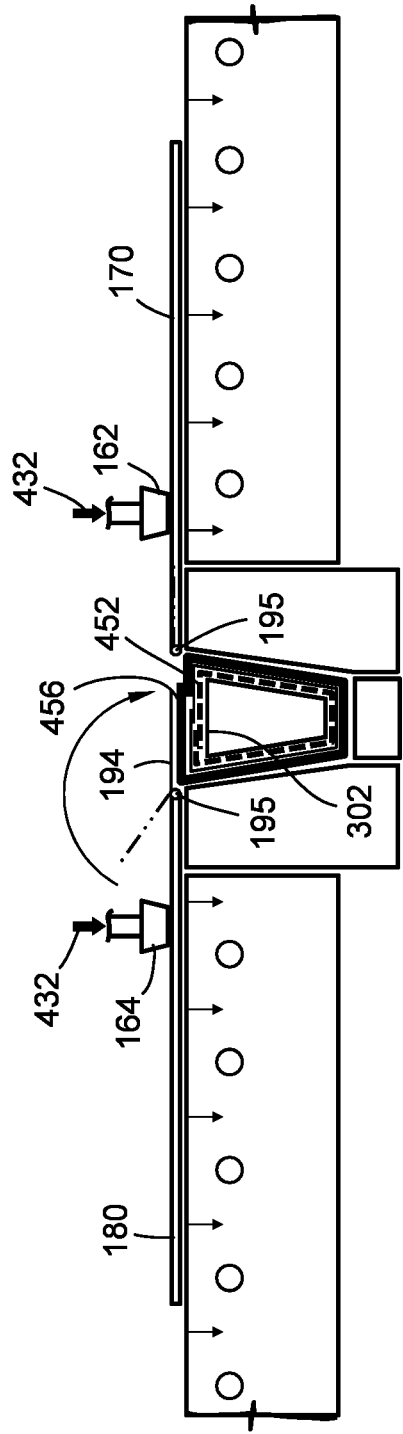
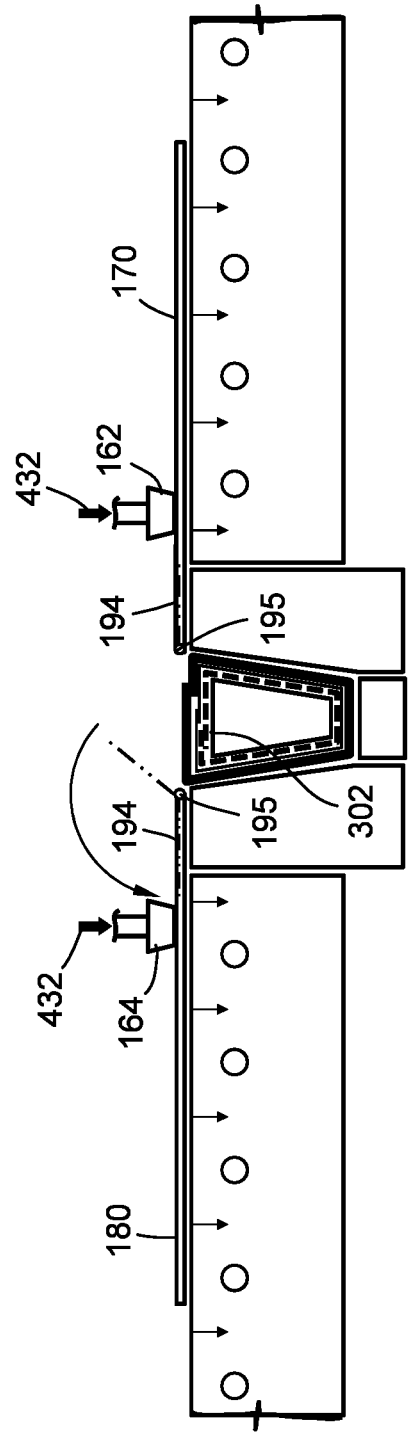

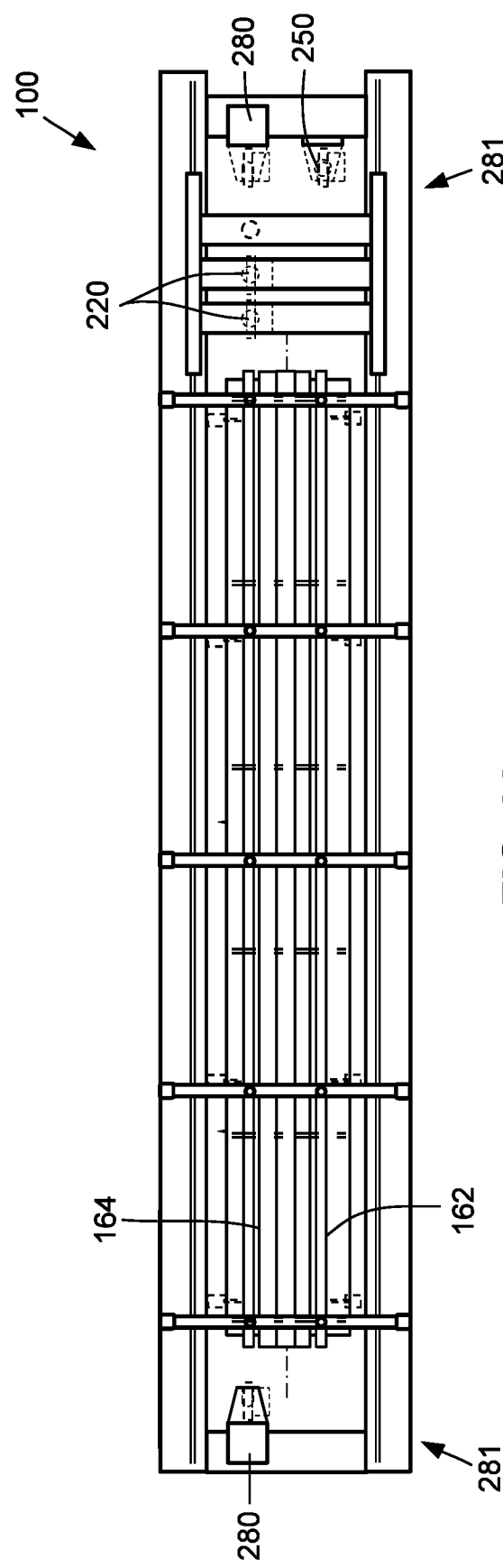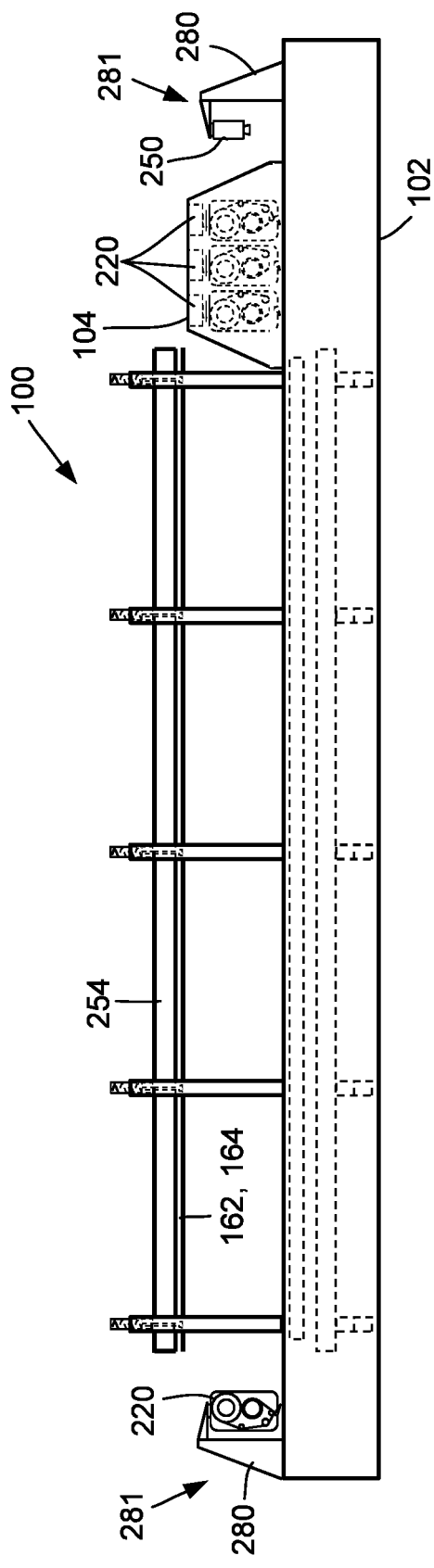
FIG. 36
FIG. 37

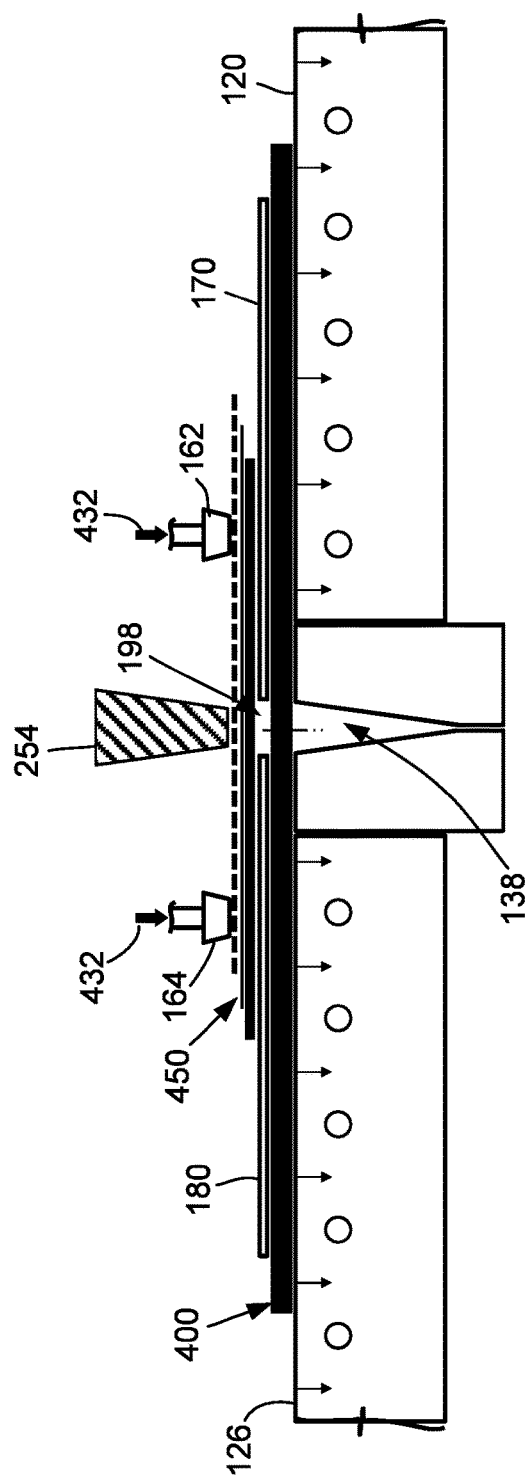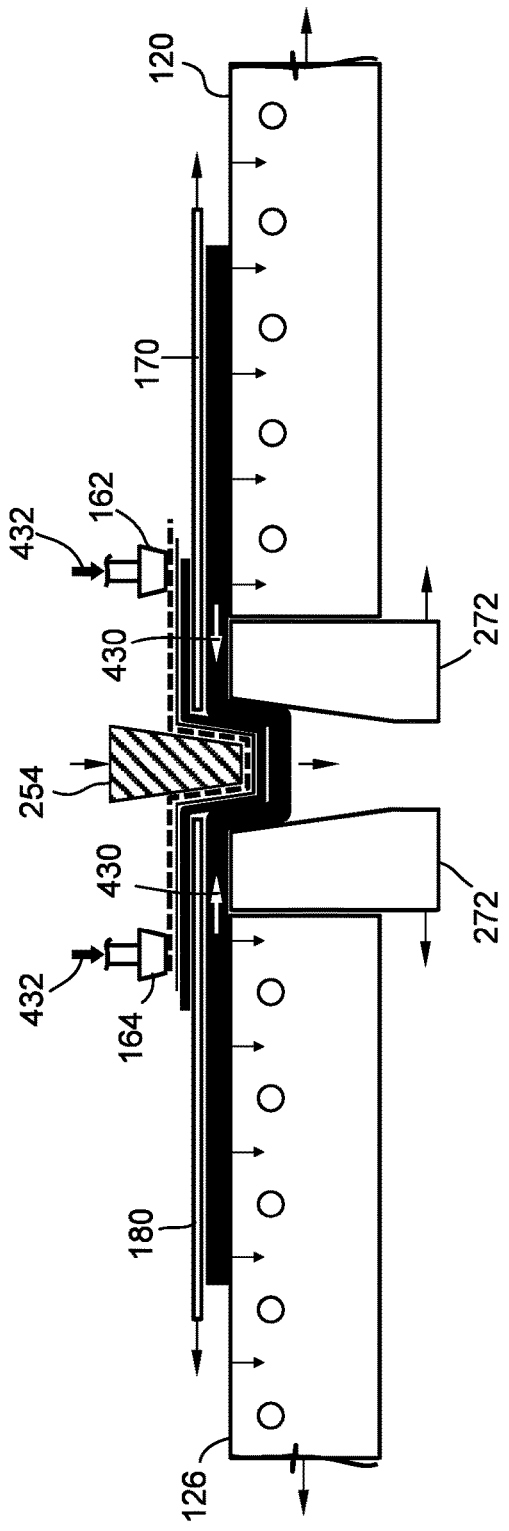

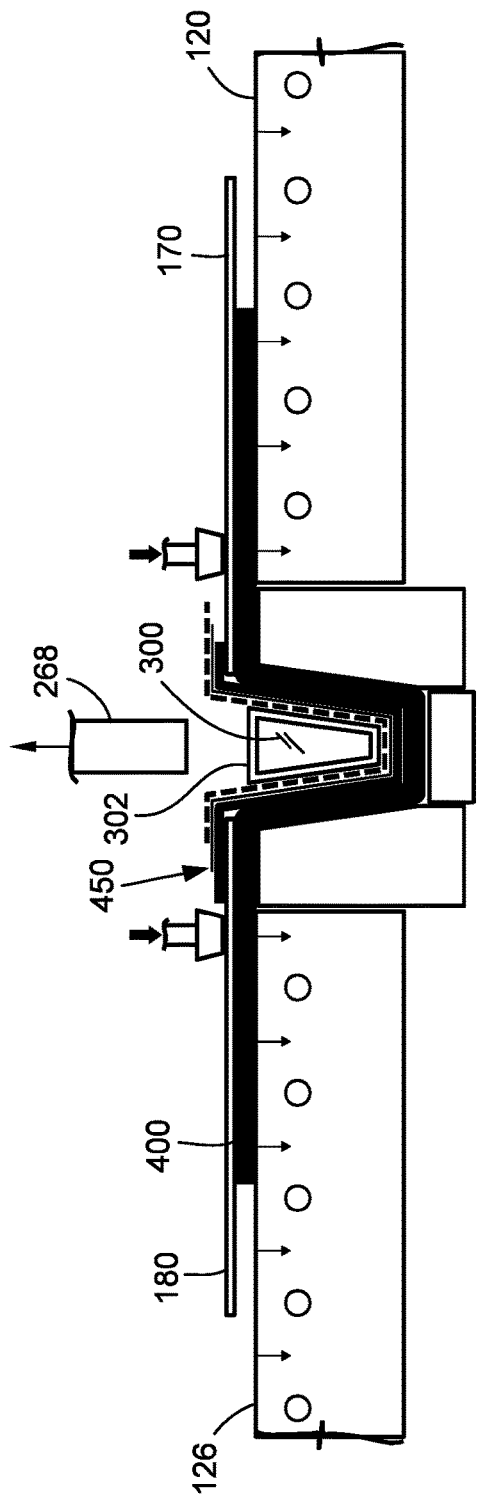
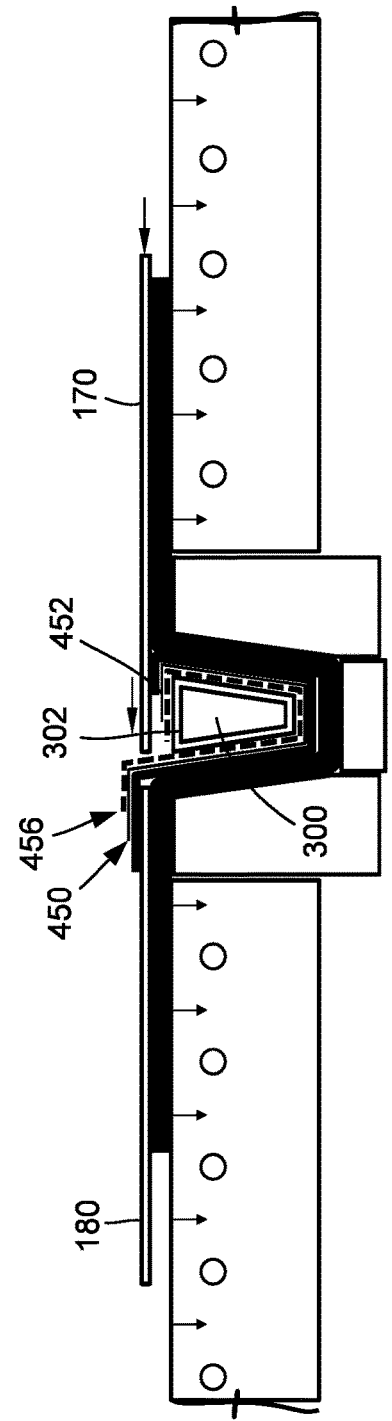
FIG. 47
FIG. 48

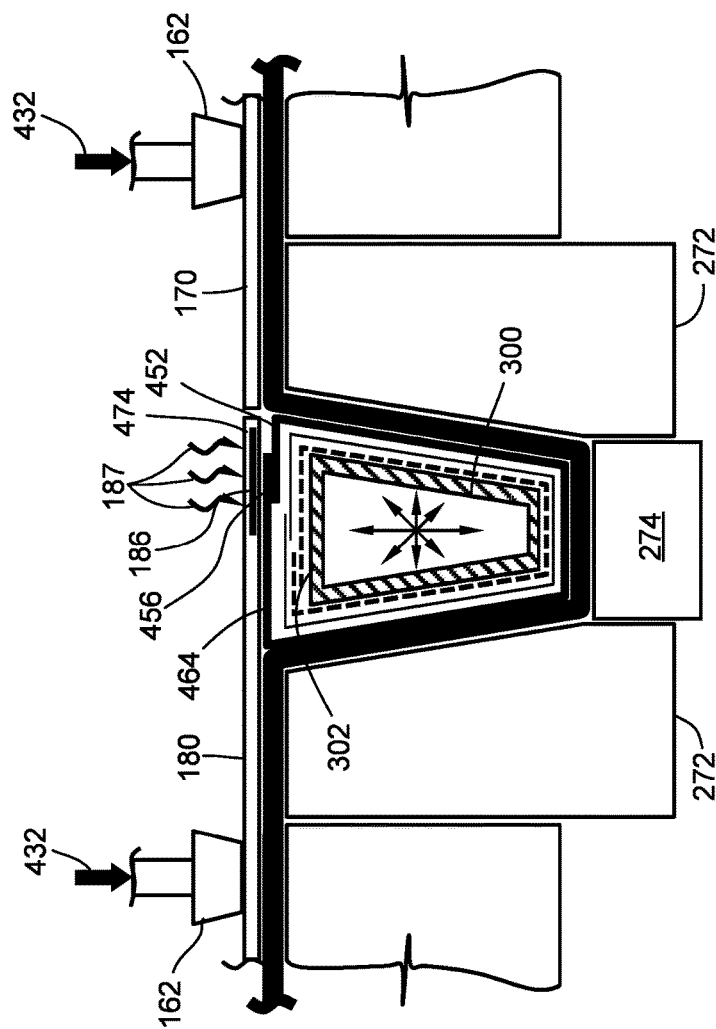
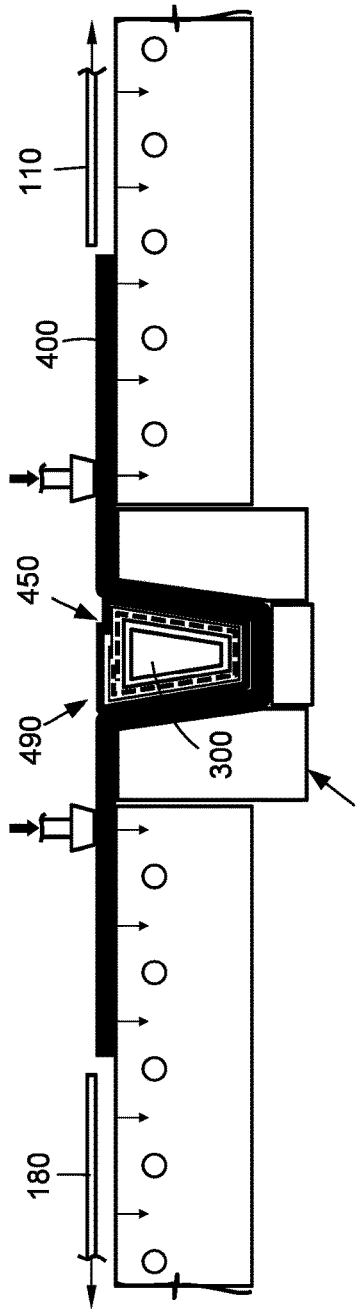

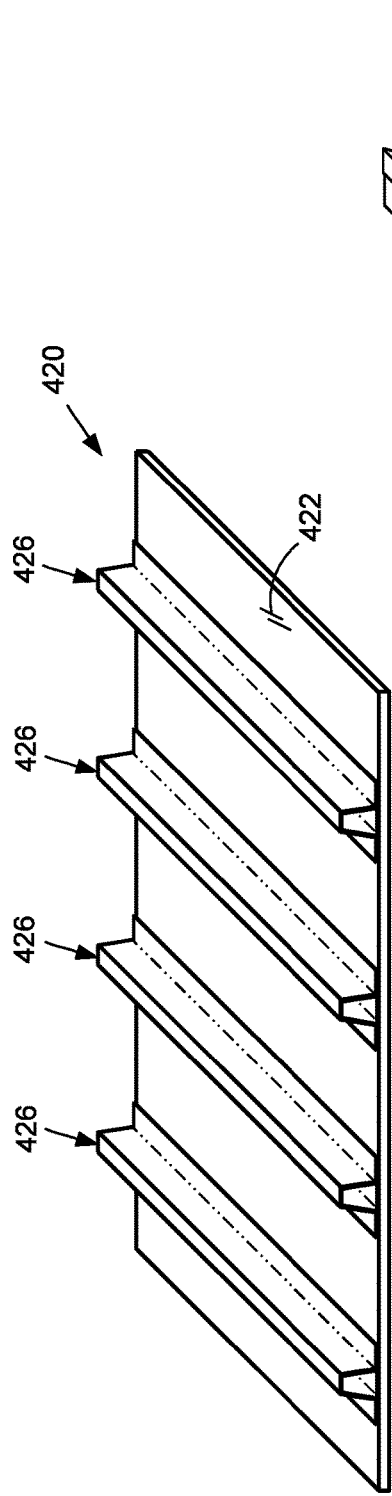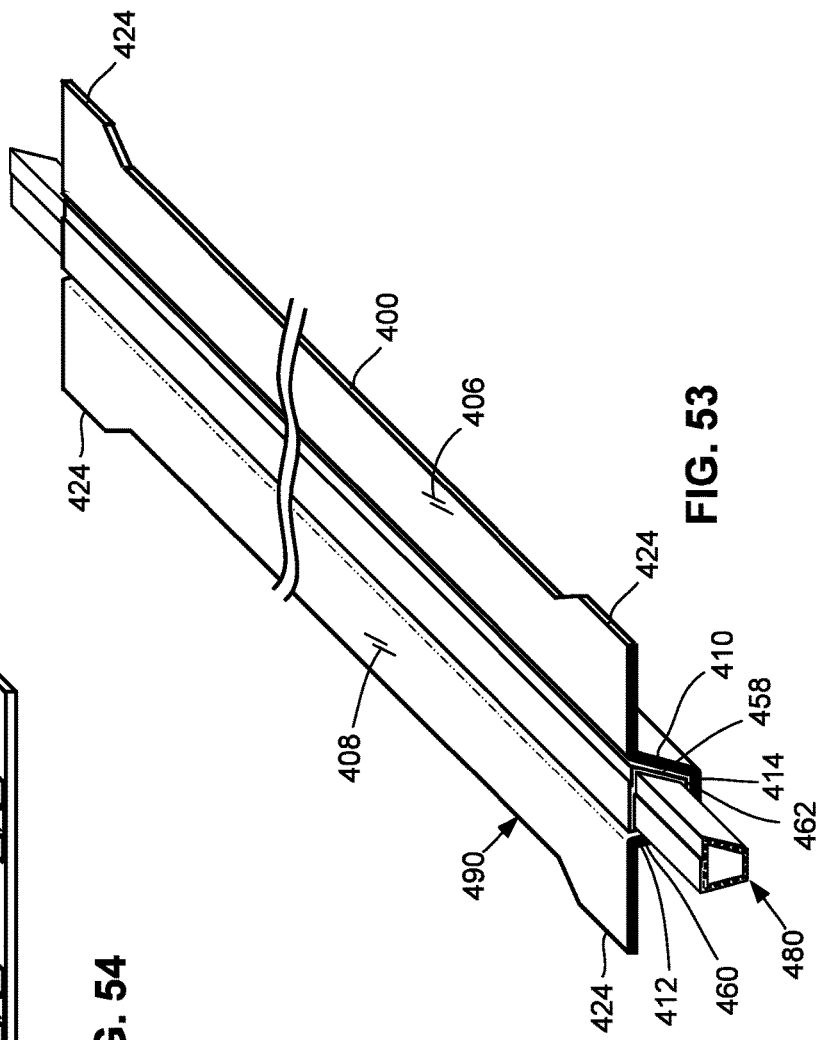

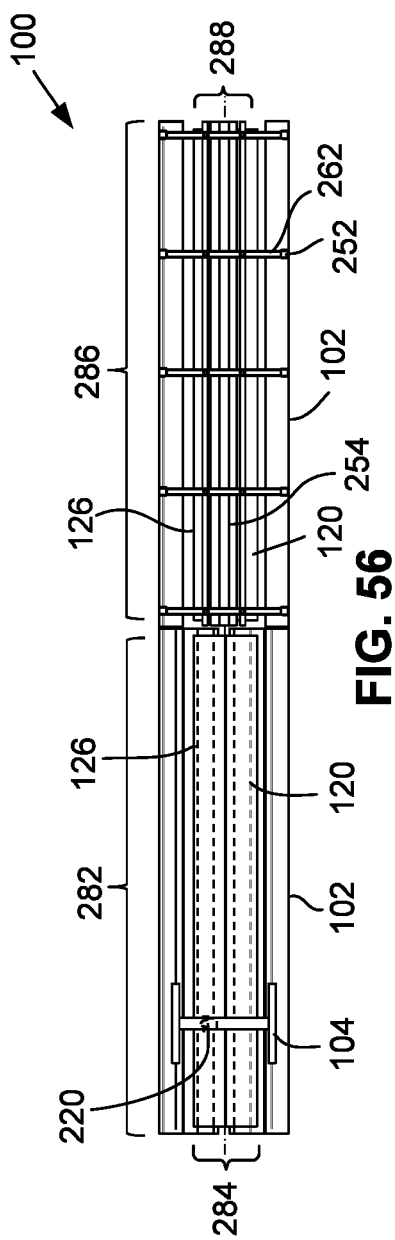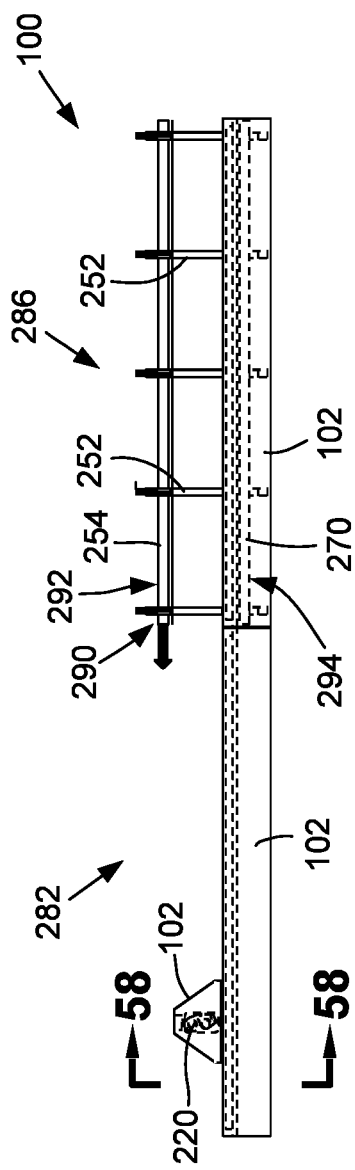

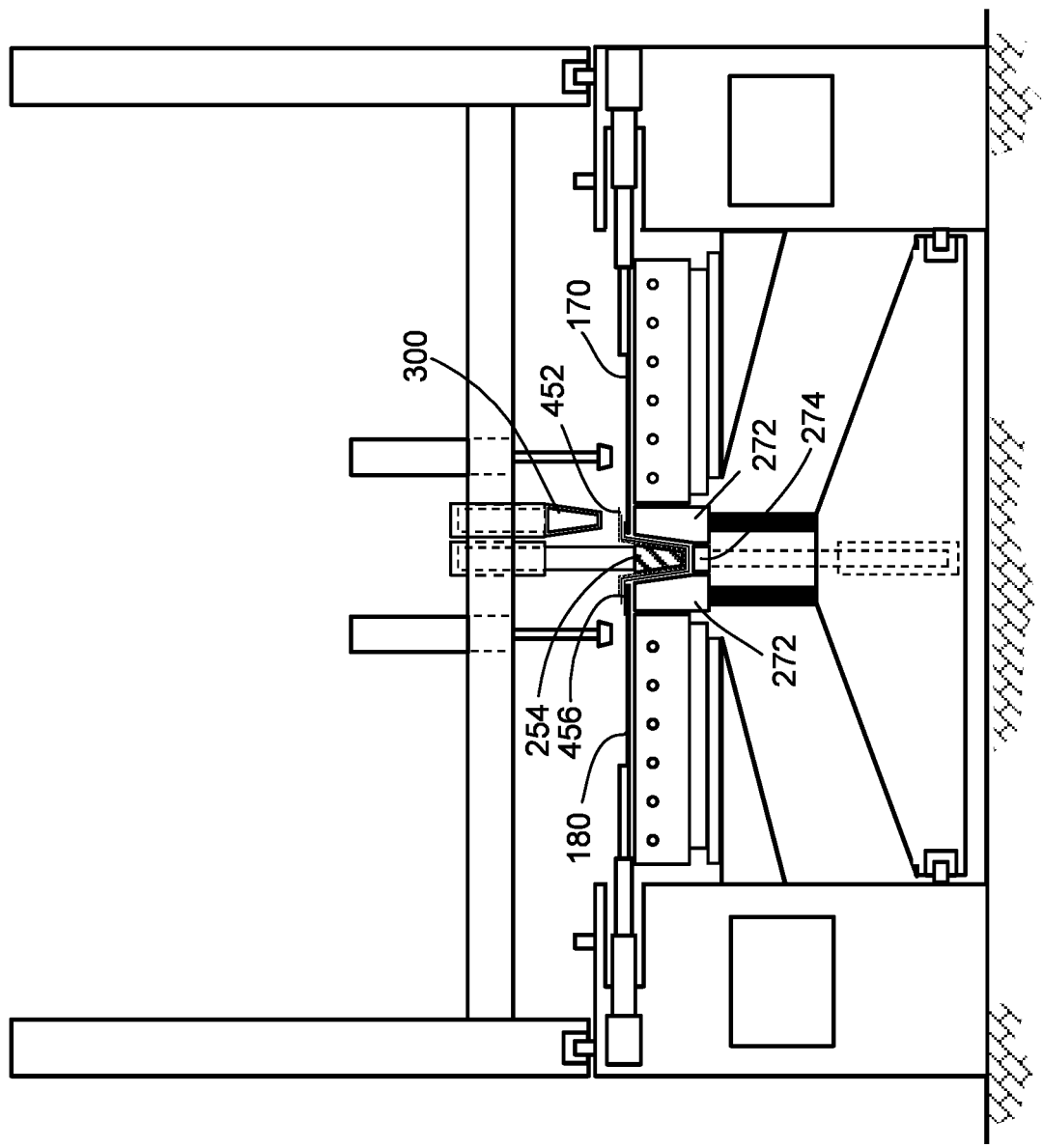

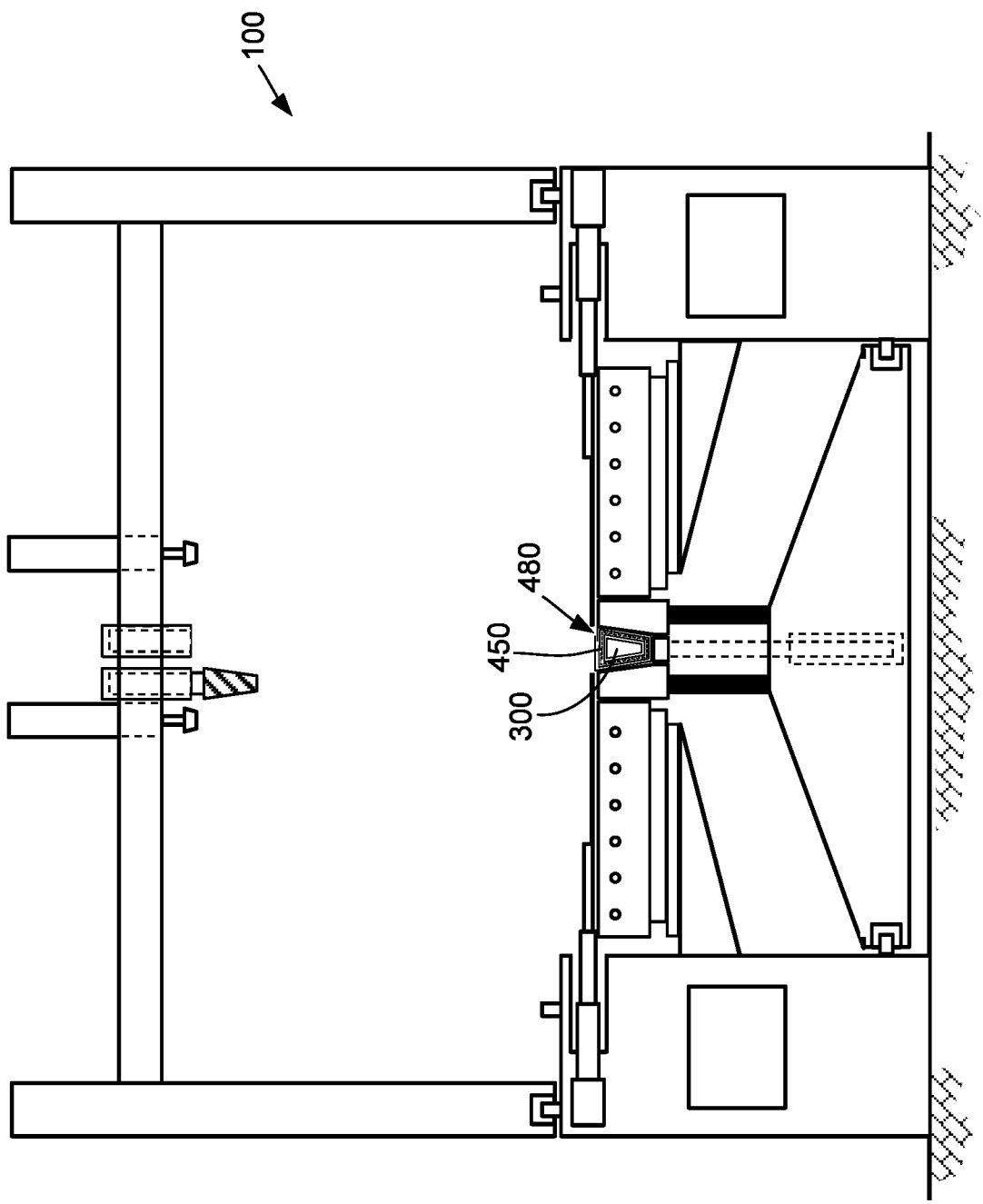

SYSTEM AND METHOD FOR MANUFACTURING A COMPOSITE ASSEMBLY

FIELD

The present disclosure relates generally to manufacturing systems and, more particularly, to a system and method for manufacturing composite assemblies.

BACKGROUND

Composite materials are used in a wide variety of applications due to their favorable properties such as high specific strength, high specific stiffness, and high corrosion resistance. The manufacturing of a composite structure typically involves the layup of multiple plies of composite laminate material to form a composite laminate. The layup material is typically a fibrous material that is pre-impregnated with resin (e.g., prepreg). For example, the layup material may be epoxy-impregnated carbon fiber prepreg.

Certain composite structures include a composite skin member and a plurality of composite stringers coupled to the skin for increasing the stiffness of the composite structure. For example, a fuselage barrel section of an aircraft may include a generally tubular composite skin and a plurality of longitudinally extending composite stringers located on the skin inner surface. The composite stringers are typically individually laid up and formed and then mounted on a rotatable layup mandrel which is then overlaid with composite material to form the skin member. The skin-stringer assembly is co-cured or co-bonded to form a fuselage barrel section.

Prior to mounting onto the layup mandrel, each formed composite stringer may require the installation of a wrapped bladder assembly comprised of supporting materials such as a bladder wrapped with wrap plies, a breather layer and/or a release film. Conventional methods for installing a wrapped bladder assembly on a composite stringer may be labor-intensive and time-consuming. In addition, dedicated equipment may be required for manufacturing each wrapped bladder assembly. The need for separate equipment for manufacturing composite stringers and manufacturing wrapped bladder assembles represents a significant expense that adds to the overall production cost. In addition, the separate manufacturing equipment may require a large amount of production floor space. Furthermore, the conventional methods require transporting and installing each wrapped bladder assembly into the cavity of a stringer laminate in a time-consuming process that impacts the production rate.

As can be seen, there exists a need in the art for a system and method for manufacturing composite stringers that avoids the above-noted challenges associated with conventional stringer manufacturing methods.

SUMMARY

The above-noted needs associated with manufacturing composite stringers are specifically addressed and alleviated by the present disclosure which provides a manufacturing system for manufacturing a composite assembly. The manufacturing system includes at least one first mandrel having a first mandrel surface and a first mandrel surface edge. In addition, the manufacturing system includes at least one second mandrel having a second mandrel surface and a second mandrel surface edge. The manufacturing system also includes a first wrap plate positionable above the first mandrel surface and having a first wrap plate surface and a first wrap plate surface edge. Additionally, the manufacturing system includes a second wrap plate positionable above the second mandrel surface and having a second wrap plate surface and a second wrap plate surface edge. The first wrap plate and the second wrap plate are positionable in parallel side-by-side relation for receiving a wrap material stack having opposing first and second material stack base portions. The first wrap plate and/or the second wrap plate are configured to translate to a wrap plate open position defining a wrap plate gap between the first wrap plate surface edge and the second wrap plate surface edge for receiving a bladder having a bladder top side. The second mandrel is configured to translate to a mandrel open position defining a mandrel gap between the first mandrel surface edge and the second mandrel surface edge. The wrap plate gap and the mandrel gap are configured to receive the wrap material stack formed around the bladder. The first wrap plate and the second wrap plate are configured to fold the first and second material stack base portions into overlapping relation with each other onto the bladder top side.

Also disclosed is a method of manufacturing a composite assembly. The method includes receiving a wrap material stack on a first wrap plate surface and a second wrap plate surface respectively of a first wrap plate and a second wrap plate in side-by-side relation and located above a first mandrel and a second mandrel. The wrap material stack has opposing first and second material stack base portions. The method also includes translating at least one of the first wrap plate and the second wrap plate to a wrap plate open position defining a wrap plate gap between a first wrap plate surface edge and a second wrap plate surface edge. In addition, the method includes translating the second mandrel to a mandrel open position defining a mandrel gap between a first mandrel surface edge and a second mandrel surface edge. The method further includes urging, using one of an upper forming die and a bladder, the wrap material stack at least partially into the wrap plate gap and the mandrel gap. The method additionally includes forming the wrap material stack in response to urging the wrap material stack at least partially into the wrap plate gap and the mandrel gap. The method also includes folding, using the first wrap plate and the second wrap plate, the first and second material stack base portions into overlapping relation with each other onto a bladder top side to form a wrap-bladder assembly.

In addition, disclosed is a method of manufacturing a composite assembly which includes receiving a stringer laminate on a collective mandrel surface defined by a first mandrel surface and a second mandrel surface respectively of a first mandrel and a second mandrel. The stringer laminate as one or more uncured composite plies and as opposing first and second stringer flange portions. The method additionally includes positioning a first wrap plate and a second wrap plate in parallel side-by-side relation to each other above the stringer laminate. The method further includes receiving a wrap material stack on a first wrap plate surface and a second wrap plate surface respectively of a first wrap plate and a second wrap plate. The wrap material stack as opposing first and second material stack base portions. The method also includes translating the first wrap plate and/or the second wrap plate to a wrap plate open position defining a wrap plate gap between a first wrap plate surface edge and a second wrap plate surface edge. The method further includes translating the second mandrel to a mandrel open position defining a mandrel gap between a first mandrel surface edge and a second mandrel surface edge. In addition, the method includes urging, using one of an upper forming die and a bladder, the wrap material stack and the stringer laminate at least partially into the wrap plate gap and the mandrel gap. The method additionally includes co-forming the wrap material stack and the stringer laminate in response to urging the wrap material stack and the stringer laminate at least partially into the wrap plate gap and the mandrel gap. The method also includes folding, using the first wrap plate and the second wrap plate, the first and second material stack base portions into overlapping relation with each other on a bladder top side to form a wrap-bladder assembly.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a side view of a portion of the manufacturing system taken along line 4 of FIG. 3 and illustrating an example of a series of lamination heads supported on a gantry;

FIG. 5 is an end view of the manufacturing system taken along line 5-5 of FIG. 3 and illustrating the first wrap plate and the second wrap plate actuated into parallel side-by-side relation for receiving a wrap material stack via the lamination heads shown in FIG. 4;

FIG. 6 is a perspective view of the lamination heads laying up the wrap material stack on the first wrap plate and the second wrap plate;

FIG. 10 is an end view of the manufacturing system showing the lower forming die moved into the mandrel gap;

FIG. 11 is an end view of the manufacturing system showing the upper forming die urging the wrap material stack into the wrap plate and into contact with an opposing pair of lower die web portions of the lower forming die;

FIG. 14 is an end view of the manufacturing system showing the bladder installed in the wrap material stack after detachment from a bladder actuator;

FIG. 15 is an end view of the manufacturing system showing the first wrap plate being translated by the wrap plate actuator to fold a first material stack base portion over onto a bladder top side;

FIG. 16 is an end view of the manufacturing system showing the second wrap plate being translated by the wrap plate actuator to fold a second material stack base portion over on top of the first material stack base portion;

FIG. 17 is an end view of the manufacturing system showing the application of heat to an overlap of the second material stack base portion on top of the first material stack base portion;

FIG. 18 is a view of the encircled region identified by reference numeral 18 of FIG. 17 and illustrating internal bladder pressure applied by the bladder for compacting the wrap material stack against the lower forming die and the second wrap plate;

FIG. 19 is an end view of the manufacturing system showing the retraction of the first wrap plate and the second wrap plate;

FIG. 24 is an end view of the manufacturing system showing the wrap plate element of the second wrap plate folding the second material stack base portion over on top of the first material stack base portion to complete the manufacturing of the wrap-bladder assembly;

FIG. 25 is an end view of the manufacturing system showing the wrap plate element of the second wrap plate rotating back to its original position;

FIG. 36 is a top view of the manufacturing system showing the gantry moved back into the staging area for exchanging the trimming device for a lamination head;

FIG. 37 is a side view of the manufacturing system of FIG. 36;

FIG. 43 is an end view of the manufacturing system showing the lower forming die moved into the mandrel gap;

FIG. 44 is an end view of the manufacturing system showing the upper forming die urging the wrap material stack and the stringer laminate into the wrap plate gap and into contact with the lower die web portions;

FIG. 47 is an end view of the manufacturing system showing the bladder installed in the wrap material stack and stringer laminate after detachment from the bladder actuator;

FIG. 48 is an end view of the manufacturing system showing the first wrap plate folding the first material stack base portion over onto the bladder top side;

FIG. 51 is a view of the encircled region identified by reference numeral 51 of FIG. 50 and illustrating internal bladder pressure applied by the bladder for compacting the wrap material stack and stringer laminate against the lower forming die and the second wrap plate;

FIG. 52 is an end view of the manufacturing system showing the retraction of the first wrap plate and the second wrap plate;

FIG. 53 is a perspective view of an example of a stringer-wrap-bladder assembly formed by the process illustrated in FIGS. 30-52;

FIG. 54 is a perspective view of an example of a plurality of formed composite stringers co-cured or co-bonded to a skin member to form a composite structure;

FIG. 56 is a top view of an example of a manufacturing system in which the layup and forming of a wrap material stack are respectively performed in a lamination station and a forming station;

FIG. 57 is a side view of the manufacturing system of FIG. 56;

FIG. 69 is an end view of the manufacturing system showing the upper forming die fully inserting the wrap material stack into the wrap plate gap and into contact with the lower die web portions and the lower die cap portion;

FIG. 70 is an end view of the manufacturing system after completion of the forming and wrapping of the wrap material stack around the bladder.

DETAILED DESCRIPTION

Figure 1:
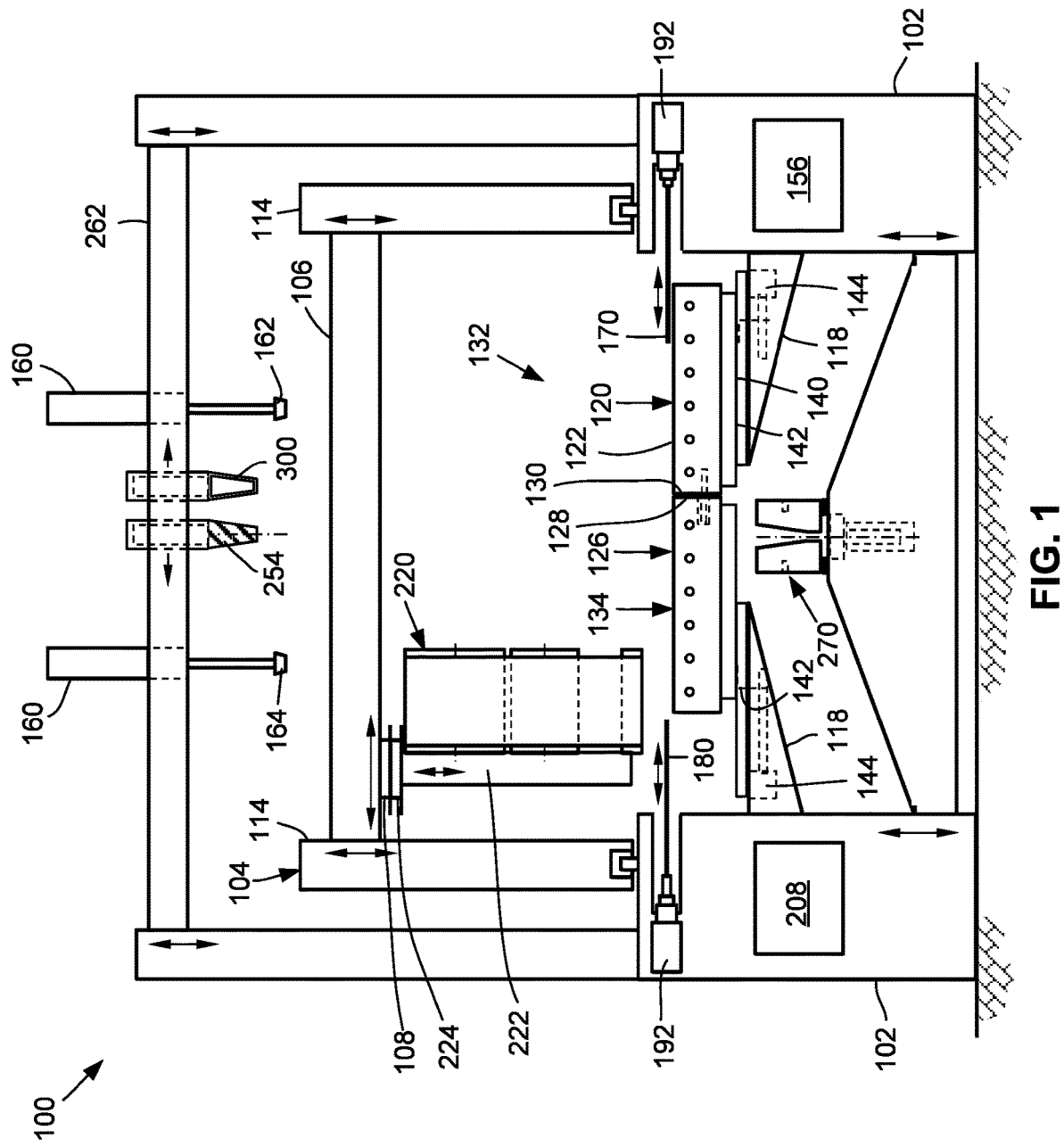
FIG. 1 is an end view of an example of a manufacturing system as disclosed herein and illustrating a first mandrel and a second mandrel positioned in side-by-side relation, and further illustrating a first wrap plate and a second wrap plate each independently actuatable by a wrap plate actuator.
Figure 3:
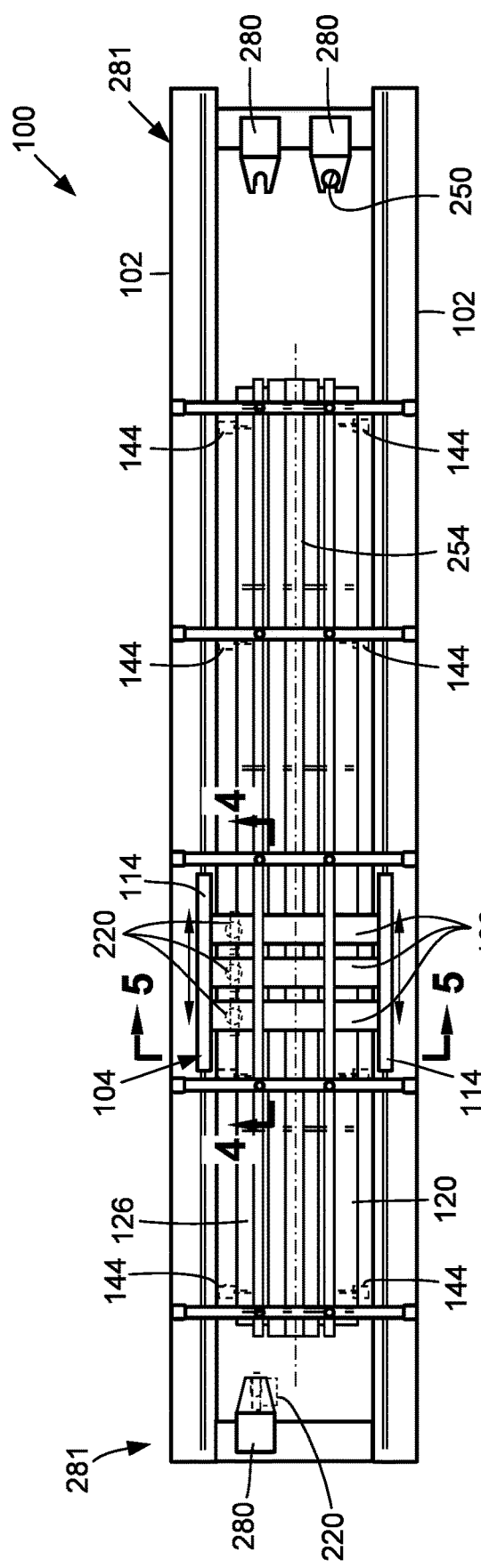
FIG. 3 is a top view of the manufacturing system of FIG. 1.
Figure 2:
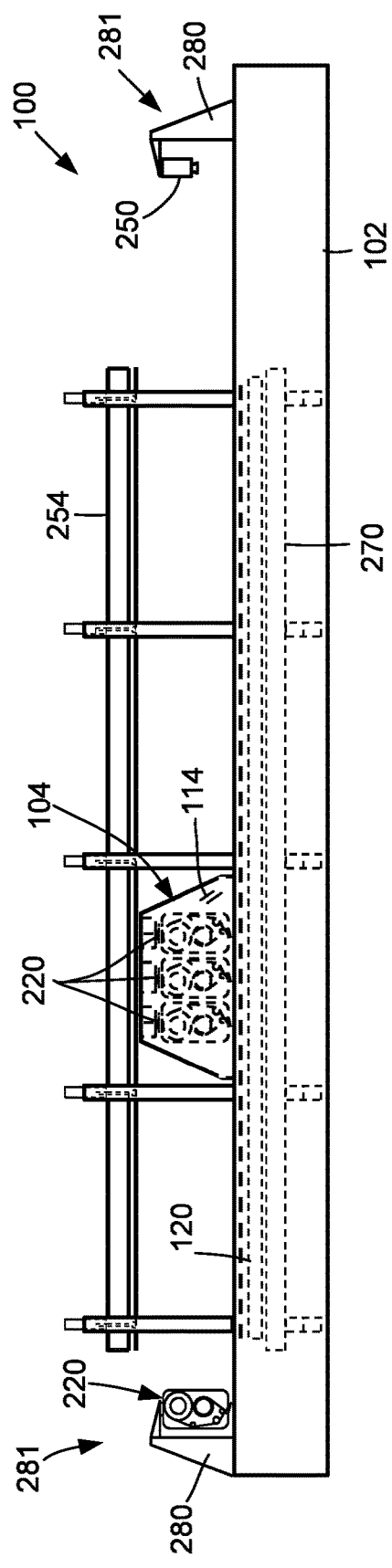
FIG. 2 is a side view of the manufacturing system of FIG. 1.
Figure 20:
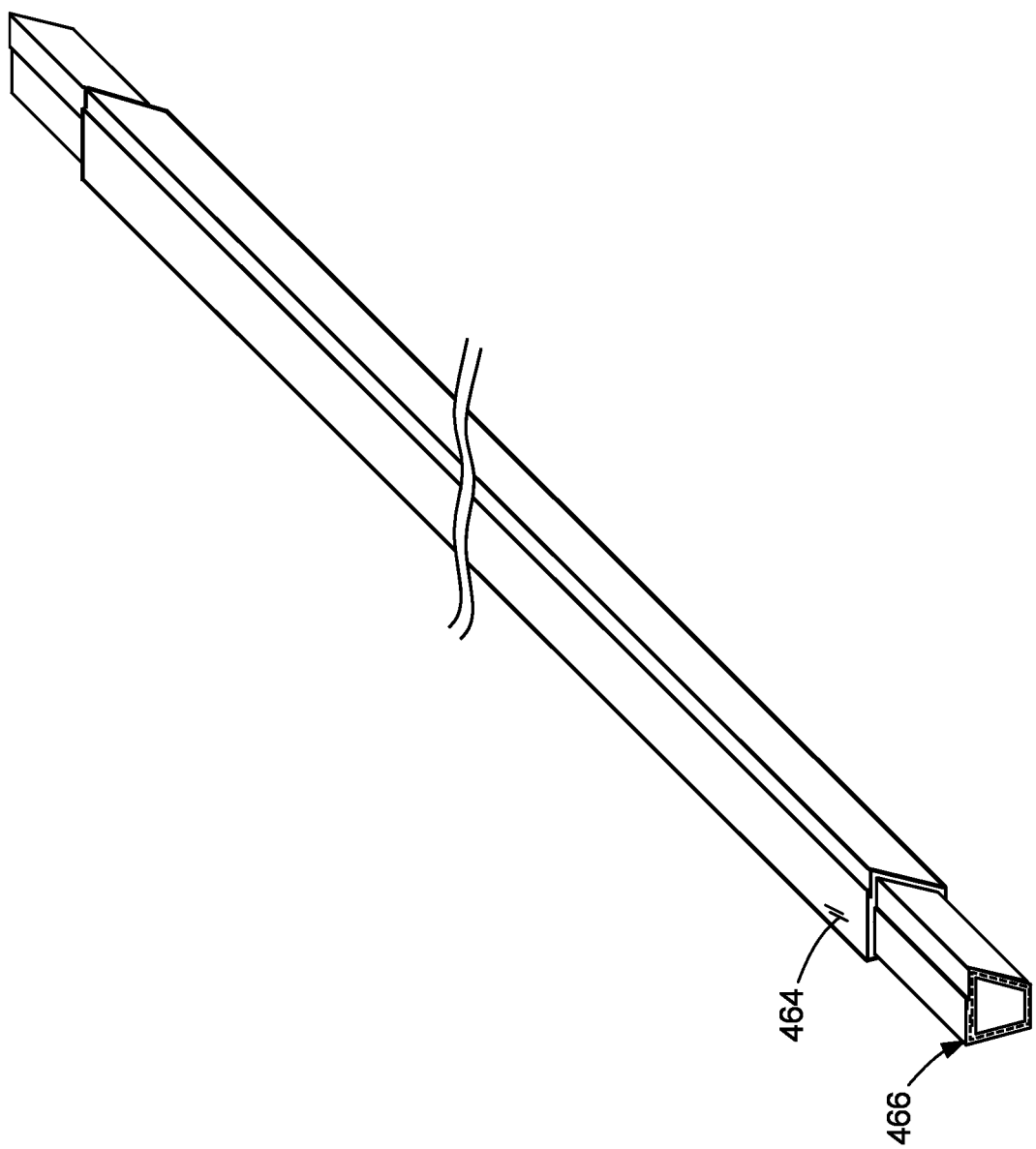
FIG. 20 is a perspective view of an example of a wrap-bladder assembly formed using the process illustrated in FIGS. 6-19.

Referring now to the drawings which illustrate preferred and various examples of the disclosure, shown in FIG. 1 is an end view of an example of a manufacturing system 100 as may be implemented for manufacturing a composite assembly such as a composite stringer 426 (e.g., FIG. 54). FIG. 2 is a side view of the manufacturing system 100 of FIG. 1, and FIG. 3 is a top view of the manufacturing system 100 of FIG. 1. As described in greater detail below, the manufacturing system 100 includes a first mandrel 120, a second mandrel 126, a first wrap plate 170, a second wrap plate 180 an optional upper forming die 254, a lower forming die 270, and one or more lamination heads 220 which, in combination with a bladder 300, enable the automated or semi-automated layup and wrapping of a wrap laminate 464 (FIG. 6) around the bladder 300 to form a wrap-bladder assembly 480 (FIG. 20). The wrap laminate 464 may be comprised of one or more prepreg composite plies 402 which may be unidirectional or woven reinforcing fibers pre-impregnated with thermosetting or thermoplastic resin. One or more layers of a bladder treatment 466 (e.g., a breather layer 468 and/or a release layer 470) may be included with the wrap laminate 464 (e.g., of a wrap material stack 450—FIG. 6) for automated wrapping around the mandrel.

In one example, the wrap-bladder assembly 480 may be assembled and cured with a stringer laminate 400 that may be separately laid up and formed into a cross-sectional contour that is complementary to the wrap-bladder assembly 480. The wrap-bladder assembly 480 and the stringer laminate 400 may be co-bonded or co-cured with a skin member 422 (FIG. 54) to form a stiffened composite structure 420 (FIG. 54). Alternatively, in other examples described below and shown in FIGS. 30-52, the manufacturing system 100 enables the automated layup and co-forming of the wrap laminate 464 (e.g., and bladder treatment 466) with a stringer laminate 400 to form a stringer-wrap-bladder assembly 490 (FIG. 53), one or more of which may be co-bonded or co-cured with a skin member 422 (FIG. 54) to form a stiffened composite structure 420 (FIG. 54). Advantageously, the automated or semi-automated layup and folding of the wrap laminate 464 with optional stringer laminate 400 increases production throughput with minimal manual handling. In addition, the presently-disclosed manufacturing system 100 may save valuable floor space otherwise required for separate lamination equipment and forming equipment.

Referring to FIGS. 1-3, the manufacturing system 100 may include a pair of elongated base members 102 supported on a surface such as a factory floor. The first mandrel 120 and the second mandrel 126 may be configured as rigid elements extending along a lengthwise direction of the base members 102. In an example, the first mandrel 120 and the second mandrel 126 may be made of metallic (aluminum, steel, etc.) or non-metallic material (e.g., ceramic or a polymeric material) or cured composite material (e.g., epoxy-carbon). The first mandrel 120 has a first mandrel surface 122 and a first mandrel surface edge 124. The second mandrel 126 has a second mandrel surface 128 and a second mandrel surface edge 130. The first mandrel 120 may be coupled to one of the base members 102 by one or more mandrel supports 118. Likewise, the second mandrel 126 may be coupled to a remaining one of the base members 102 by one or more mandrel supports 118. Although FIGS. 2-3 illustrate the first mandrel 120 and the second mandrel 126 each as a single unitary structure, the first mandrel 120 and the second mandrel 126 may each be made up of a series of end-to-end mandrel segments (not shown).

As shown in FIG. 1, the manufacturing system 100 may include a set of lateral rails 142 interposed between the first mandrel 120 and the mandrel supports 118 to facilitate lateral movement of the first mandrel 120 along a direction parallel to the first mandrel surface 122 and perpendicular to the first mandrel surface edge 124. Similarly, the manufacturing system 100 may include a set of lateral rails 142 interposed between the second mandrel 126 and the mandrel supports 118 to facilitate lateral movement of the second mandrel 126 along a direction parallel to the second mandrel surface 128 and perpendicular to the second mandrel surface edge 130. The lateral rails 142 may function as an alignment mechanism configured to maintain the first mandrel surface 122 and the second mandrel surface 128 at the same height at least when the first mandrel 120 and the second mandrel 126 are in the mandrel closed position 132. The manufacturing system 100 may optionally include additional alignment mechanisms 140 for maintaining the first mandrel 120 and the second mandrel 126 in vertical alignment with each other. For example, the first mandrel 120 and the second mandrel 126 may respectively include a pin 146 and socket 148 (FIG. 32) that may be engaged with each other to maintain vertical alignment of the first mandrel 120 and second mandrel 126 in the mandrel closed position 132.

Referring still to FIG. 1, movement of the first mandrel 120 and the second mandrel 126 during forming operations may be facilitated by mandrel actuators 144. For example, the first mandrel 120 and/the second mandrel 126 may each have one or more dedicated mandrel actuators 144 located at spaced intervals along the length of the base members 102 and configured to independently translate the first mandrel 120 and/or the second mandrel 126. In an example, the mandrel actuators 144 may be configured as a linear actuation mechanism such as an electro-mechanical actuator having a drive screw driven by a servo motor. Alternatively, one or more of the mandrel actuators 144 may be configured as a pneumatic actuator or a hydraulic actuator. However, the mandrel actuators 144 may be provided in any one of a variety of configurations for translating the first mandrel 120 and/or second mandrel 126, and are not limited to the arrangement shown in the figures and/or described herein.

Figure 9:
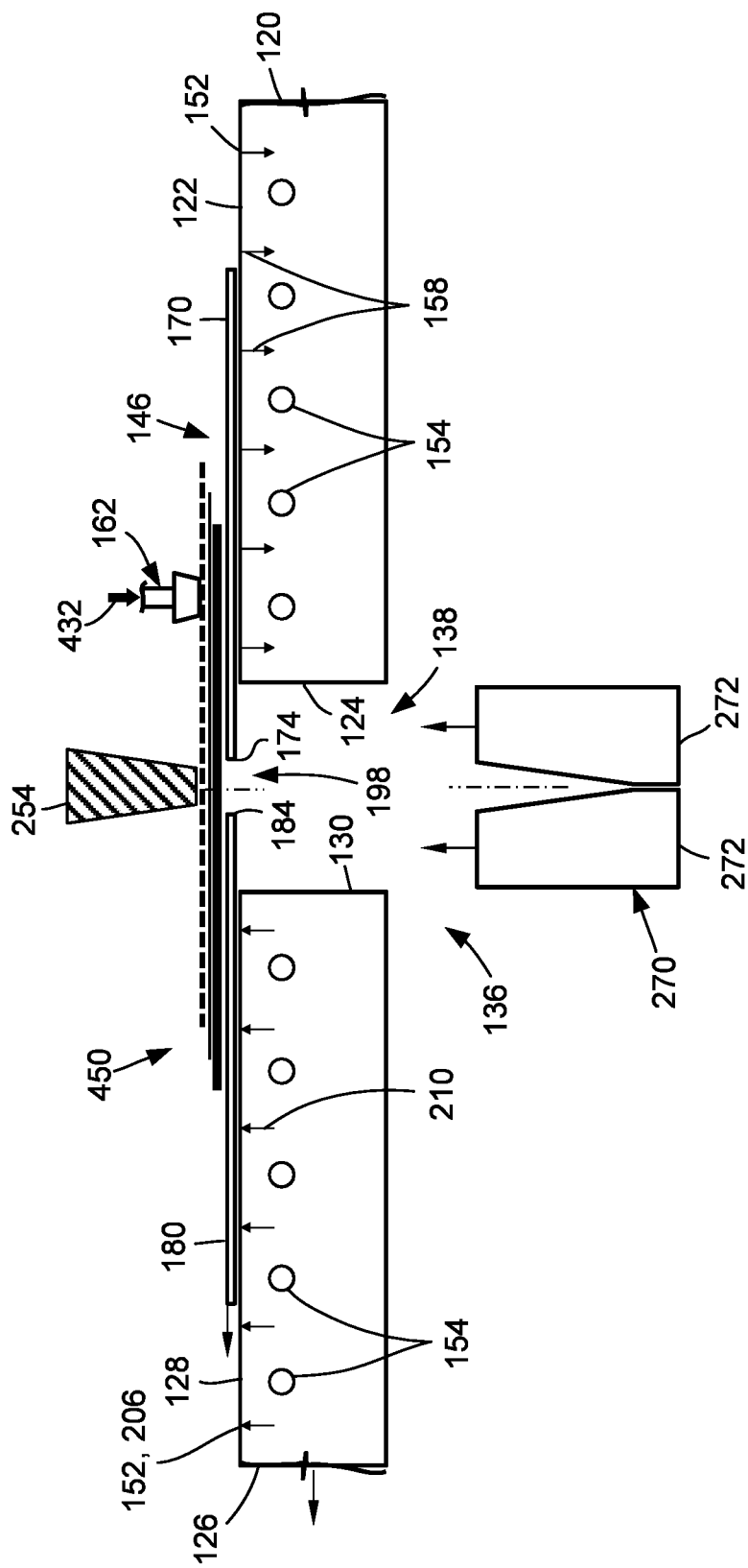
FIG. 9 is an end view of the manufacturing system showing the upper forming die moved into contact with the wrap material stack and further illustrating the second wrap plate translated to a wrap plate open position defining a wrap plate gap between the first wrap plate and the second wrap plate, and also illustrating the second mandrel translated to a mandrel open position defining a mandrel gap between the first mandrel and the second mandrel.

The second mandrel 126 is movable between a mandrel closed position 132 (FIG. 1) and a mandrel open position 136 (FIG. 9). In an alternative example of the manufacturing system 100, both the first mandrel 120 and the second mandrel 126 may be movable from the mandrel closed position 132 to the mandrel open position 136. In the mandrel closed position 132, the first mandrel surface edge 124 and the second mandrel surface edge 130 may be in side-by-side contacting relation with each other to may define a collective mandrel surface 134 for receiving, supporting or laying up a stringer laminate 400 (FIG. 30-32) comprised of one or more uncured composite plies 402, as described below. In addition, the first wrap plate 170 and the second wrap plate 180 may be supported on the first mandrel 120 and the second mandrel 126, as described below. In the mandrel open position 136, a mandrel gap 138 (FIG. 9) is defined between the first mandrel surface edge 124 and the second mandrel surface edge 130 for receiving the lower forming die 270 for forming the wrap material stack 450 (e.g., FIG. 9).

Referring to FIGS. 1 and 5, the first wrap plate 170 and the second wrap plate 180 may be configured as relatively rigid (e.g., non-flexible or non-bendable) members for supporting the wrap material stack 450 (FIG. 6) during layup and forming. In one example, the first wrap plate 170 and the second wrap plate 180 may be formed of metallic material such as aluminum or any other suitable metallic and/or nonmetallic material. The first wrap plate 170 and the second wrap plate 180 may be relatively thin members (e.g., less than 0.25 inch) to facilitate folding of the wrap material stack 450 over the bladder top side 302 (e.g., FIGS. 15-16), as described in greater detail below. The first wrap plate 170 has a first wrap plate surface 172 and a first wrap plate surface edge 174. The second wrap plate 180 has a second wrap plate surface 182 and a second wrap plate surface edge 184. The first wrap plate 170 and second wrap plate 180 may support the wrap material stack 450 during the layup and forming process. The first wrap plate surface edge 174 and the second wrap plate surface edge 184 may each be rounded to facilitate the folding of the wrap material stack 450 over the bladder 300 and to mitigate wrinkling in the wrap material stack 450 during the folding process.

The first wrap plate 170 and the second wrap plate 180 may each be independently actuatable by one or more wrap plate actuators 192 located at spaced intervals along the lengthwise direction of the base members 102. FIGS. 1 and 5 show the wrap plate actuators 192 configured as telescopic mechanisms. However, the wrap plate actuators 192 may be provided in any one of a variety of different configurations for moving the first wrap plate 170 and the second wrap plate 180. The wrap plate actuators 192 for the first wrap plate 170 may be configured to translate the first wrap plate 170 along a direction parallel to the first mandrel surface 122 and perpendicular to the first wrap plate surface edge 174. Similarly, the wrap plate actuators 192 for the second wrap plate 180 may be configured to translate the second wrap plate 180 along a direction parallel to the second wrap plate surface 182 and perpendicular to the second wrap plate surface edge 184. FIG. 1 shows the first wrap plate 170 and second wrap plate 180 in a retracted position. FIG. 5 shows the first wrap plate 170 positioned over the first mandrel 120, and the second wrap plate 180 positioned over the second mandrel surface 128. In some examples, the first wrap plate 170 and the second wrap plate 180 may be supported on (e.g., in physical contact with) respectively the first mandrel surface 122 and the second mandrel surface 128.

Figure 7:
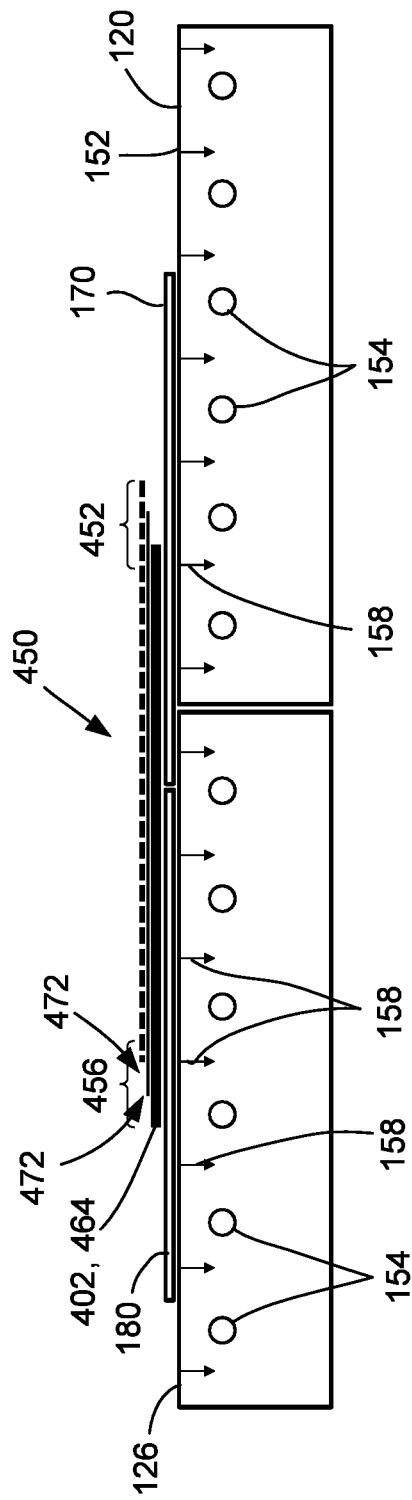
FIG. 7 is a simplified view of the encircled region identified by reference numeral 7 of FIG. 5 and illustrating the wrap material stack laid up on the first wrap plate and the second wrap plate which are positioned above the first mandrel and the second mandrel.

FIG. 5-7 show the first wrap plate 170 and the second wrap plate 180 positioned in side-by-side contacting relation to each other in a wrap plate closed position 188 in which the first wrap plate surface edge 174 and the second wrap plate surface edge 184 are in close proximity to each other. For example, the first wrap plate surface edge 174 and the second wrap plate surface edge 184 may be positioned within 0.10 inch of each other or in abutting contact with each other. In the wrap plate closed position 188, the first wrap plate surface 172 and the second wrap plate surface 182 define a collective wrap plate surface 190 which may be a continuous surface with no steps, gaps, breaks, interruptions, or discontinuities such that no part of the wrap material stack 450 (FIG. 6) is unsupported during the layup of the wrap material stack 450.

Referring to FIGS. 6-7, the collective wrap plate surface 190 is configured to receive the wrap material stack 450. As mentioned above, the wrap material stack 450 includes a wrap laminate 464 comprised of one or more uncured composite plies 402. In addition to the wrap laminate 464, the wrap material stack 450 may include the above-mentioned bladder treatment 466. In the presently-disclosed example, the bladder treatment 466 may include a release layer 470 on top of the wrap laminate 464, and a breather layer 468 on top of the release layer 470. The breather layer 468 may allow moisture, gas, and volatiles to evacuate from the bladder 300 (FIG. 14) and thereby prevent such moisture, gas, and volatiles from entering the wrap laminate 464 during cure. The release layer 470 may isolate the breather layer 468 from the wrap laminate 464 to prevent the resin of the wrap laminate 464 from adhering or bonding to the release layer 470 during cure. In addition, the release layer 470 may facilitate the removal of the bladder 300 from the wrap laminate 464 after curing. The bladder treatment 466 may include any one a variety of different types of layers other than or in addition to a breather layer 468 and a release layer 470.

Referring to FIGS. 4-6, the manufacturing system 100 may include one or more lamination heads 220 supported above the first wrap plate 170 and the second wrap plate 180. The lamination heads 220 may be implemented for laying up the wrap material stack 450 on the collective wrap plate surface 190 defined by the first wrap plate surface 172 and the second wrap plate 180. In the example shown, the manufacturing system 100 includes three lamination heads 220 supported by a gantry 104. The three lamination heads 220 may be configured respectively for dispensing composite material 232 for laying up the wrap laminate 464, release material 236 for laying up the release layer 470, and breather material 234 for laying up the breather layer 468. In the example shown, the gantry 104 includes three generally horizontally-oriented gantry crossbeams 106 respectively supporting the three lamination heads 220. However, the gantry 104 may include a single gantry crossbeam 106 configured to support any number of lamination heads 220. Alternatively, the lamination heads 220 may be supported by any one a variety of arrangements, and is not limited to a gantry 104 system. For example, the manufacturing system 100 may be configured such that one or more of the lamination heads 220 are supported by a cantilevered beam (not shown) or by a robotic arm of a robotic system (not shown). Furthermore, a manufacturing system 100 may include any number of lamination heads 220 for laying up the wrap material stack 450, and is not limited to having three lamination heads 220.

In FIGS. 4-6, the gantry crossbeams 106 each have opposing ends that are respectively coupled to a pair of generally vertically-oriented beam supports 114. Each one of the beam supports 114 may be supported on a gantry 104 track that extends along a lengthwise direction of the base members 102. The beam supports 114 may be movable along the gantry tracks 116 via a linear actuation mechanism (not shown) for translating the lamination heads 220 along a lengthwise direction of the collective wrap plate surface 190. In addition, each lamination head 220 may be independently movable along a horizontal track (not shown) incorporated into the respective gantry crossbeam 106 for moving the lamination heads 220 along a lateral direction of the collective wrap plate surface 190. Furthermore, the opposing ends of the gantry crossbeams 106 may be coupled to vertical tracks (not shown) included with the beam supports 114 to allow for independent vertical movement of each lamination head 220 via one or more linear actuation mechanisms (not shown) that may be incorporated into the beam supports 114.

In the example shown, each lamination head 220 may include a mounting frame 222. The mounting frame 222 may have a device coupling mechanism 224 configured to engage with a gantry coupling mechanism 108 of the gantry crossbeam 106. The combination of the gantry coupling mechanism 108 and device coupling mechanism 224 may define a quick-disconnect assembly allowing for rapid substitution of the lamination head 220 with another lamination head 220 or with another type of device such as a trimming device 250 (FIGS. 2-3) without manual intervention.

Referring briefly to FIGS. 2-3, in some examples, the manufacturing system 100 may include a staging area at one or both ends of the manufacturing system 100. A staging area 281 may include one or more device stands 280, each of which may be configured to support one or more devices (e.g., additional lamination heads 220, trimming devices 250) for performing any one of a variety of operations associated with the manufacturing of the wrap-bladder assembly 480 (FIG. 20) and/or associated with the manufacturing of a stringer-wrap-bladder assembly 490 (FIG. 53). The staging area 281 may include a device stand 280 for supporting a lamination head 220 and another device stand 280 for supporting a trimming device 250. As described below (e.g., FIG. 31-37), substitution of one type of device on the gantry 104 with another type device may involve moving the gantry 104 into position adjacent an empty one of the device stands 280, releasing a currently-mounted device (e.g., a lamination head 220) from the gantry 104 onto the empty device stand 280 by disengaging the device coupling mechanism 224 (FIG. 1) from the gantry coupling mechanism 108, laterally translating the gantry coupling mechanism 108 along the gantry crossbeam 106 until aligned with a device stand 280 occupied by a similar device (e.g., a lamination head) or different type of device (e.g., a trimming device 250), and engaging the gantry coupling mechanism 108 with the device coupling mechanism 224 of the similar or different type of device.

Referring again to FIGS. 4-6, each lamination head 220 may be configured to apply layup material 230 to the collective wrap plate surface 190. As mentioned above, each lamination head 220 may include a mounting frame 222 configured to support the components of the lamination head 220. The lamination head 220 may include a material supply drum 226 which may support a material roll 228 of layup material 230. In some examples, the layup material 230 may be backed by a backing layer 238. For example, prepreg composite material 232 (FIG. 6) may be backed by a backing layer 238 to prevent adjacent wraps of composite material 232 from adhering to each other on the material supply drum 226. As mentioned above, the prepreg composite material 232 may be provided as carbon-epoxy prepreg, fiberglass epoxy prepreg, or any one a variety of composite materials 232. Certain types of layup material 230 such as breather material 234 and release material 236 may or may not require a backing layer 238.

The lamination may include one or more redirect rollers 240 for guiding the layup material 230 from the material supply drum 226 to downstream components such as toward a cutter assembly 244 for cutting the layup material 230 during the dispensing of the layup material 230. The lamination head 220 may further include a backing layer separation assembly 242 configured to separate the backing layer 238 from the layup material 230. After separation from the layup material 230, the backing layer 238 may be wound on a backing layer collection drum 246 as the layup material 230 is applied to the collective wrap plate surface 190. The lamination head 220 may additionally include a compaction device 248 such as a compaction roller or a compaction shoe for applying compaction pressure to the layup material 230 being dispensed onto the collective wrap plate surface 190.

In FIGS. 4-6, shown are the lamination heads 220 supported above the first wrap plate 170 and the second wrap plate 180. As mentioned above, the first wrap plate 170 and the second wrap plate 180 are configured to translate to the wrap plate closed position 188 (FIGS. 5-6) in which the first wrap plate surface edge 174 and the second wrap plate surface edge 184 are in side-by-side abutting contact with each other and forming the collective wrap plate surface 190. In the example shown, the lamination heads 220 are configured to respectively dispense a composite material 232, a release material 236, and a breather material 234 in stacked formation on the collective wrap plate surface 190 to lay up the wrap material stack 450 comprised of the wrap laminate 464, the release layer 470, and the breather layer 468. However, as mentioned above, a wrap material stack 450 may include any one of a variety of materials.

In FIGS. 6-7, the wrap material may be provided in a width such that when the wrap material stack 450 is folded over the bladder top side 302 and print FIG. 18), the first material stack base portion 452 (FIG. 12) and the second material stack base portion 456 (FIG. 12) overlap each other, and thereby enabling the opposite sides of the wrap laminate 464 to adhere to each other for securing the wrap material around the bladder 300, as shown in FIG. 18 and described below. The adhering of the opposite sides of the wrap laminate 464 may be facilitated by the application of heat 187 (FIG. 18) from a heating device 186 that may optionally be included with the first wrap plate 170 and/or optionally included with the second wrap plate 180. The release material 236 and the breather material 234 may also the provided in a width such that the opposite sides of each of the release layer 470 and the breather layer 468 overlap each other as shown in FIG. 18 and described below. The wrap laminate 464, the release layer 470, and the breather layer 468 are shown laterally offset 472 from each other such that when folded over the bladder top side 302 (FIG. 18) into overlapping relation with each other, the overlap 474 of the wrap laminate 464, the overlap 474 of the breather layer 468, and the overlap 474 of the release layer 470 are staggered to avoid a thickness buildup that would otherwise occur if the overlaps 474 were vertically aligned. The offset 472 in the layers of the wrap material stack 450 may be provided by laterally offsetting the position of the lamination heads 220 (FIG. 6) during the dispensing of the layup material 230 of the wrap material stack 450.

Referring to FIGS. 5-9, in some examples, the manufacturing system 100 may include one or more laminate securing mechanisms 150 configured to secure the first wrap plate 170 and the second wrap plate 180 in fixed position on at least one of the first mandrel 120 and the second mandrel 126 during forming of the wrap material stack 450, and secure the wrap material stack 450 and the first wrap plate 170 in fixed position on the first mandrel 120 during translation of the second mandrel 126 to the mandrel open position 136. Advantageously, the laminate securing mechanisms 150 maintain the lateral position of the wrap material stack 450 in alignment with the forming die centerlines 260 to cause the overlap of the wrap laminate 464, the overlap 474 of the release layer 470, and the overlap 474 of the breather layer 468 to be located on the bladder top side 302 as shown in FIG. 18. The laminate securing mechanisms 150 may assist the wrap plate actuators 192 in maintaining the position of the first wrap plate 170 and the second wrap plate 180.

In one example, the laminate securing mechanisms 150 may include a plurality or pattern of apertures 152 (FIG. 6) formed in at least one of the first mandrel surface 122 and the second mandrel surface 128. The first mandrel 120 and/or the second mandrel 126 may include a plurality of fluid conduits 154 for fluidly coupling the apertures 152 to a vacuum pressure source 156 (e.g., a vacuum pump) for generating vacuum pressure 158 for securing the first wrap plate 170 and/or the second wrap plate 180 respectively to the first mandrel 120 and the second mandrel 126. Alternatively or additionally, the laminate securing mechanisms 150 may include one or more pinch mechanisms 160 (FIG. 8) configured to mechanically clamp the wrap material stack 450 against the first wrap plate 170 and/or the second wrap plate 180 which, in turn, may clamp the first wrap plate 170 and/or the second wrap plate 180 respectively to the first mandrel surface 122 and the second mandrel surface 128. In the example shown, the pinch mechanisms 160 may be configured as a first clamping bar 162 and/or a second clamping bar 164 (FIG. 5). Regardless of their configuration, the laminate securing mechanisms 150 may non-movably secure the wrap material stack 450 and the first wrap plate 170 and/or second wrap plate 180 in fixed position relative respectively to the first mandrel 120 and/or the second mandrel 126.

Referring still to FIGS. 5-9, the manufacturing system 100 may include one or more laminate releasing mechanisms 206 configured to urge the first wrap plate 170 and/or the second wrap plate 180 respectively away from the first mandrel 120 and/or second mandrel 126 to allow relative motion between the first wrap plate 170 and the first mandrel 120, and allow relative motion between the second wrap plate 180 and the second mandrel 126. In one example, the laminate releasing mechanisms 206 (e.g., FIGS. 5 and 9) may be configured as the above-mentioned plurality of apertures 152 fluidly coupled to a positive air pressure source 208 (FIG. 5) for generating positive air pressure 210 at the apertures 152 for urging the first wrap plate 170 away from the first mandrel 120, and/or for urging the second wrap plate 180 away from the second mandrel 126.

Figure 8:
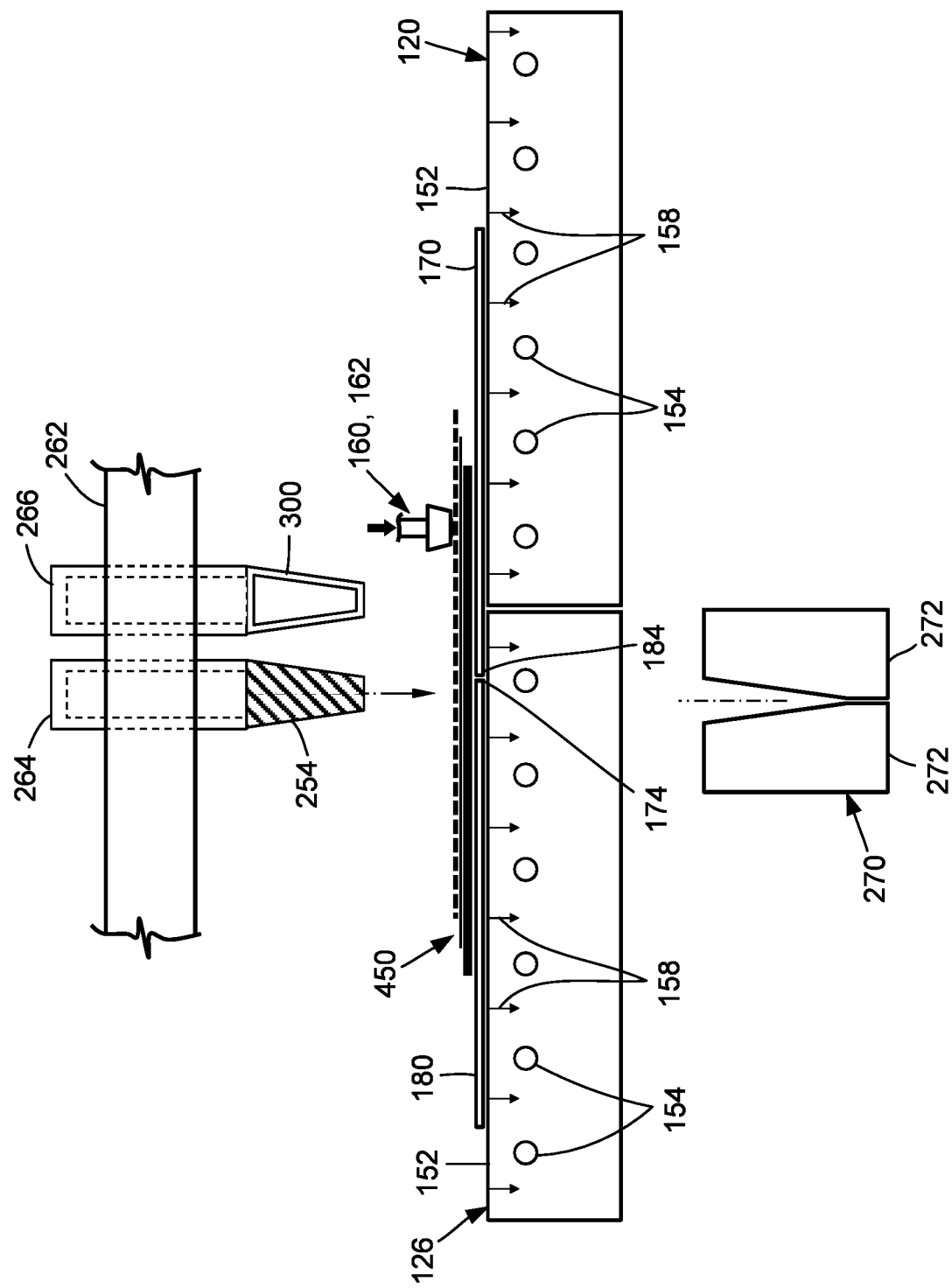
FIG. 8 is an end view of the manufacturing system showing an upper forming die and adjacently-located bladder vertically lowered into position above the wrap material stack and further illustrating a lower forming die in position below the first mandrel and the second mandrel in preparation for forming the wrap material stack.

Referring to FIGS. 8-19, shown is a sequence of operations for forming and folding the wrap material stack 450 around the bladder 300. FIG. 8 shows an upper forming die 254 and the adjacently-located bladder 300 vertically lowered, via the upper crossbeam 262 (FIG. 5), into position above the wrap material stack 450. In addition, shown is the first clamping bar 162 clamping the wrap material stack 450 onto the first wrap plate 170 and against the first mandrel 120. Also shown is the lower forming die 270 vertically positioned, via the lower crossbeam 276 (FIG. 5), below the first mandrel 120 and the second mandrel 126 in preparation for forming the wrap material stack 450. In the presently-disclosed example, the upper forming die 254 is configured to urge the wrap material stack 450 against the lower forming die 270 to form the wrap material stack 450 in the desired cross-sectional shape, after which the upper forming die 254 is removed and replaced with the bladder 300 over which the first material stack base portion 452 and second material stack base portion 456 are folded using the first wrap plate 170 and second wrap plate 180 as shown in FIGS. 14-16 and described below. However, in other examples not shown, the upper forming die 254 may be omitted from the manufacturing system 100 and the bladder 300 may the used to urge the wrap material stack 450 against the lower forming die 270, after which the first wrap plate 170 and second wrap plate 180 may fold the wrap material stack 450 over the bladder top side 302.

In the presently-disclosed manufacturing system 100, the first wrap plate 170 and/or the second wrap plate 180 are configured to translate, via the wrap plate actuators 192 (FIG. 5), respectively along a direction perpendicular to the first wrap plate surface edge 174 and the second wrap plate surface edge 184 to a wrap plate open position 196 defining a wrap plate gap 198 between the first wrap plate surface edge 174 and the second wrap plate surface edge 184. In addition, the second mandrel 126 is configured to translate, via the mandrel actuators 144 (FIG. 5), along a direction perpendicular to the second mandrel surface edge 130 to a mandrel open position 136 defining a mandrel gap 138 between the first mandrel surface edge 124 and the second mandrel surface edge 130. Alternatively, as mentioned above, both the first mandrel 120 and the second mandrel 126 may be translated to the mandrel open position 136 defining the mandrel gap 138.

The lower forming die 270 is vertically translatable and is receivable within the mandrel gap 138 between the first mandrel 120 and the second mandrel 126 in the mandrel open position 136. The lower forming die 270 may comprise a pair of lower die web portions 272 and a lower die cap portion 274 (FIG. 12), all of which may be mounted on the vertically movable lower crossbeam 276 which may have opposing ends that are coupled to the pair of base members 102. In addition to the lower forming die 270 (as a whole) being vertically movable on the lower crossbeam 276 (FIG. 5), the lower die web portions 272 may also be vertically movable independent of the vertical movement of the lower die cap portion 274. The lower forming die 270 provides a rigid element configured in the desired final shape of the wrap laminate 464 and is configured to react against the forming and compaction pressure applied by the upper forming die 254 and the bladder 300.

The lower forming die 270 is configured to support the wrap material stack 450 against compaction pressure applied to the wrap material stack 450 by the bladder 300. In addition, the lower forming die 270 may support the wrap material stack 450 against compaction pressure applied by the upper forming die 254 to form the wrap material stack 450 prior to insertion of the bladder 300. The lower forming die 270 has a contour complementary to the upper forming die 254 and is configured to form the wrap material stack 450 and reduce or prevent the formation of wrinkles in one or more composite plies 402 of the wrap laminate 464 during the forming process.

In FIGS. 5, 8 and 9, the upper forming die 254 is downwardly movable, via the upper crossbeam 262, into contact with the portion of the wrap material stack 450 spanning the wrap plate gap 198. The upper forming die 254 is configured to urge the wrap material stack 450 into the wrap plate gap 198 (FIG. 9) and form the wrap material stack 450 prior to removal and replacement of the upper forming die 254 with the bladder 300. In addition to being vertically movable via movement of the upper crossbeam 262, the upper forming die 254 may be vertically moved via an upper die actuator 264 mounted to the upper crossbeam 262. The upper forming die 254 may be coupled to the upper die actuator 264 via an actuator rod (not shown). In a similar arrangement, the bladder 300 may be vertically moved via a bladder actuator 266 coupled to the upper crossbeam 262. The bladder 300 may be detachably coupled (e.g., FIG. 13) to the bladder actuator 266 via an actuator rod 268 (FIG. 13-14) to allow the bladder 300 to remain within the wrap material stack 450 after forming. The actuator rod 268 may be retracted away from the bladder 300 by the bladder actuator 266 and/or by the upper crossbeam 262.

In FIG. 5, the upper crossbeam 262 may be supported on opposing ends by pair of posts 252 located at spaced intervals along the length of the base members 102 and extending upwardly from the base members 102. The upper die actuator 264 and the bladder actuator 266 may each be independently translatable along the upper crossbeam 262. The upper forming die 254 may be formed of a relatively rigid material (e.g., metallic or rigid polymeric material) to provide a rigid element capable of forming the wrap material stack 450 against the lower forming die 270.

In FIG. 9, the upper forming die 254 is moved into contact with the wrap material stack 450 and the second wrap plate 180 is translated to the wrap plate open position 196 defining the wrap plate gap 198 between the first wrap plate 170 and the second wrap plate 180. The wrap plate gap 198 may be sized to receive the upper forming die 254. Also shown is the second mandrel 126 translated to the mandrel open position 136 defining the mandrel gap 138 between the first mandrel 120 and the second mandrel 126. However, as mentioned above, in an alternative example, both the first mandrel 120 and the second mandrel 126 may be translated to the mandrel open position 136 to define the mandrel gap 138. The mandrel gap 138 may be of a size that is complementary to a combined width of the lower die web portions 272 which are in side-by-side relation to each other. Positive air pressure 210 may be discharged from the apertures 152 in the second mandrel 126 to urge the second wrap plate 180 away from the second mandrel surface 128 to facilitate movement of the second wrap plate 180 relative to the second mandrel surface 128. Vacuum pressure 158 may be applied to the apertures 152 in the first mandrel 120 to draw the first wrap plate 170 against the first mandrel surface 122 to prevent movement of the first wrap plate 170 relative to the first mandrel 120. In addition, the first clamping bar 162 may apply clamping pressure 432 onto the wrap material stack 450 and against the first wrap plate 170 as an additional measure for preventing movement of the wrap material stack 450 during movement of the second wrap plate 180 and second mandrel 126.

FIG. 10 shows the lower die web portions 272 of the lower forming die 270 in the mandrel gap 138. The upper die cap portion 256 of the upper forming die 254 is in contact with the material stack cap portion 462 of the wrap material stack 450. Also shown is the first clamping bar 162 exerting clamping pressure 432 onto the first material stack base portion 452 of the wrap material stack 450 against the first wrap plate 170, and the second clamping bar 164 exerting clamping pressure 432 on the second material stack base portion 456 of the wrap material stack 450 against the second wrap plate 180.

Figure 12:
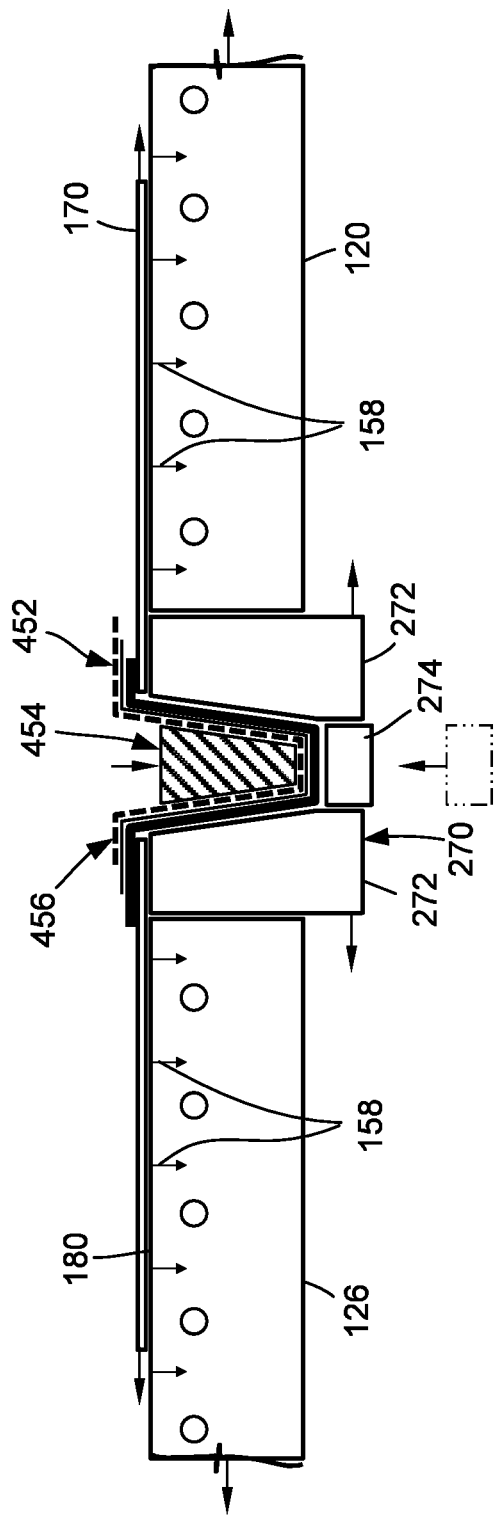
FIG. 12 is an end view of the manufacturing system showing the upper forming die completing the initial forming of the wrap material stack which is shown supported against a lower die cap portion of the lower forming die.

FIG. 11 shows the upper die cap portion 256 urging the wrap material stack 450 into the wrap plate gap 198 while the upper die web portions 258 urge the first and second material stack web portions 458, 460 into contact with the pair of lower die web portions 272 of the lower forming die 270. As the upper forming die 254 is urged into the gap between the lower die web portions 272, the first wrap plate 170, the second wrap plate 180, the first mandrel 120 and the second mandrel 126 may be urged laterally outwardly. The clamping pressure 432 exerted by the first clamping bar 162 and the second clamping bar 164 may generate lateral tension 430 in the wrap material stack 450 which may minimize the formation of wrinkles at least in the wrap laminate 464 during the forming process. FIG. 12 shows the first wrap plate 170, the second wrap plate 180, the first mandrel 120, and the second mandrel 126 translated further laterally outwardly as the forming die is vertically lowered until the wrap material stack 450 is compacted against the lower die cap portion 274 of the lower forming die 270. Vacuum pressure 158 may optionally be drawn on the apertures 152 in the first mandrel 120 and second mandrel 126 for urging the first wrap plate 170 and second wrap plate 180 respectively against the first mandrel surface 122 and second mandrel surface 128 to provide a stabilizing effect during movement of the first wrap plate 170 with the first mandrel 120, and during movement of the second wrap plate 180 with the second mandrel 126. In any one of the examples disclosed herein, the first mandrel 120, the second mandrel 126, the first wrap plate 170, the second wrap plate 180, the upper forming die 254 and/or the lower forming die 270 may include one or more heating elements (not shown) for heating the wrap laminate 464 to facilitate the forming and folding of the wrap laminate 464. For a wrap laminate 464 formed of thermoplastic prepreg, the application of heat may reduce the viscosity of the thermoplastic resin to an extent allowing the wrap laminate 464 to be formed into the desired cross-sectional shape, after which the wrap laminate 464 may be allowed to cool and solidify for retaining the formed cross-sectional shape.

Figure 13:
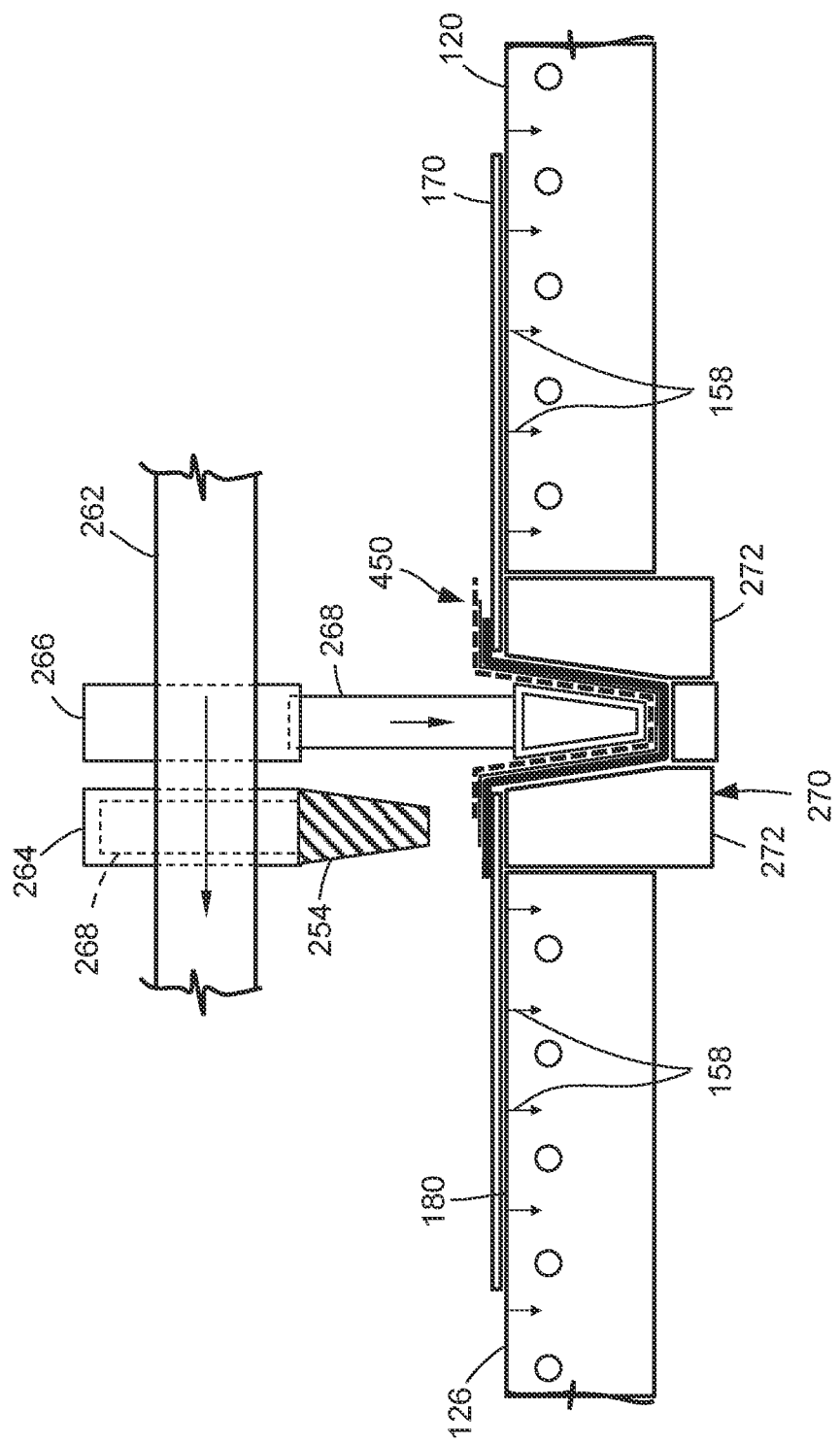
FIG. 13 is an end view of the manufacturing system showing the upper forming die removed from the wrap material stack and replaced with the bladder.

Referring to FIGS. 13-14, shown is the upper forming die 254 removed from the wrap material stack 450 and replaced with the bladder 300 after the wrap material stack 450 has been formed by the upper forming die 254. During replacement of the upper forming die 254 with the bladder 300, the actuator rod 268 of the upper forming die 254 may be drawn upwardly by the upper die actuator 264 to translate the upper forming die 254 away from the wrap material stack 450. The upper die actuator 264 and the bladder actuator 266 may be laterally translated along the upper crossbeam 262 to position the bladder 300 over the portion of the wrap material stack 450 directly above the lower forming die 270. The bladder actuator 266 may lower the bladder 300 into the wrap material stack 450, after which the actuator rod 268 of the bladder actuator 266 may be detached and drawn upwardly. The bladder 300 may remain within the wrap material stack 450.

In the presently-disclosed manufacturing system 100, the first wrap plate 170 and the second wrap plate 180 are configured to fold the first material stack base portion 452 and second material stack base into overlapping relation with each other onto the bladder top side 302 to form a wrap-bladder assembly 480. Advantageously, the use of the first wrap plate 170 and second wrap plate 180 for folding of the wrap material stack 450 reduces the amount of time normally required for forming the wrap-bladder assembly 480 and avoids the need for a dedicated folding station.

FIGS. 15-16 illustrate an example of the folding of the wrap material stack 450 over the bladder top side 302. In the example shown, the first wrap plate 170 and the second wrap plate 180 translate back-and-forth over the bladder top side 302 to alternately fold the first material stack base portion 452 and second material stack base portion 456 over each other onto the bladder top side 302. FIG. 15 shows the first wrap plate 170 being translated by its wrap plate actuators 192 (FIG. 5) along a direction toward the second wrap plate 180. The first wrap plate 170 urges the first material stack base portion 452 to fold over onto the bladder top side 302 while the second wrap plate 180 may be stationary. Vacuum pressure 158 may be applied to the second mandrel 126 to secure the second wrap plate 180 to the second mandrel 126, and positive air pressure 210 may be applied to the first mandrel 120 to urge the first wrap plate 170 away from the first mandrel 120. FIG. 16 shows the second wrap plate 180 being translated by the wrap plate actuators 192 along a direction toward the first wrap plate 170 causing the second wrap plate 180 to urge the second material stack base portion 456 to fold over onto the first material stack base portion 452 while the first wrap plate 170 is retracted by its wrap plate actuators 192. Vacuum pressure may be applied to the first mandrel 120 to secure the first wrap plate 170 to the first mandrel 120. Positive air pressure 210 may be applied to the second mandrel 126 to urge the second wrap plate 180 away from the second mandrel 126. As an alternative to the first wrap plate 170 retracting while the second wrap plate 180 extends, the first wrap plate 170 may remain stationary in position over the bladder top side 302 while the second wrap plate 180 folds the second material stack base portion 456 over the first wrap plate 170, thereby allowing the first warp plate to hold down the first wrap base portion and thereby preventing the first wrap base portion from springing back up toward its original position.

Referring to FIGS. 17-18, as mentioned above, the first wrap plate 170 and/or the second wrap plate 180 may optionally include a heating device 186 that may be integrated into or mounted on the first wrap plate 170 and second wrap plate 180 proximate the respective first wrap plate surface edge 174 and the second wrap plate surface edge 184. In an embodiment, the heating device 186 may be configured as one or more resistive elements (e.g., resistive wires) covered by electrically insulative material (e.g., plastic, ceramic) which may be mounted on or embedded into the first wrap plate 170 and/or the second wrap plate 180. However, the device may be provided in any one of a variety of other configurations. The heating device 186 may be configured to locally apply heat 187 to the first material stack base portion 452 and second material stack base portion 456 for locally softening the resin in the composite plies 402 to allow surface intermingling of the resin to facilitate bonding of the overlapping portions of the wrap laminate 464 as a means to keep the wrap material stack 450 wrapped around the bladder 300 during subsequent operations.

FIG. 18 shows the application of heat 187 to the overlap 474 of the second material stack base portion 456 on top of the first material stack base portion 452. The first clamping bar 162 and second clamping bar 164 are shown in contact respectively with the first wrap plate 170 and second wrap plate 180. At least the second clamping bar 164 may apply clamping pressure 432 on the second wrap plate 180 for applying pressure at the overlap 474 of the first material stack base portion 452 and the second material stack base portion 456 to improve adhesion and resin intermingling during local heating by the heating device 186.

In FIG. 18, the bladder 300 may be rigid and/or the bladder 300 may be inflatable. In one example, the bladder 300 may be configured as a rigid bladder (not shown) formed of foam material that may be removed after the curing of the wrap-bladder assembly 480 (FIG. 20). Alternatively, the foam may be configured to remain inside the cured wrap-bladder assembly 480 throughout the life of the part. In another example, the bladder 300 may be hollow and an internal stiffener (not shown) may be inserted into the bladder 300 to provide rigidity during the process of forming the wrap material stack 450. During the process of folding the first and second material stack base portions 452, 456 over the bladder top side 302, the bladder 300 may be pressurized at least until heat is applied to tack (e.g., lightly bond) the first and second material stack base portions 452, 456 at the overlap 474, after which bladder 300 may be depressurized and the internal stiffener may be removed from the bladder 300. The internal pressurization of the bladder 300 may compact the wrap laminate 464 against the lower forming die 270 after the first and second material stack base portions 452, 456 have been folded in overlapping relation on the bladder top side 302. The bladder 300 may be internally pressurized prior to and/or during the above-described local application of heat 187 by the heating device 186. The positive air pressure source 208 (FIG. 5) may inject air into the bladder 300 for generating the internal bladder pressure 304. Advantageously, the internal pressurization of the bladder 300 may reduce or prevent wrinkling of the composite material 232 of the wrap laminate 464, and may also improve the bonding together of the first material stack base portion 452 with the second material stack base portion 456. The clamping pressure 432 applied by the second clamping bar 164 may provide the backing force to allow the second wrap plate 180 to resist the internal bladder pressure 304 applied to the wrap material stack 450 along the bladder top side 302. After heating (e.g., using the heating device 186) the overlap 474 of the second material stack base portion 456 on top of the first material stack base portion 452, the first clamping bar 162 and second clamping bar 164 may be retracted respectively from the first wrap plate 170 and first wrap plate 180, and the second wrap plate 180 may be translated a relatively short distance toward the first wrap plate 170 to break (via shearing) any adhesive bond formed between the second wrap plate 180 and the resin in the wrap laminate 464. Translation of the second wrap plate for shearing (e.g., breaking) the adhesive bond between the wrap laminate 464 and the second wrap plate 180 may result in a tension load in the uppermost composite ply (not shown) of the wrap laminate 464 without causing wrinkling of the composite ply.

FIG. 19 shows the retraction of the first wrap plate 170 and the second wrap plate 180 via the wrap plate actuators 192 and revealing the wrap-bladder assembly 480 which is supported by the lower forming die 270. Positive air pressure 210 may be applied to the first mandrel 120 and second mandrel 126 to respectively urge the first wrap plate 170 and second wrap plate 180 away from the first mandrel 120 and second mandrel 126. FIG. 20 is a perspective view of an example of the wrap-bladder assembly 480 after removal from the manufacturing system 100. In the example shown, the bladder treatment 466 may extend beyond the opposite ends of the wrap laminate 464. Although not shown, the bladder 300 may extend beyond the opposite ends of the bladder treatment 466. Adhesive tape (not shown) may secure the bladder treatment 466 to the bladder 300 at each of the opposite ends of the bladder 300.

Referring to FIGS. 21-25, shown is an example of an alternative method for folding the first material stack base portion 452 and second material stack base portion 456 into overlapping relation with each other on the bladder top side 302. In the example shown, at least a portion of the first wrap plate 170 and the second wrap plate 180 may be configured to rotate 180 degrees about a pivot axis 195 located respectively proximate the first wrap plate surface edge 174 and the second wrap plate surface edge 184. For example, the first wrap plate 170 and/or the second wrap plate 180 may each have a wrap plate folding element 194 that nests within a recess (not shown) of the respective first wrap plate 170 and second wrap plate 180, thereby allowing the wrap plate folding element 194 to lie flush with the respective first wrap plate surface 172 and second wrap plate surface 182.

Figure 21:
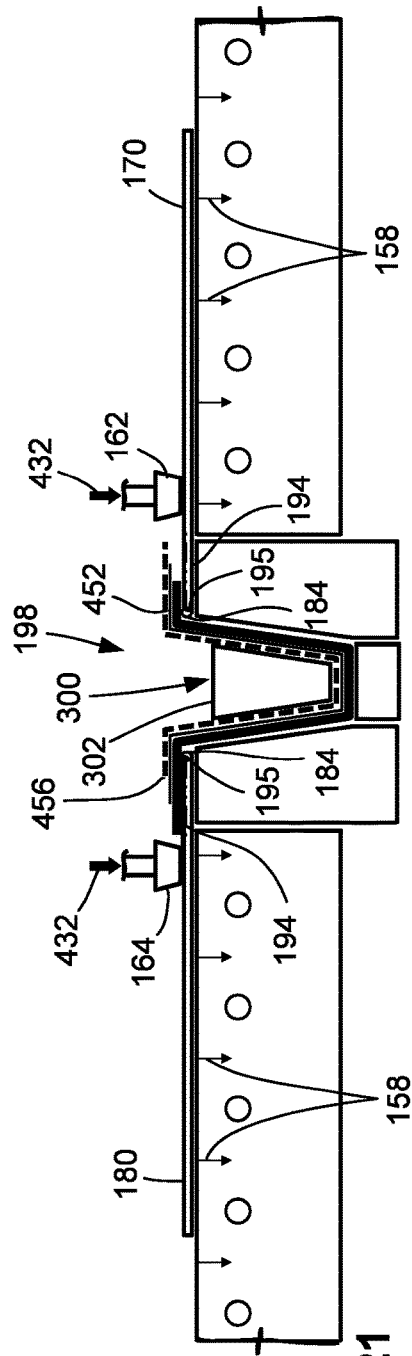
FIG. 21 is an end view of an example of a manufacturing system in which at least a portion of the first wrap plate and the second wrap plate are configured to independently rotate for folding the first material stack base portion and the second material stack base portion into overlapping relation with each other.
Figure 22:
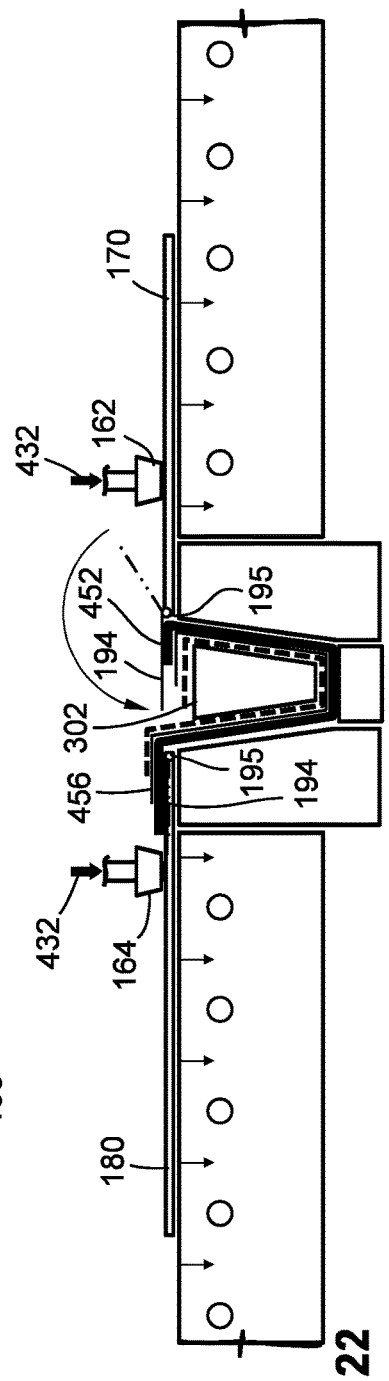
FIG. 22 is an end view of the manufacturing system of FIG. 21 showing a wrap plate folding element of the first wrap plate folding the first material stack base portion over onto the bladder top side.
Figure 23:
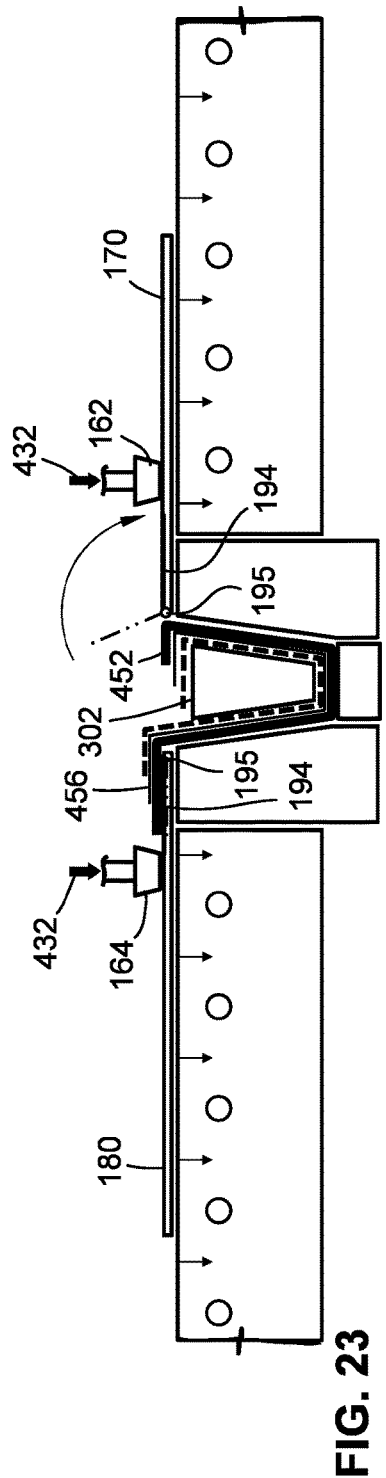
FIG. 23 is an end view of the manufacturing system showing the wrap plate folding element of the first wrap plate rotating back to its original position.

FIG. 21 shows the first material stack base portion 452 and second material stack base portion 456 protruding out of the wrap plate gap 198. Also shown is the first clamping bar 162 and second clamping bar 164 applying clamping pressure 432 respectively on the first wrap plate 170 and second wrap plate 180. FIG. 22 shows a wrap plate folding element 194 of the first wrap plate 170 folding or flipping the first material stack base portion 452 over onto the bladder top side 302. FIG. 23 shows the wrap plate folding element 194 of the first wrap plate 170 rotating back to its original position after which the wrap plate folding element 194 may be nested within a recess formed in the first wrap plate 170. FIG. 24 shows the wrap plate folding element 194 of the second wrap plate 180 folding or flipping the second material stack base portion 456 over on top of the first material stack base portion 452 to complete the folding of the wrap-bladder assembly 480. FIG. 25 shows the wrap plate folding element 194 of the second wrap plate 180 rotating back to its original position after which the wrap plate folding element 194 may be nested within a recess formed in the second wrap plate 180.

Figure 26:
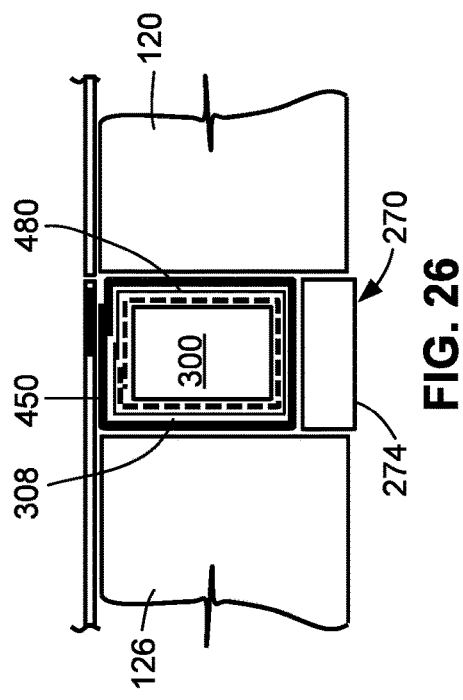
FIG. 26 is an end view of the manufacturing system configured for forming a wrap material stack into a square cross-sectional shape.
Figure 27:
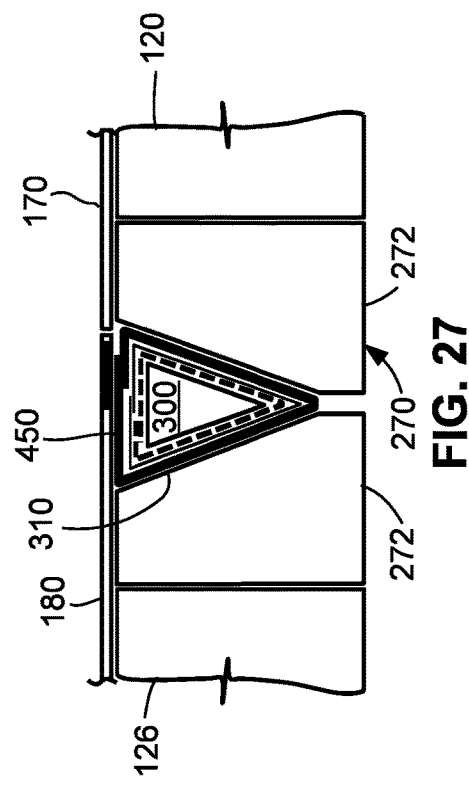
FIG. 27 is an end view of the manufacturing system configured for forming a wrap material stack into a triangular cross-sectional shape.
Figure 28:
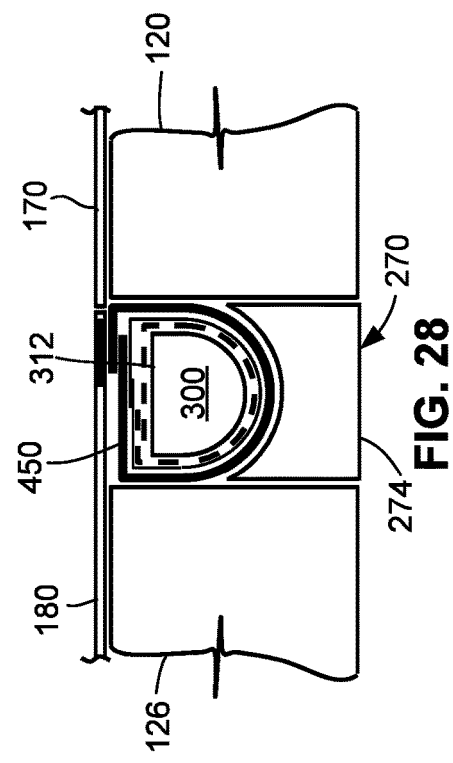
FIG. 28 is an end view of the manufacturing system configured for forming a wrap material stack into a dome cross-sectional shape.

Referring to FIGS. 26-28, shown are examples of alternative configurations of the wrap-bladder assembly 480 and associated configurations of the first mandrel 120, the second mandrel 126, and the lower forming die 270 for forming the wrap-bladder assembly 480 in cross-sectional shape that is different than the trapezoidal shape 306 (e.g., FIG. 25) of the wrap-bladder assembly 480. FIG. 26 shows an example of a wrap material stack 450 wrapped around a bladder 300 having a cross-section in a square shape 308. In the example shown, the lower die web portions 272 may be omitted from the lower forming die 270, and the side surfaces of the first mandrel 120 and second mandrel 126 may function as the surfaces against which the internal bladder pressure 304 (FIG. 18) compacts the first and second material stack web portions 458, 460. FIG. 27 shows an example of a wrap material stack 450 wrapped around a bladder 300 having a cross-section in a triangular shape 310. In the example shown, the lower die cap portion 274 may be omitted from the lower forming die 270 and the internal bladder pressure 304 may compact the material stack web portions against the lower die web portions 272. FIG. 28 shows an example of a wrap material stack 450 wrapped around the bladder 300 having a cross-section in a dome shape 312. In FIG. 28, the lower die web portions 272 are omitted from the lower forming die 270, and the material stack web portions are compacted between the bladder 300 and the side surfaces of the first mandrel 120 and the second mandrel 126.

Figure 29:
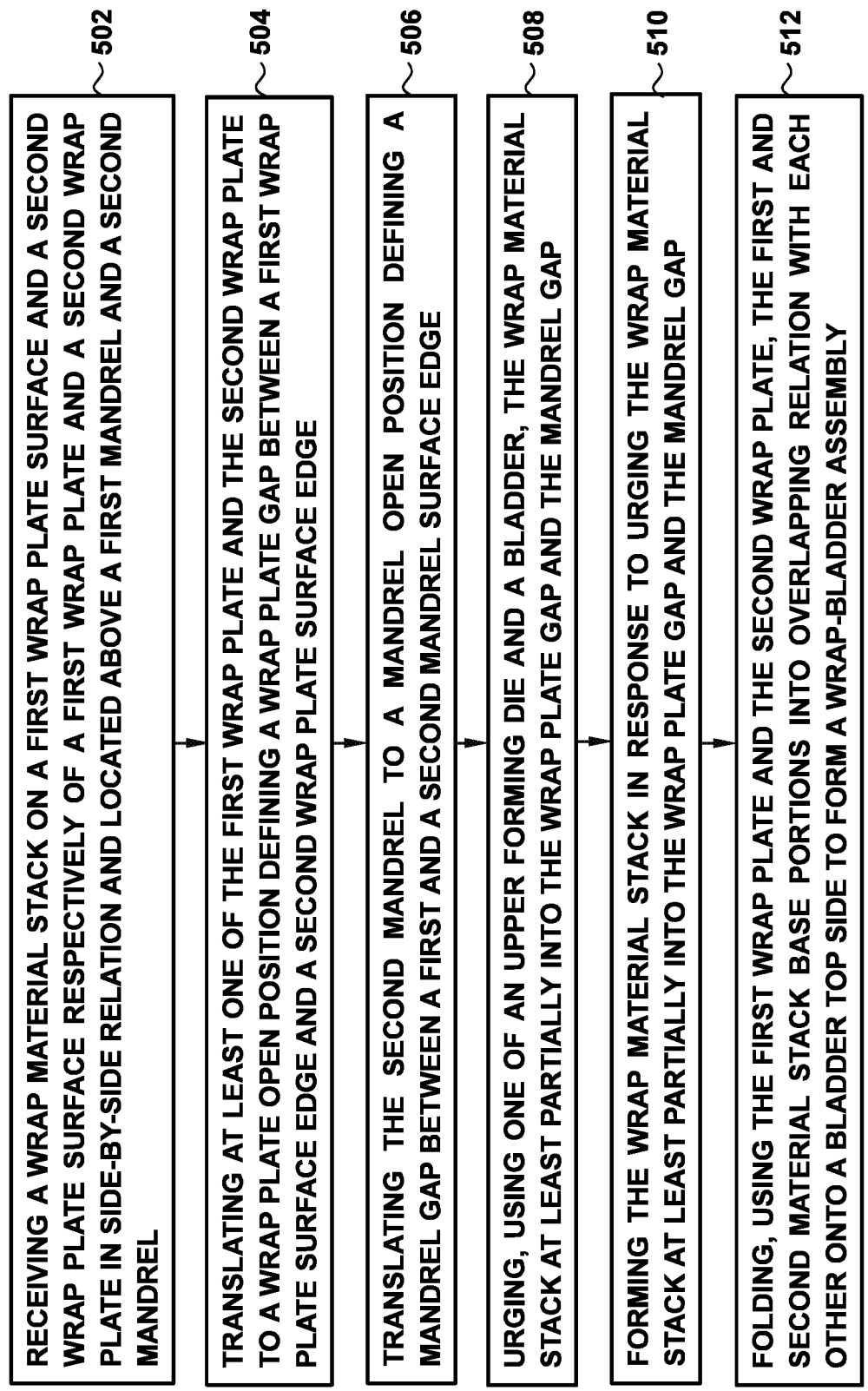
FIG. 29 is a flowchart of operations included in a method of manufacturing a wrap-bladder assembly.

Referring to FIG. 29, shown is a flowchart of a method 500 of manufacturing a wrap-bladder assembly 480. Step 502 of the method 500 includes positioning a first wrap plate 170 and a second wrap plate 180 in parallel side-by-side relation to each other such that the first wrap plate surface edge 174 and the second wrap plate surface edge 184 are in close proximity to each other, as shown in FIG. 5. As described above, the first wrap plate 170 and the second wrap plate 180 are positioned above the first mandrel 120 and the second mandrel 126 which may be in parallel side-by-side relation to each other.

Referring to FIGS. 6-7, step 502 of the method 500 includes receiving the wrap material stack 450 on the first wrap plate surface 172 and the second wrap plate surface 182. The wrap material stack 450 is comprised of the wrap laminate 464 which may include one or more uncured composite plies 402. In addition, the wrap material stack 450 includes the bladder treatment 466 on top of the wrap laminate 464. In the presently-disclosed example, the bladder treatment 466 is a release layer 470 on top of the wrap laminate 464 and a breather layer 468 on top of the release layer 470. However, the bladder treatment 466 may include any one of a variety of different types of layers.

Step 502 of receiving the wrap material stack 450 on the first wrap plate surface 172 and the second wrap plate surface 182 may be performed by laying up the wrap material stack 450 using one or more lamination heads 220. For example, as shown in FIGS. 4-6, the method may include supporting one or more lamination heads 220 above the collective first wrap plate 170 or the second wrap plate 180. In addition, the method may include translating the first wrap plate 170 and the second wrap plate 180 to the wrap plate closed (e.g., FIG. 5) in which the first wrap plate surface edge 174 and the second wrap plate surface edge 184 are in side-by-side abutting contact with each other to define the collective wrap plate surface 190. The method may additionally include dispensing the composite material 232 and the bladder treatment 466 from the lamination heads 220 to form the wrap material stack 450. In the example shown, a first lamination head 220 is configured to dispense composite material 232 to lay up one or more composite plies 402 in stacked formation to form the wrap laminate 464. A second lamination head 220 is configured to dispense release material 236 for laying up the release layer 470. A third lamination head 220 is configured to dispense breather material 234 for laying up the breather layer 468. However, as mentioned above, the manufacturing system 100 may include any number of lamination heads 220 for forming the wrap material stack 450. In addition, the lamination heads 220 may be laterally offset 472 from each other such that the overlaps 474 (e.g., FIG. 18) on the bladder top side 302 are offset from each other. In some examples, the method 500 may include securing certain layers of the wrap material stack 450 in position on the first and second wrap plate 170, 180 during the laying up of the wrap material stack 450. For example, although not shown, the manufacturing system 100 may implement one or more mechanisms (not shown) such as one or more clamp bars configured to clamp one or both of the opposing ends or sides of the release layer 470 in position on the wrap laminate 464 prior to laying up the breather layer 468. Alternatively or additionally, the first and second wrap plate 170, 180 may include apertures (not shown) for drawing a vacuum on one or more of the layers of the wrap material stack 450 to prevent movement during layup. The tack (e.g., adhesiveness) of the resin in the wrap laminate 464 may also assist in preventing movement of the layers of the wrap material stack 450 during layup.

Referring to FIGS. 8-9, step 504 of the method 500 includes translating the first wrap plate 170 and/or the second wrap plate 180 to the wrap plate open position 196 defining the wrap plate gap 198 between the first wrap plate surface edge 174 and the second wrap plate surface edge 184. The wrap plate gap 198 is sized to receive the upper forming die 254 as part of the process of forming the wrap material stack 450 into a forming die contour for receiving the bladder 300.

Referring to FIG. 9, step 506 of the method 500 includes translating the second mandrel 126 along a direction perpendicular to the second mandrel surface edge 130 to the mandrel open position 136. As described above, the mandrel open position 136 defines the mandrel gap 138 between the first mandrel surface edge 124 and the second mandrel surface edge 130. In an alternative example, step 506 of the method 500 may include translating both the first mandrel 120 and the second mandrel 126 translate away from each other to define the mandrel gap 138. The method may further include receiving the lower forming die 270 within the mandrel gap 138 as shown in FIG. 10. In the example shown, the lower die web portions 272 may be upwardly translated into position within the mandrel gap 138.

Referring to FIGS. 11-12, step 508 of the method 500 includes urging, using the bladder 300 or the upper forming die 254, the wrap material stack 450 at least partially into the wrap plate gap 198 and the mandrel gap 138. The method may include translating the upper forming die 254 downwardly into contact with the wrap material stack 450. In addition, step 508 may include urging, using the upper forming die 254, the wrap material stack 450 into the wrap plate gap 198 and the mandrel gap 138 and against the lower forming die 270 to at least partially form the wrap material stack 450. The method may further include supporting the wrap material stack 450 against compaction pressure applied to the wrap material stack 450 by the upper forming die 254.

Referring to FIGS. 12-14, step 510 of the method 500 includes forming the wrap material stack 450 in response to urging the wrap material stack 450 at least partially into the wrap plate gap 198 and the mandrel gap 138, and resulting in the first and second material stack base portions 452, 456 extending at least partially out of the wrap plate gap 198. After forming is complete, the method may include removing the upper forming die 254 from the wrap material stack 450 inside the lower forming die 270, and installing the bladder 300 into the wrap material stack 450 as shown in FIG. 13. As mentioned above, the upper forming die 254 and the bladder 300 may each be laterally translatable along the upper crossbeam 262 as shown in FIG. 13. In addition, the upper forming die 254 is vertically movable via the upper die actuator 264, and the bladder 300 is vertically movable via the bladder actuator 266. As shown in FIG. 14, bladder 300 may be detachably coupled to the actuator rod 268 to allow the bladder 300 to remain within the wrap material stack 450 after forming, and allowing the actuator rod 268 to be retracted away from the bladder 300 by the bladder actuator 266.

Referring to FIGS. 15-16, step 512 of the method 500 includes folding, using the first wrap plate 170 and the second wrap plate 180, the first material stack base portion 452 and second material stack base portion 456 into overlapping relation with each other onto the bladder top side 302 to form the wrap-bladder assembly 480. In some examples, step 512 may include 15-16 translating the first wrap plate 170 and the second wrap plate 180 back-and-forth over the bladder top side 302 in an alternating manner. For example, the first wrap plate 170 may be translated (e.g., via the wrap plate actuators 192) over the bladder top side 302, moving along a direction toward the second wrap plate 180 and urging the first material stack base portion 452 to fold over onto the bladder top side 302, after which the second wrap plate 180 may be translated along a direction toward the first wrap plate 170 causing the second wrap plate 180 to urge the second material stack base portion 456 to fold over onto the first material stack base portion 452 while the first wrap plate 170 retracts. As an alternative to the first wrap plate 170 retracting while the second wrap plate 180 extends, the first wrap plate 170 may remain stationary in position over the bladder top side 302 while the second wrap plate 180 folds the second material stack base portion 456 over the first wrap plate 170, thereby allowing the first wrap plate 170 to hold down the first material stack base portion 452 and thereby prevent the first material stack base portion 452 from springing back up toward its original position which would undesirably allow the second wrap plate 180 to fold the first material stack base portion 452 away from its folded position on the bladder top side 302.

After completion of the folding process, the wrap-bladder assembly 480 may be removed from the manufacturing system 100 and may be installed in a stringer laminate 400 which may be separately laid up and formed into a cross-sectional contour that is complementary to the cross-sectional contour of the wrap-bladder assembly 480 (e.g., FIG. 53). The wrap-bladder assembly 480 and the stringer laminate 400 may be co-bonded or co-cured as an assembly. Alternatively or additionally, one or more assemblies of the wrap-bladder assembly 480 and stringer laminate 400 (e.g., FIG. 53) may be co-bonded or co-cured with a skin member 422 (e.g., FIG. 54) to form a stiffened composite structure 420 (FIG. 54).

Referring to FIGS. 21-25, an alternative example of folding the wrap material stack 450 may include alternately rotating at least a portion of the first wrap plate 170 and the second wrap plate 180 about a pivot axis 195 located respectively proximate the first wrap plate surface edge 174 and the second wrap plate surface edge 184. In an example not shown, an entirety of the first wrap plate 170 and an entirety of the second wrap plate 180 may be configured to rotate approximately 180 degrees for respectively folding the first material stack base portion 452 and second material stack base portion 456 on top of the bladder top side 302. In the example shown, the first wrap plate 170 and second wrap plate 180 each have a wrap plate folding element 194. The wrap plate folding element 194 of the first wrap plate 170 may be configured to rotate (e.g., approximately 180 degrees) to flip the first material stack base portion 452 onto the bladder top side 302, after which the wrap plate folding element 194 of the second wrap plate 180 may rotate (e.g., approximately 180 degrees) to flip the second material stack base portion 456 onto the first material stack base portion 452 over the bladder top side 302.

Referring briefly to FIG. 17-18, the method 500 may further include heating the first material stack base portion 452 and/or the second material stack base portion 456 when overlapped on the bladder top side 302. As described above, heat 187 may be applied using a heating device 186 of the first wrap plate 170 and/or the second wrap plate 180. As a result of the application of heat 187, the method may include at least partially bonding together the first material stack base portion 452 and second material stack base portion 456. More specifically, the application of heat 187 may result in bonding together the overlapped edges of the wrap laminate 464 as a means for securing the wrap material stack 450 around the bladder 300.

In FIG. 18, the method 500 of manufacturing the wrap-bladder assembly 480 may include internally pressurizing the bladder 300 after folding the first material stack base portion 452 and second material stack base portion 456 into overlapping relation with each other on the bladder top side 302. The bladder 300 may be internally pressurized while either the first wrap plate 170 or second wrap plate 180 is positioned over the bladder top side 302. The method may include compacting the wrap laminate 464 against the lower forming die 270 and against the second wrap plate 180 as a result of internally pressurizing the bladder 300. The internal pressurization of the bladder 300 may result in consolidating the wrap laminate 464. In addition, the internal pressurization of the bladder 300 may reduce or prevent wrinkling of the composite material 232 of the wrap laminate 464, and may also improve the bond between the first material stack base portion 452 and second material stack base portion 456. As described above, FIG. 20 shows an example of the wrap-bladder assembly 480 formed in a cross-section having a trapezoidal shape 306. However, as described above, the wrap-bladder assembly 480 may be formed in a variety of other shapes including, but not limited to, a square shape 308 (FIG. 26), a triangular shape 310 (FIG. 27), and a dome shape 312 (FIG. 20).

Figure 40:
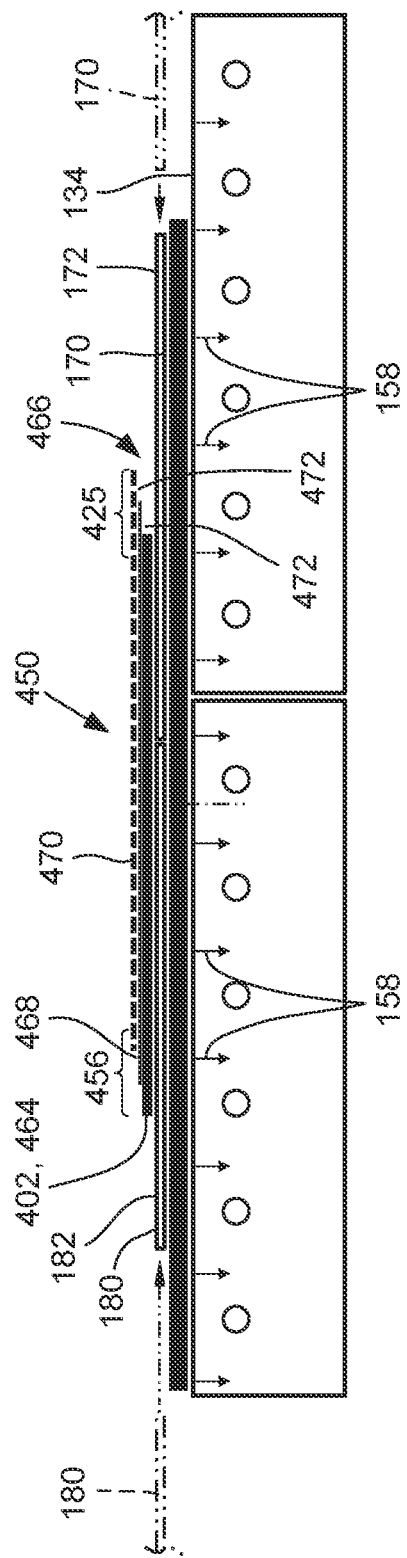
FIG. 40 is a simplified view of the encircled region identified by reference numeral 40 of FIG. 38 and illustrating the wrap material stack on top of the first wrap plate and the second wrap plate which are supported on the stringer laminate laid up on the first mandrel and the second mandrel.
Figure 41:
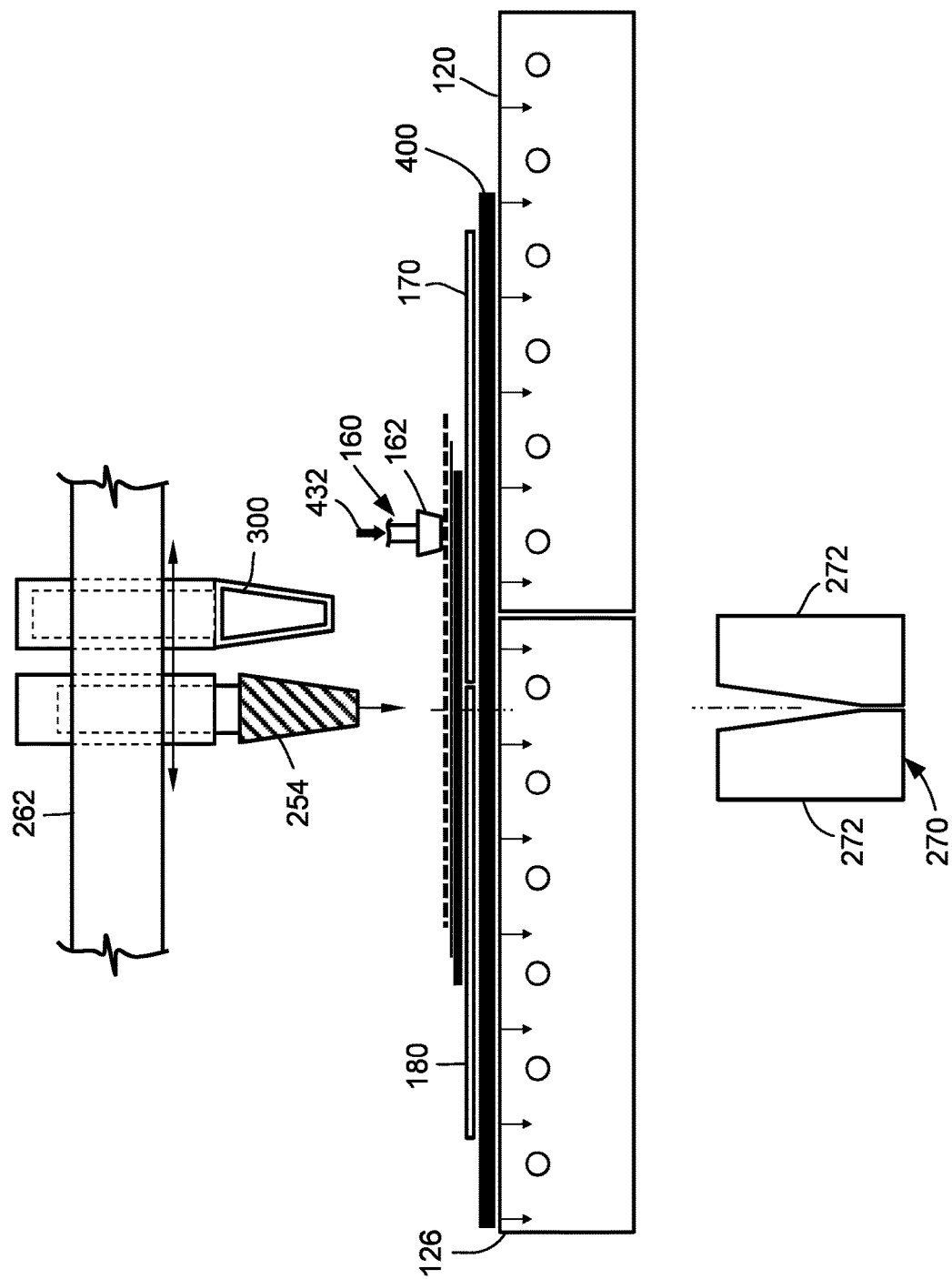
FIG. 41 is an end view of the manufacturing system showing the upper forming die and adjacently-located bladder vertically lowered into position above the wrap material stack and further illustrating the lower forming die in position below the first mandrel and the second mandrel.

Referring now to FIGS. 30-52, shown is an example of the manufacturing system 100 implemented for forming a stringer-wrap-bladder assembly 490 (FIG. 53), and which is similar to the above-described example of the manufacturing system 100 (e.g., FIGS. 1 and 5) for forming the wrap-bladder assembly 480 (FIG. 20), with the exception that the manufacturing system 100 in FIGS. 30-52 is shown supporting a stringer laminate 400 on the first mandrel 120 and second mandrel 126 prior to receiving the wrap material stack 450 (e.g., FIGS. 39-40) on the first wrap plate 170 and second wrap plate 180. As shown in FIG. 41, the first wrap plate 170 and second wrap plate 180 are respectively supported on the stringer laminate 400, which is supported on the first mandrel 120 and second mandrel 126. As shown in FIGS. 42-46 and described below, the wrap material stack 450 and the stringer laminate 400 are co-formed into the desired stringer cross-sectional shape in a manner similar to the above-described process for forming the wrap material stack 450 as shown in FIGS. 8-13. In FIGS. 48-51 and described below, the first wrap plate 170 and the second wrap plate 180 are implemented for folding the wrap material stack 450 over the bladder top side 302 in a manner similar to the above-described process shown in FIGS. 15-18. Advantageously, the ability to layup and co-form the stringer laminate 400 with the wrap material stack 450 on the presently-disclosed manufacturing system 100 (FIG. 30) may eliminate the need for separate stations otherwise required to separately layup and form the stringer laminate 400 and the wrap material stack 450.

Figure 30:
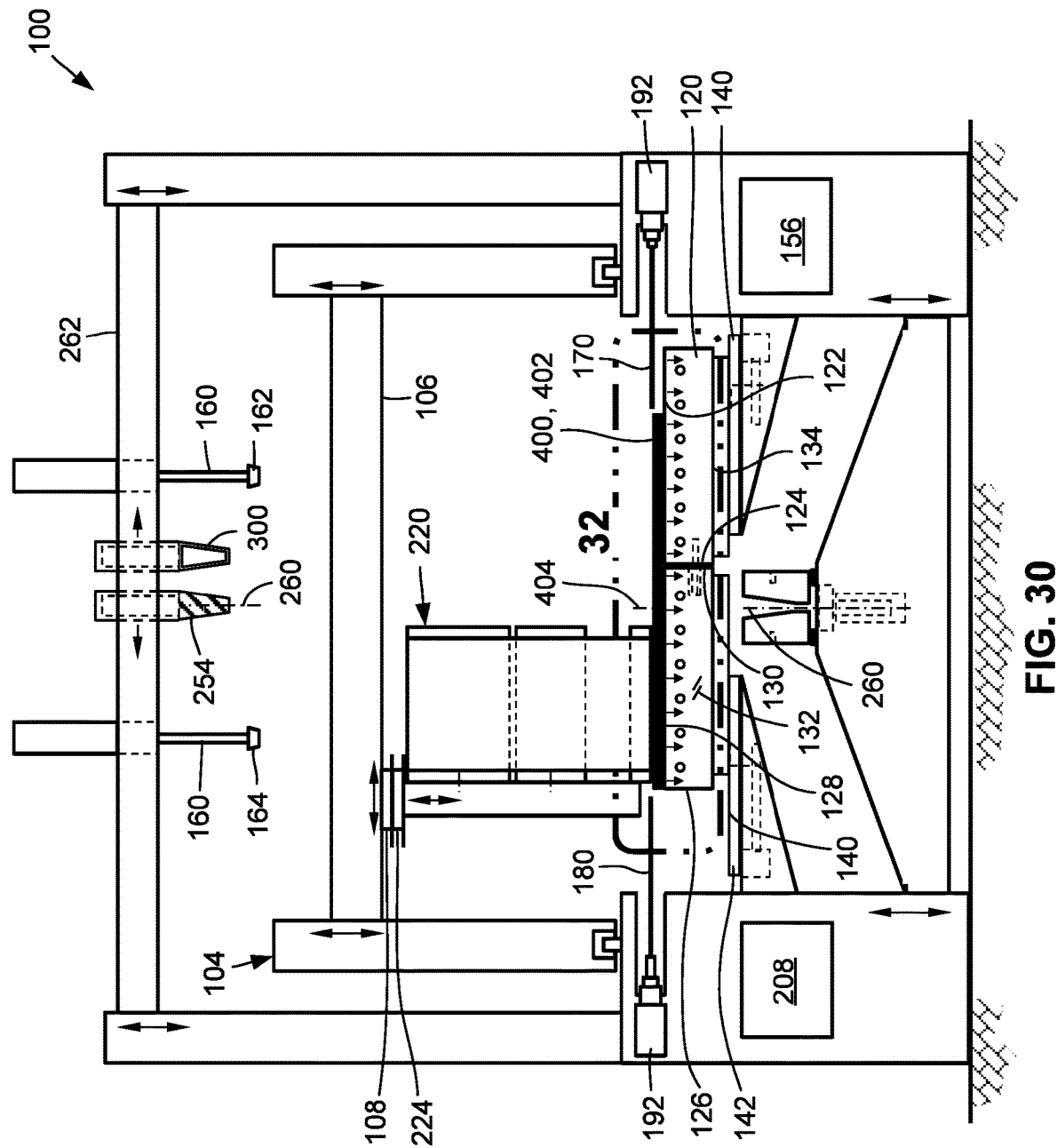
FIG. 30 is an end view of the manufacturing system showing a lamination head for laying up a stringer laminate on the first mandrel and the second mandrel.
Figure 31:
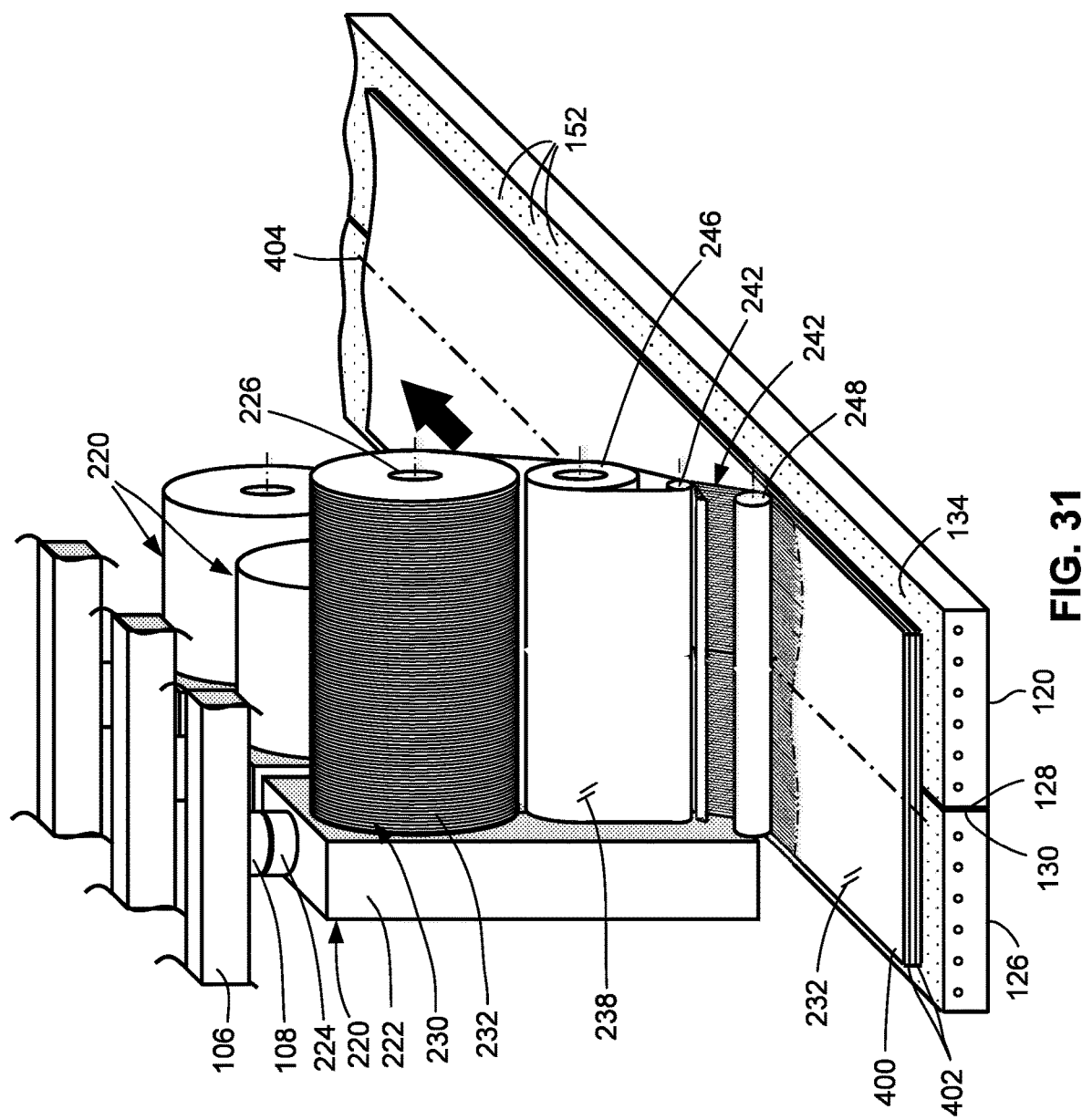
FIG. 31 is a perspective view of the lamination head laying up the stringer laminate and further illustrating currently inactive lamination heads for forming the wrap laminate.
Figure 32:
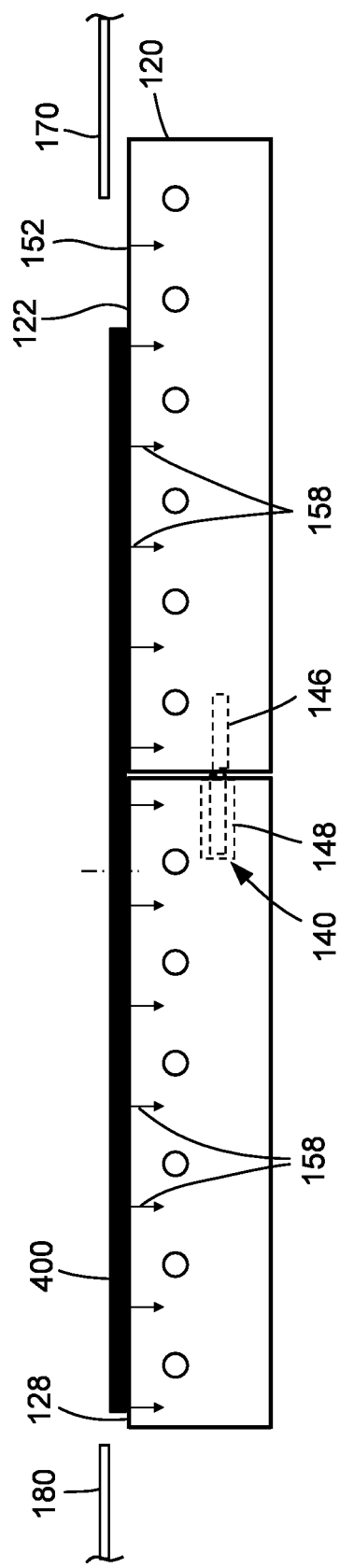
FIG. 32 is a simplified view of the encircled region identified by reference numeral 32 of FIG. 30 and illustrating the stringer laminate laid up on first mandrel and the second mandrel.

In FIGS. 30-31, the first mandrel 120 and the second mandrel 126 are shown in the mandrel closed position 132 in which the first mandrel surface edge 124 and the second mandrel surface edge 130 are in side-by-side abutting contact to form the collective mandrel surface 134 defined by the first mandrel surface 122 and the second mandrel surface 128. The collective mandrel surface 134 may be continuous in the sense that there may be no steps, gaps, breaks, interruptions, and/or discontinuities in the collective mandrel surface 134 such that no part of the stringer laminate 400 is unsupported during layup and optional trimming, and which may improve the precision with which the stringer laminate 400 is laid up and optionally trimmed. As described above, the manufacturing system 100 may include one or more alignment mechanisms 140 for maintaining vertical alignment of the first mandrel surface 122 with the second mandrel surface 128. For example, as described above, the first mandrel 120 and the second mandrel 126 may be supported on lateral rails 142 and maintain alignment during movement of the first mandrel 120 and second mandrel 126. Alternatively or additionally, the first mandrel 120 and second mandrel 126 may include a pin 146 and socket 148 arrangement (FIG. 32) for maintaining vertical alignment of the first mandrel surface 122 with the second mandrel surface 128 when in the closed position as shown in FIG. 32.

Figure 39:
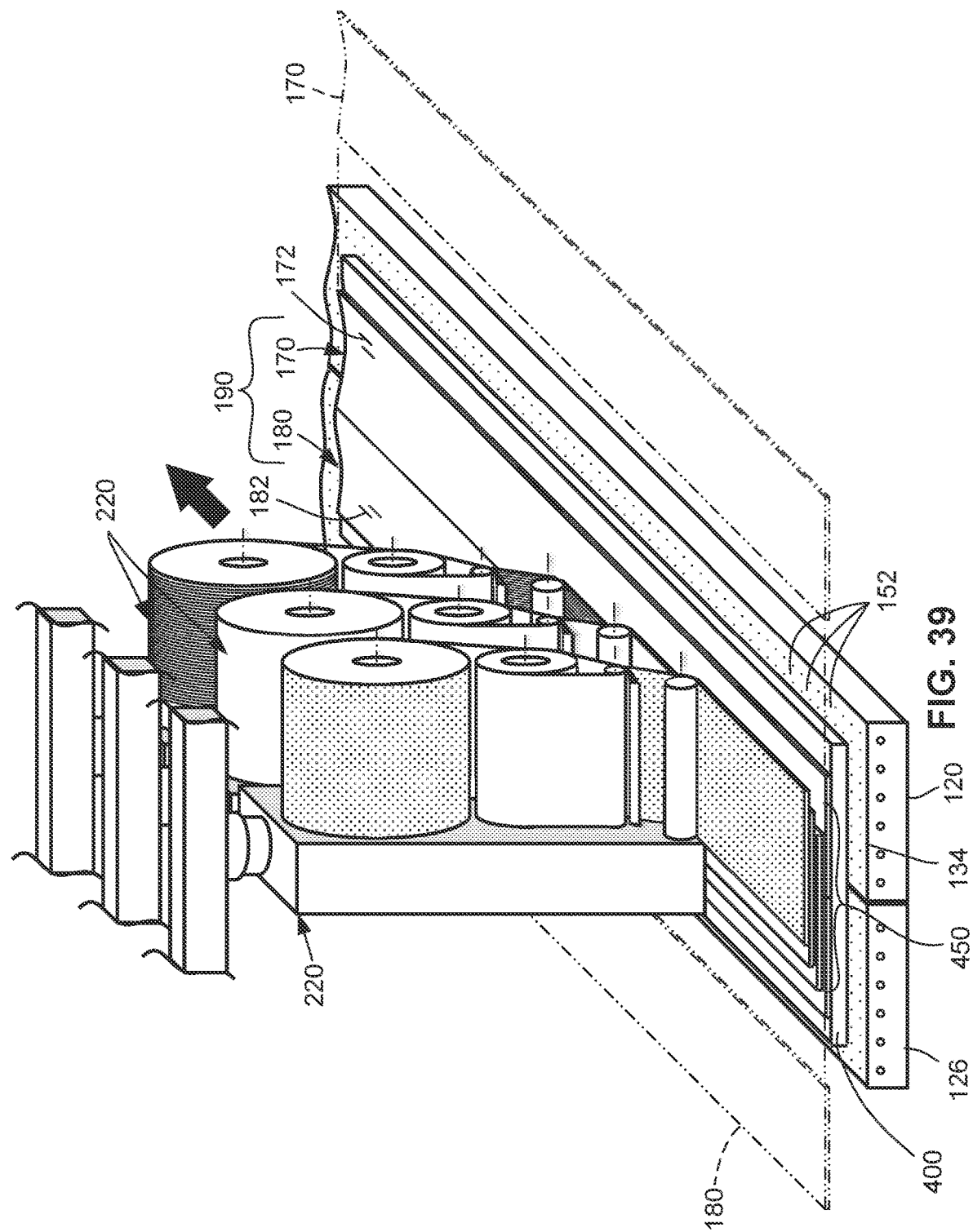
FIG. 39 is a perspective view of the lamination heads laying up the wrap material stack on the first wrap plate and the second wrap plate which are supported on the stringer laminate.

Referring still to FIGS. 30-31, the first wrap plate 170 and the second wrap plate 180 are configured to translate away from each other (e.g., retract via the wrap plate actuators 192) and expose the collective mandrel surface 134. The collective mandrel surface 134 is configured to receive the stringer laminate 400 prior to the first wrap plate surface 172 and the second wrap plate surface 182 receiving the wrap material stack 450 (FIG. 39). The stringer laminate 400 may be comprised of one or more uncured composite plies 402 (e.g., carbon-fiber prepreg) arranged in a desired ply stacking sequence. The stringer laminate 400 may have a greater width than the wrap material stack 450 as shown in FIGS. 39-40 to define the first stringer flange portion 406 and second stringer flange portion 408 as shown in FIG. 53. As shown in FIGS. 39-51, the stringer laminate 400 may support the first wrap plate 170 and the second wrap plate 180 during the layup of the wrap material stack 450 and during the co-forming of the stringer laminate 400 and wrap material stack 450, as described below.

In FIGS. 30-34, the manufacturing system 100 may include at least one lamination head 220 supportable above the first mandrel 120 and the second mandrel 126 for laying up the stringer laminate 400. In the example shown, the lamination head 220 for laying up the stringer laminate 400 may be supported on the same gantry 104 that may support one or more lamination heads 220 for subsequently laying up the wrap material stack 450 after the laying up of the stringer laminate 400 is complete. As described above and shown in FIGS. 2-3, the manufacturing system 100 may include a staging area 281 (FIGS. 33-34) at one or both ends of the manufacturing system 100 for supporting replacement lamination heads 220 or other types of devices such as a trimming device 250. The staging area 281 may provide a location for storing replacement lamination heads 220 or other types of devices for substitution with one or more of the lamination heads 220 on the gantry 104.

In FIGS. 30-31, the lamination head 220 for laying up the stringer laminate 400 may be configured similar to the above-described lamination heads 220 for laying up the wrap material stack 450 as shown in FIGS. 4-6. For example, the lamination head 220 in FIGS. 30-31 may include a material supply drum 226 for supporting a material roll 228 of layup material 230 (e.g., composite material 232). In addition, the lamination head 220 may include one or more redirect rollers 240 for guiding the layup material 230 through the components of the lamination head 220. In addition, the lamination head 220 may include a cutter assembly 244 for cutting the layup material 230, and a backing layer separation assembly 242 (FIG. 4) for removing a backing layer 238 that may be included with layup material 230 (e.g., composite material 232). The lamination head 220 may also include a compaction device 248 for compacting the layup material 230 onto the collective mandrel surface 134. In addition, the lamination head 220 may include a backing layer collection drum 246 for winding up the backing layer 238 after separation from the composite material 232.

In FIGS. 30-31, the lamination head 220 may be configured to dispense prepreg composite material 232 onto the collective mandrel surface 134 to form the stringer laminate 400. However, the gantry 104 may be configured to support additional lamination heads 220 for laying up the stringer laminate 400, such as one or more lamination heads 220 configured to dispense different types or widths of composite material 232 or different types of layup material 230. For example, in addition to the (FIGS. 30-31) lamination head 220 for dispensing composite material 232, the gantry 104 may include a lamination head 220 configured to dispense an adhesive material (not shown) to form an adhesive layer (not shown) on the stringer laminate 400 for improving the tack between the stringer laminate 400 and the wrap laminate 464 and/or to improve the tack between the stringer laminate 400 and a skin member 422 (FIG. 54) to which the stringer-wrap-bladder assembly 490 may be co-bonded or co-cured to form a stiffened composite structure 420 (FIG. 54). Although not shown, the manufacturing system 100 may be provided with two gantries 104 including a first gantry 104 supporting the one or more lamination heads 220 for laying up the stringer laminate 400, and a second gantry 104 for supporting the one or more lamination heads 220 for laying up the wrap material stack 450. Whichever of the gantries 104 is unused may be stored at one of the staging areas 281.

As described above, the manufacturing system 100 may include one or more laminate securing mechanisms 150 configured to non-movably secure the stringer laminate 400 in fixed position on the first mandrel 120 and/or the second mandrel 126 during the layup and optional trimming of the stringer laminate 400, and/or during the co-forming of the stringer laminate 400 and wrap material stack 450. Advantageously, the laminate securing mechanisms 150 may maintain the position of the stringer laminate 400 relative to the first mandrel surface edge 124 and the second mandrel surface edge 130 for accuracy in the positioning of the stringer laminate 400 during co-forming such that the stringer centerline 404 (FIGS. 30-31) is aligned with the die centerline 260 (FIG. 30) of the upper forming die 254 and/or the lower forming die 270.

As shown in FIGS. 30-32 and described above, the laminate securing mechanisms 150 may comprise a plurality of apertures 152 (FIG. 31) formed in at least one of the first mandrel surface 122 and the second mandrel surface 128. The apertures 152 may be fluidly coupled to a vacuum pressure source 156 (e.g., FIG. 30) for generating vacuum pressure 158 for securing the stringer laminate 400 to the first mandrel 120 and the second mandrel 126. For example, FIGS. 31-32 illustrate the application of vacuum pressure 158 for drawing the stringer laminate 400 against the first mandrel surface 122 and second mandrel surface 128 during the laying up of the stringer laminate 400 by the lamination head 220. As shown in FIGS. 38-52, the vacuum pressure 158 may be applied to the apertures 152 in the first mandrel 120 and/or the second mandrel 126 as required to facilitate the layup stringer laminate 400 and wrap material stack 450 and the co-forming of the stringer laminate 400 with the wrap material stack 450.

As shown in FIGS. 33-38 and 43-47 and described above, the laminate securing mechanisms 150 may comprise one or more pinch mechanisms 160 such as the first clamping bar 162 and/or the second clamping bar 164 which may extend along a lengthwise direction of the base members 102. The pinch mechanisms 160 may be configured to mechanically clamp the stringer laminate 400 to the first mandrel surface 122 and/or to the second mandrel surface 128 for restricting or preventing movement of the stringer laminate 400 relative to the first mandrel surface 122 and/or second mandrel surface 128. In some examples, the first clamping bar 162 and second clamping bar 164 may apply clamping pressure 432 through the first wrap plate 170 and/or second wrap plate 180 supported on the stringer laminate 400. The first clamping bar 162 and/or the second clamping bar 164 may be configured to bear against the wrap material stack 450 to non-movably secure both the wrap material stack 450 and the stringer laminate 400 in fixed position on the first mandrel 120 and/or the second mandrel 126 during co-forming of the stringer laminate 400 and wrap material stack 450.

Figure 42:
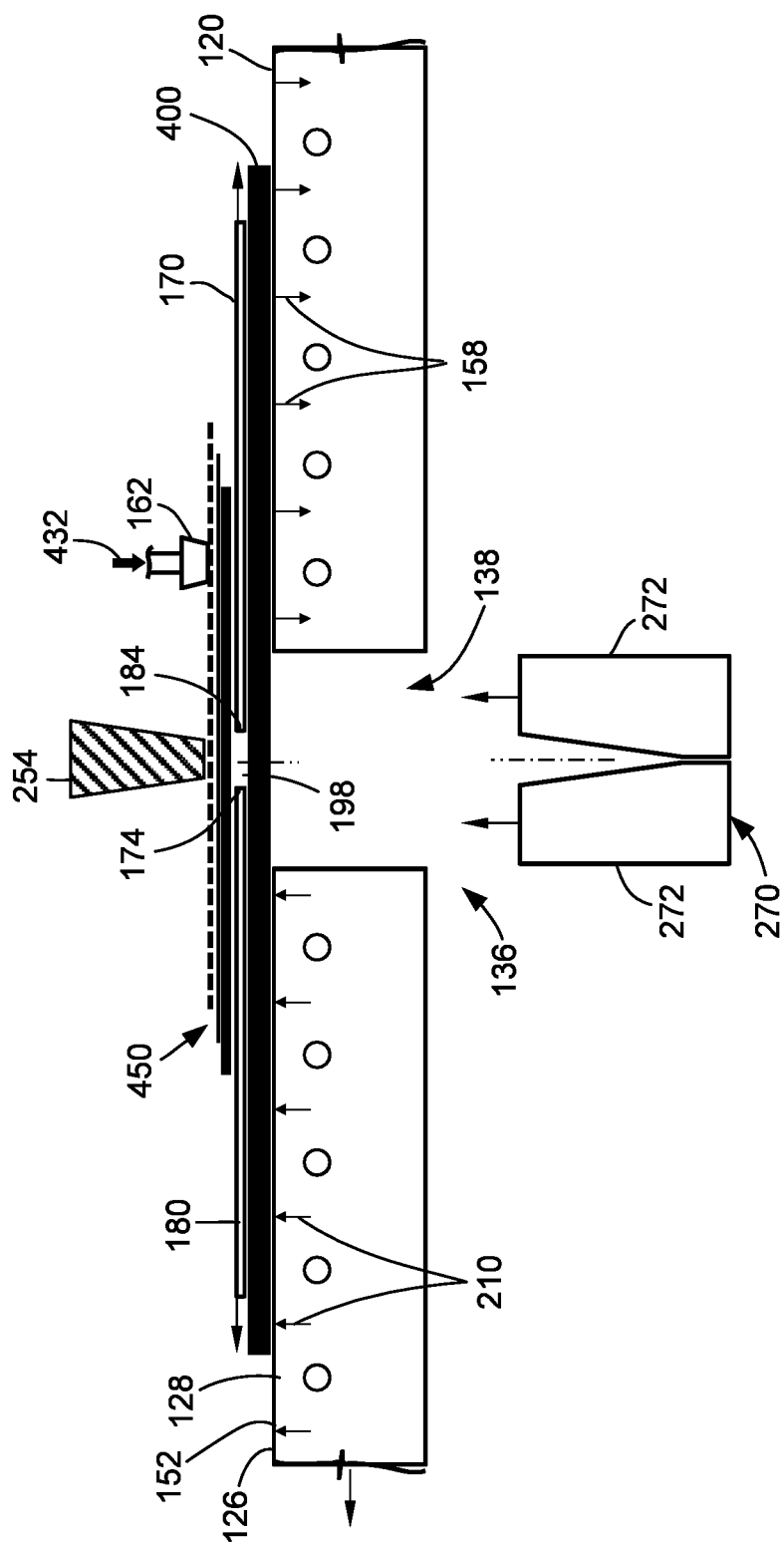
FIG. 42 is an end view of the manufacturing system showing the upper forming die moved into contact with the wrap material stack and further illustrating the second wrap plate translated to the wrap plate open position defining the wrap plate gap, and also illustrating the second mandrel translated to the mandrel open position defining the mandrel gap between the first mandrel and the second mandrel.

As shown in FIG. 42, the manufacturing system 100 may include one or more laminate releasing mechanisms 206 configured to release the stringer laminate 400 from the first mandrel surface 122 and/or the second mandrel surface 128 and thereby allow relative motion between the stringer laminate 400 and the first mandrel surface 122 and/or second mandrel surface 128. In FIG. 42, the laminate releasing mechanism comprises the application of positive air pressure 210 to the apertures 152 of the first mandrel 120 and/or the second mandrel 126 for urging the stringer laminate 400 away from the first mandrel 120 and/or the second mandrel 126. FIG. 42 illustrates the application of vacuum pressure 158 to non-movably secure the stringer laminate 400 in fixed position on the first mandrel 120 during translation of the second mandrel 126 to the mandrel open position 136.

Figure 35:
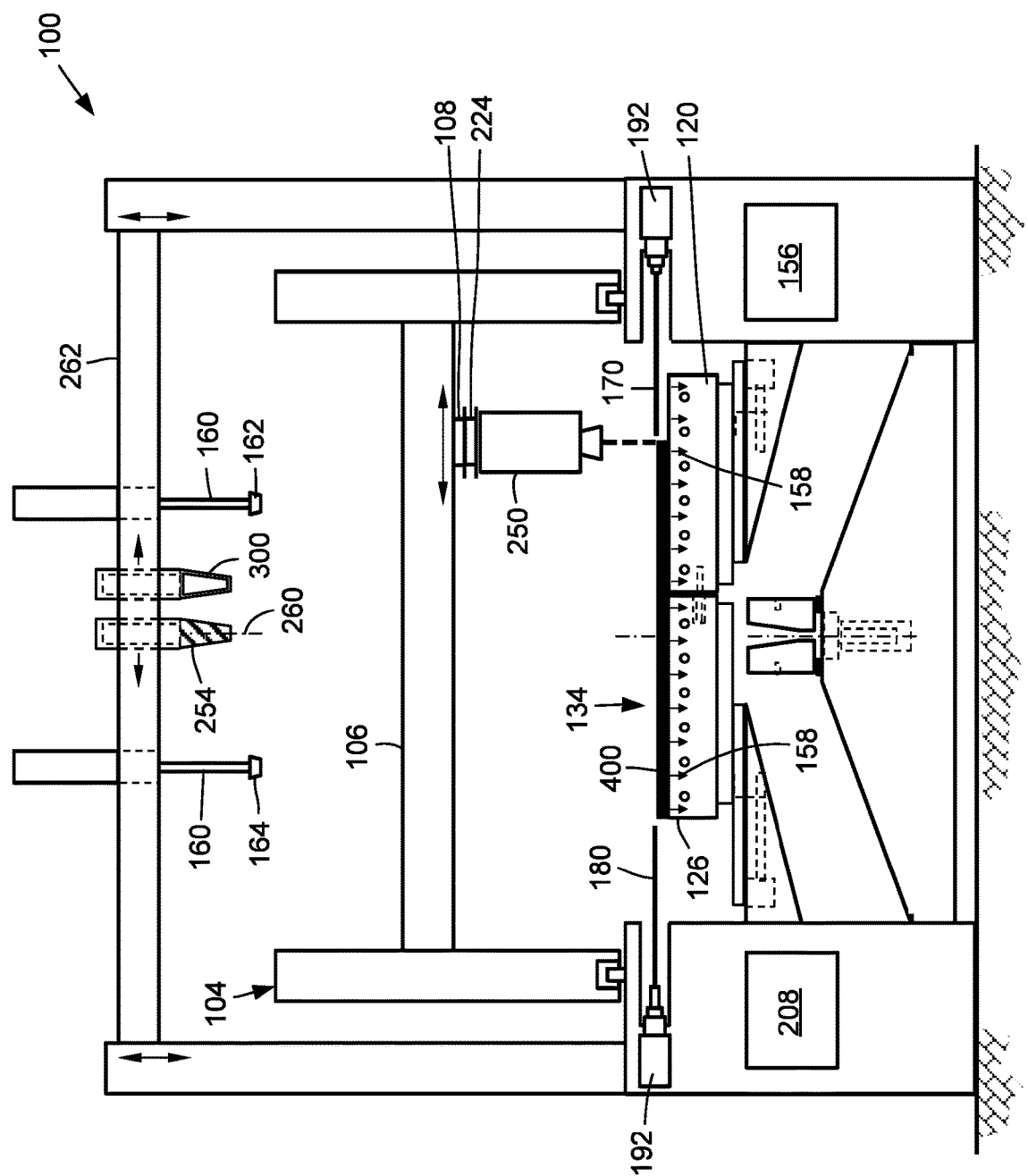
FIG. 35 is an end view of the manufacturing system showing the trimming device trimming the stringer laminate.

Referring to FIG. 35, the manufacturing system 100 may optionally include a trimming device 250 configured to trim the stringer laminate 400 on the collective mandrel surface 134 after layup is complete. The trimming may be performed prior to layup of the wrap material stack 450 on the first wrap plate 170 and second wrap plate 180. In some examples, the trimming device 250 may be stored at one of the staging areas 281. As described below, the gantry 104 may be configured to move to one of the staging areas 281 to replace one of the lamination heads 220 on the gantry 104 with the trimming device 250. The trimming device 250 may be movable by the gantry 104 along the lengthwise direction and lateral direction of the collective mandrel surface 134. The trimming device 250 may trim the stringer laminate 400 while supported on the collective mandrel surface 134. Although not shown, the method 500 may include trimming any one or more of the layers of the wrap material stack 464 during or after the laying up of the wrap material stack 464 on the first and second wrap plate 170, 180. For example, prior to forming and folding the wrap material stack 450, the manufacturing system 100 may include a trimming device 250 configured to perform net-shape or near-net-shape trimming of one or more layers of the wrap material stack 464 in a manner similar to the trimming device 250 shown in FIG. 35 and described below.

The trimming device 250 may be configured as an ultrasonic cutter, a laser cutter (not shown), a mechanical blade (not shown) or other configurations. The trimming device 250 may be configured to accurately trim the stringer laminate 400 into a symmetric or asymmetric shape (e.g., about the laminate centerline). The drawing of vacuum pressure 158 on the apertures 152 may fixedly secure the stringer laminate 400 in position on the collective mandrel surface 134 during trimming operations. The trimming device 250 may be configured to trim any number of a variety of different types of geometric features into the stringer laminate 400. For example, as shown in FIG. 53, the trimming device 250 may be configured to trim the perimeter of the stringer laminate 400 to form tabs 424 on each of opposing ends of the stringer laminate 400. After trimming is complete, the gantry 104 may move to one of the staging areas 281 (FIGS. 36-37) for substitution of the trimming device 250 with a lamination head 220 for use during the laying up of the wrap material stack 450.

Figure 38:
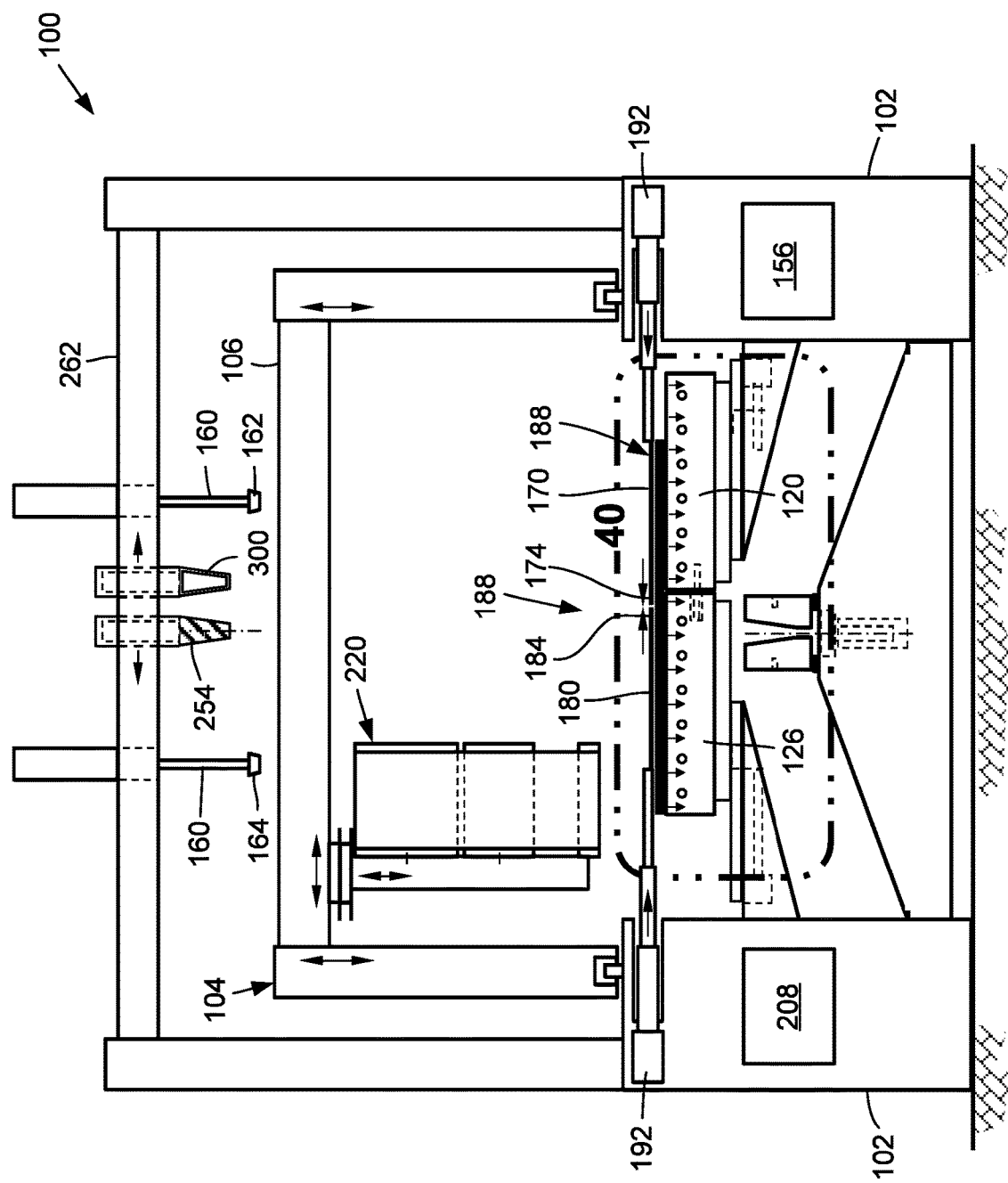
FIG. 38 is an end view of the manufacturing system showing the first wrap plate and the second wrap plate being translated into side-by-side relation to each other via the wrap plate actuators.

Prior to laying up of the wrap material stack 450, the first wrap plate 170 and second wrap plate 180 may be movable into the wrap plate closed position 188 by the wrap plate actuators 192 as shown in FIGS. 38-39. The first wrap plate 170 and second wrap plate 180 may be supported on the first mandrel 120 and second mandrel 126. FIG. 39 shows an example of the lamination heads 220 laying up the wrap material stack 450 over the collective wrap plate surface 190 defined by the first wrap plate 170 and second wrap plate 180 as described above with regard to FIG. 6. FIG. 40 shows the wrap material stack 450 on top of the first wrap plate 170 and the second wrap plate 180 which are supported on the stringer laminate 400.

Figure 55:
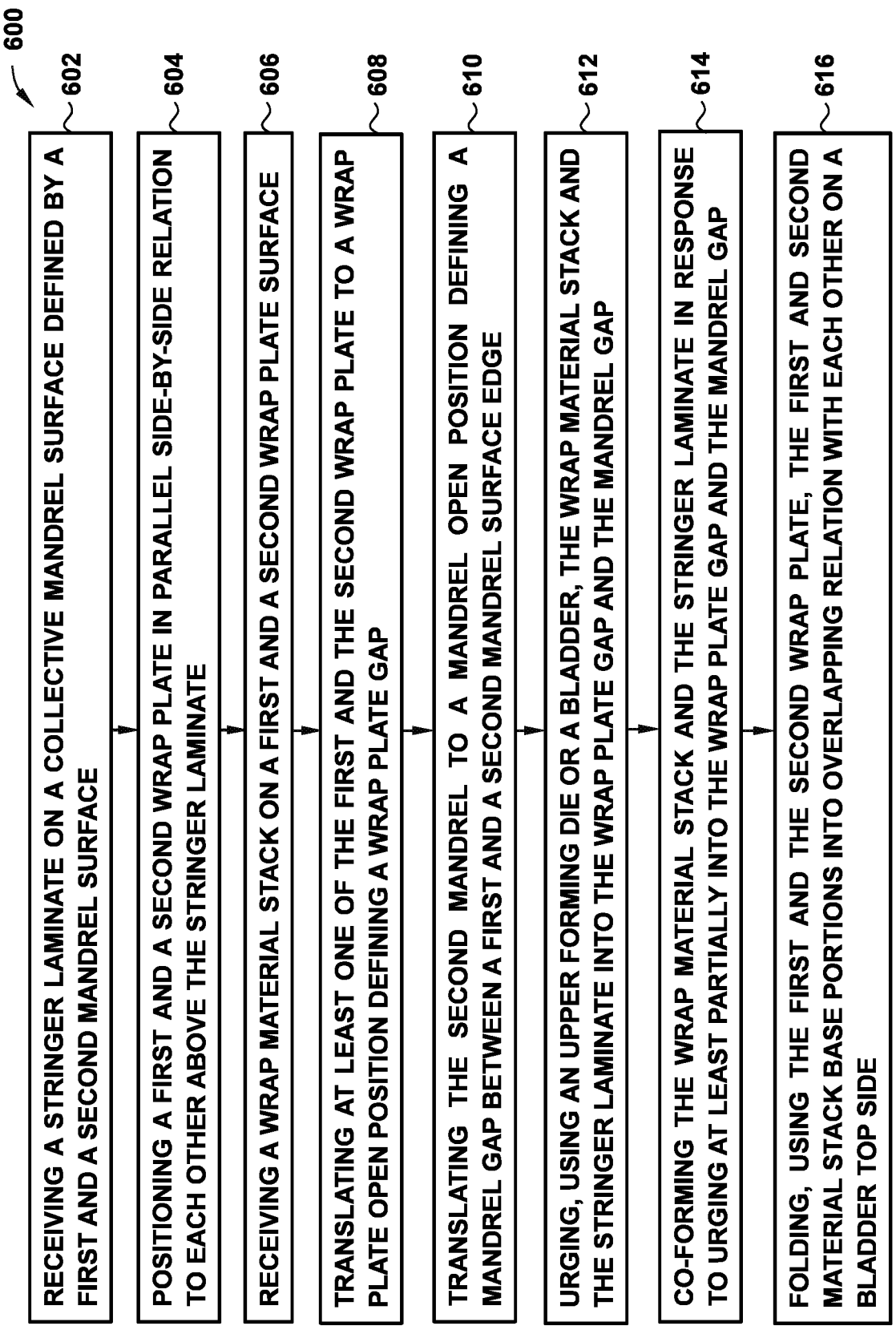
FIG. 55 is a flowchart of operations included in a method of manufacturing a stringer-wrap-bladder assembly.

Referring to the flowchart of FIG. 55 with additional reference to FIGS. 30-54, shown in FIG. 55 is a method 600 of manufacturing a stringer-wrap-bladder assembly 490 (FIG. 53) which is similar to the above-described method 500 of forming the wrap-bladder assembly 480 (FIG. 20), except that in manufacturing the stringer-wrap-bladder assembly 490, the first wrap plate 170 and second wrap plate 180 are supported on the stringer laminate 400 which is supported on the first mandrel surface 122 and the second mandrel surface 128. In addition, the layup and forming of the stringer laminate 400 and the wrapping of the bladder 300 may be performed on a single piece of equipment (e.g., the manufacturing system 100) with no need for a separate pick-in-place operation for installing a wrap-bladder assembly 480 into a formed stringer laminate 400 (e.g., FIG. 53).

Referring to FIGS. 30-32, the method 600 includes positioning the second mandrel surface edge 130 of the second mandrel 126 in the mandrel closed position 132 in side-by-side abutting contact with the first mandrel surface edge 124 of the first mandrel 120 to form the collective mandrel surface 134 defined by a first mandrel surface 122 and a second mandrel surface 128. The method may include maintaining, using one or more alignment mechanisms 140, vertical alignment between the first mandrel 120 and the second mandrel 126 such that the collective mandrel surface 134 is continuous during the layup, optional trimming, and during co-forming of the stringer laminate 400 with the wrap material stack 450. As mentioned above, the alignment mechanisms 140 may comprise the lateral rails 142 (FIG. 30) upon which the first mandrel 120 and second mandrel 126 are supported. Alternatively or additionally, the alignment mechanisms 140 may comprise a pin 146 and socket 148 arrangement (FIG. 32) located at spaced intervals along the length of the collective mandrel surface 134.

Referring still to FIGS. 30-32, step 602 of the method 600 includes receiving the stringer laminate 400 on the collective mandrel surface 134 after the first wrap plate 170 and the second wrap plate 180 have been translated away from each other by the wrap plate actuators 192 (FIG. 30) to expose the collective mandrel surface 134. In some examples, the stringer laminate 400 may be laid up at a separate lamination station (not shown) and then transported to the presently-disclosed manufacturing system 100 and installed on the collective mandrel surface 134. However, in the presently-disclosed example, step 602 of receiving the stringer laminate 400 on the collective mandrel surface 134 may include dispensing, from a lamination head 220, one or more plies of composite material 232 onto the collective mandrel surface 134 to lay up the stringer laminate 400 as shown in FIGS. 30-31. The lamination head 220 for laying up the stringer laminate 400 may have the same general configuration as the lamination heads 220 that are used for laying up the wrap material stack 450, except that the composite material 232 for the stringer laminate 400 may have a greater width (e.g., FIG. 31) than the width of the layup material 230 used in the laying up of the wrap material stack 450.

Figure 33:
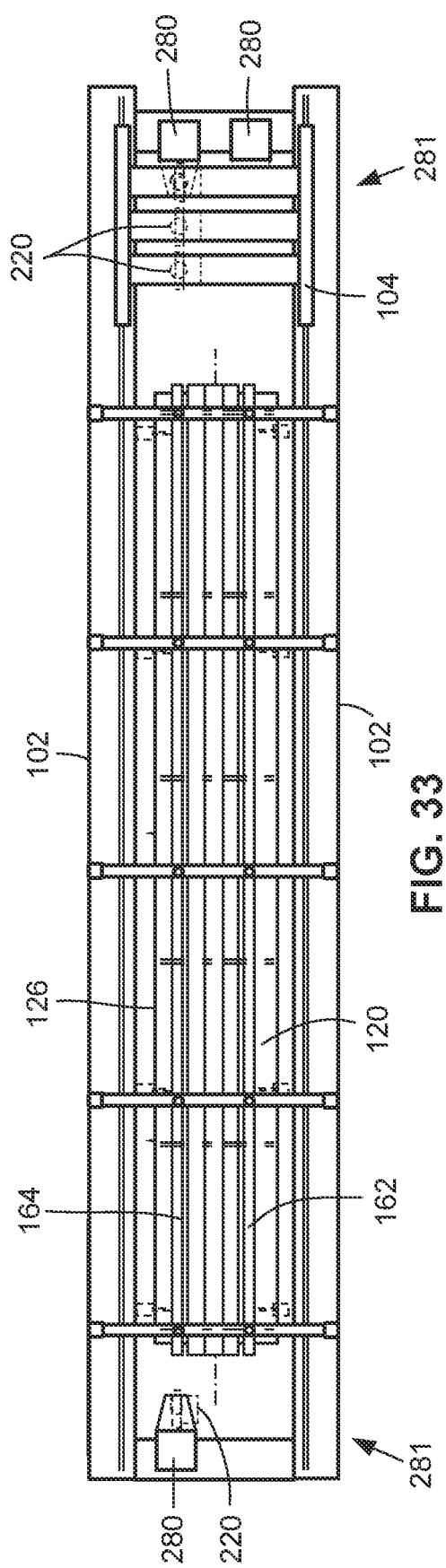
FIG. 33 is a top view of the manufacturing system showing the gantry moved into a staging area of the manufacturing system for exchanging one of the lamination heads for a trimming device.
Figure 34:
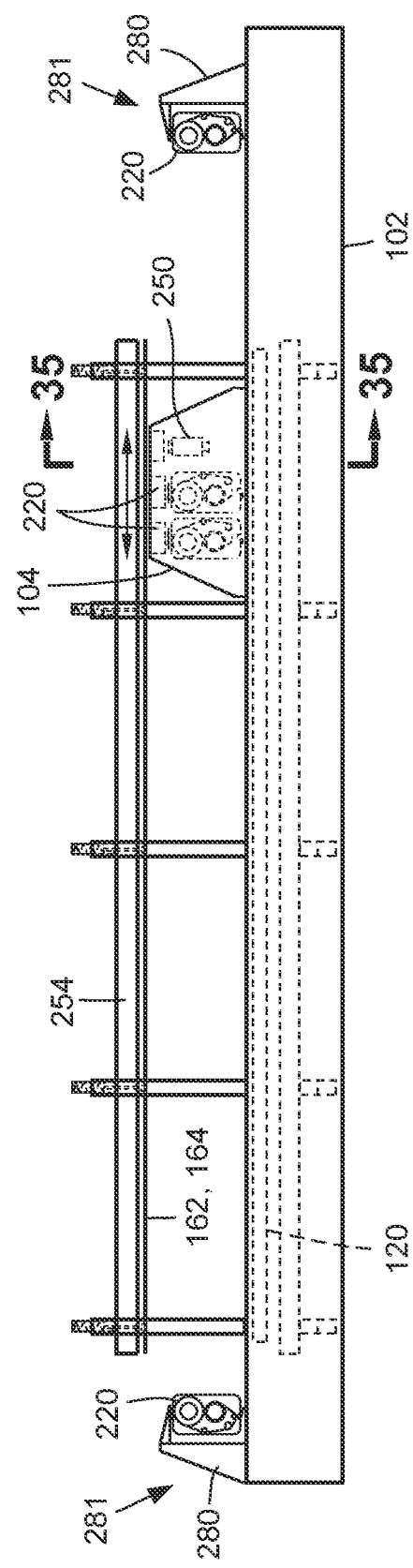
FIG. 34 is a side view of the manufacturing system of FIG. 33.

Referring to FIGS. 33-37, in some examples, the method may include trimming the stringer laminate 400 on the collective mandrel surface 134 after laying up the composite laminate. As described above, in some examples of the manufacturing system 100, a trimming device 250 (e.g., ultrasonic cutter) may be included for trimming the stringer laminate 400 prior to positioning the first wrap plate 170 and the second wrap plate 180 in parallel side-by-side relation to each other for receiving the wrap material stack 450. Such trimming device 250 may be stored in at least one staging area 281 that may be included with the manufacturing system 100. As shown in FIGS. 30-31, the gantry 104 may include a gantry coupling mechanism 108 configured to releasably couple to a device coupling mechanism 224 included with the trimming device 250 and with each lamination head 220. As shown in FIGS. 33-34, the gantry 104 may move to the staging area 281 and the device coupling mechanism 224 may allow for quick substitution of a stringer laminate 400 lamination head 220 for the trimming device 250 which may be supported on a device stand 280. After trimming of the stringer laminate 400 (FIG. 35), the gantry 104 may move back to the staging area 281 as shown in FIGS. 36-37 and the trimming device 250 may be replaced with a lamination head 220 for laying up the wrap material stack 450.

During any one of the operations performed on the stringer laminate 400, the method may include non-movably securing the stringer laminate 400 in fixed position on at least one of the first mandrel 120 and the second mandrel 126. For example, during laying up or trimming of the stringer laminate 400, the method may include applying vacuum pressure 158 (e.g., FIGS. 40-52) to the stringer laminate 400 to a plurality of apertures 152 formed in the first mandrel surface 122 an/or the second mandrel surface 128. The vacuum pressure 158 may draw the stringer laminate 400 against the collective mandrel surface 134 and thereby prevent movement of the stringer laminate 400. In FIG. 42, the stringer laminate 400 may be secured in fixed position on the first mandrel 120 during translation of the second mandrel 126 to the mandrel open position 136, as described below. As an alternative to or in addition to the application of vacuum pressure 158, the method may include mechanically clamping the stringer laminate 400 to the first mandrel surface 122 and/or the second mandrel surface 128 using one or more pinch mechanisms 160 as shown in FIGS. 41-47 and 50-52. In the presently-disclosed example, the pinch mechanisms 160 are shown as a first clamping bar 162 and a second clamping bar 164 for applying clamping pressure 432 onto the stringer laminate 400. However, the pinch mechanisms 160 may be provided in any one a variety of different arrangements, and are not limited to vertically movable clamping bars.

Referring to FIG. 38, step 604 of the method 600 includes positioning the first wrap plate 170 and the second wrap plate 180 in parallel side-by-side relation to each other such that the first wrap plate surface edge 174 and the second wrap plate surface edge 184 are in close proximity to each other in the wrap plate closed position 188. The first wrap plate 170 and the second wrap plate 180 may be extended into the wrap plate closed position 188 via the above-described wrap plate actuators 192.

Referring to FIGS. 39-40, step 606 of the method 600 includes receiving a wrap material stack 450 on the first wrap plate surface 172 and the second wrap plate surface 182. As described above, the wrap material stack 450 has a first material stack base portion 452 and a second material stack base portion 456, the wrap material stack 450 include the wrap laminate 464 which is comprised of one or more uncured composite plies 402. The wrap material stack 450 may also include the bladder treatment 466 on top of the wrap laminate 464. As shown in FIG. 6 and described above, the bladder treatment 466 may include a release layer 470 on top of the wrap laminate 464, and a breather layer 468 on top of the release layer 470. Step 606 may be performed by the lamination heads 220 shown in FIG. 39. As mentioned above, the lateral position of the lamination heads 220 may be offset from each other to result in an offset 472 in the layers of the wrap material stack 450 as shown in FIG. 40.

Referring to FIGS. 41-42, step 608 of the method 600 includes translating the first wrap plate 170 and/or the second wrap plate 180 to the wrap plate open position 196 defining the wrap plate gap 198 between the first wrap plate surface edge 174 and the second wrap plate surface edge 184. The wrap plate actuators 192 (FIG. 35) may position the first wrap plate 170 and/or the second wrap plate 180 such that wrap plate gap 198 has a width that is sized to receive a forming die such as the upper forming die 254 or the bladder 300.

Step 610 may include translating the second mandrel 126 along a direction perpendicular to the second mandrel surface edge 130 to the mandrel open position 136 defining the mandrel gap 138. However, as mentioned above, in an alternative example, both the first mandrel 120 and the second mandrel 126 may be translated to the mandrel open position 136. The lower die web portions 272 may be vertically translated into the mandrel gap 138. The method may include releasing the stringer laminate 400 from the second mandrel surface 128 to allow relative motion between the stringer laminate 400 and the second mandrel surface 128 during translation of the second mandrel 126 to the mandrel open position 136. Releasing the stringer laminate 400 from the second mandrel surface 128 may be performed by forcing air (e.g., positive air pressure 210) through the plurality of apertures 152 in the second mandrel surface 128 and fluidly coupled to the positive air pressure source 208. As mentioned above, vacuum pressure 158 may be drawn through the apertures 152 in the first mandrel surface 122 as a means to secure the stringer laminate 400 to the first mandrel 120 while the second mandrel 126 translates toward the mandrel open position 136. The first clamping bar 162 may apply clamping pressure 432 on the wrap material stack 450 and the first wrap plate 170 as a means to secure the stringer laminate 400 in fixed relation to the first mandrel 120 during translation of the second mandrel 126 relative to the stringer laminate 400.

Figure 45:
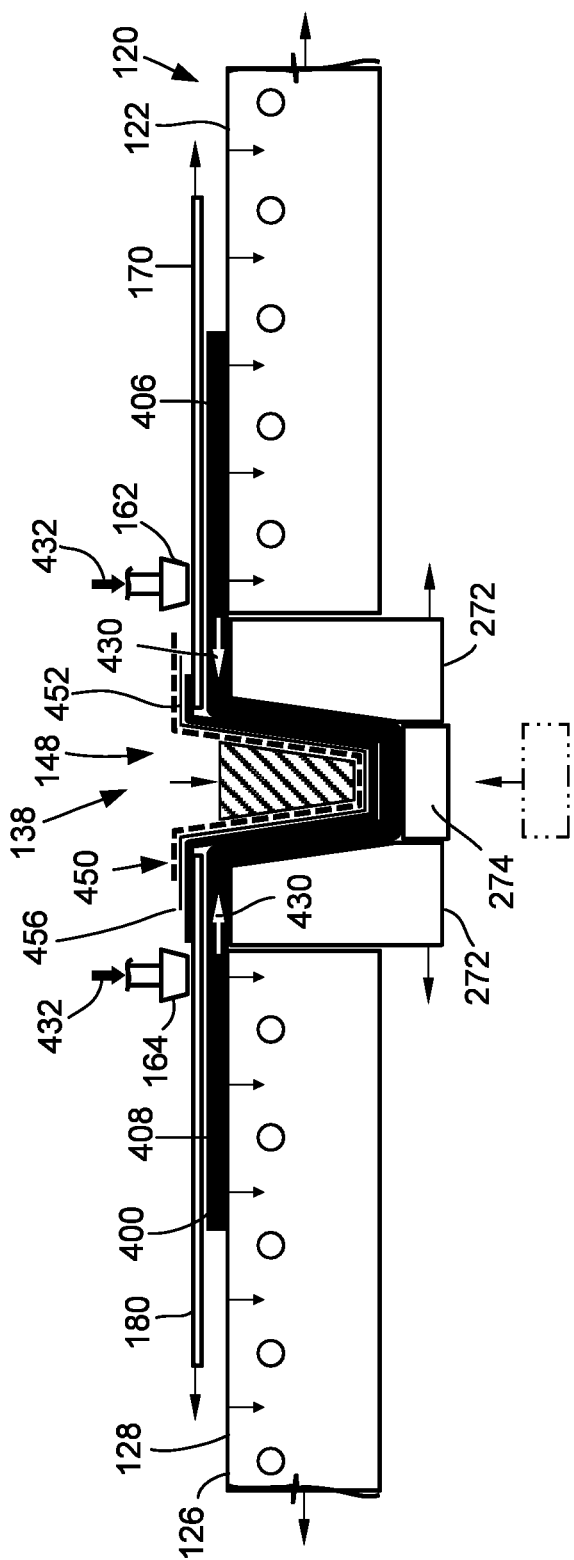
FIG. 45 is an end view of the manufacturing system showing the upper forming die completing the initial forming of the wrap material stack and the stringer laminate which is shown supported against the lower die cap portion.

Referring to FIGS. 43-45, step 612 of the method 600 includes urging the wrap material stack 450 and the stringer laminate 400 at least partially into the wrap plate gap 198 and the mandrel gap 138. For example, the upper forming die 254 or the bladder 300 may be vertically lowered to urge the wrap material stack 450 and stringer laminate 400 at least partially into the wrap plate gap 198 and mandrel. In FIG. 44, the first clamping bar 162 and the second clamping bar 164 may apply clamping pressure 432 over the wrap material stack 450 as the downward movement of the upper forming die 254 urges the wrap material stack 450 into the wrap plate gap 198 and mandrel gap 138 as a means to generate lateral tension 430 in the stringer laminate 400 and the wrap material stack 450 during the co-forming process shown in FIGS. 43-45.

Referring to FIG. 45, step 614 of the method 600 includes forming the wrap material stack 450 and the stringer laminate 400 in response to urging the wrap material stack 450 and the stringer laminate 400 at least partially into the wrap plate gap 198 and the mandrel gap 138 such that the first stringer flange portion 406 is captured between the first wrap plate 170 and first mandrel surface 122, and the second stringer flange portion 408 is captured between the second wrap plate 180 and second mandrel surface 128. FIG. 45 illustrates the lower die cap portion 274 vertically moved into position between the lower die web portions 272 to provide a surface against which the upper forming die 254 may apply compaction pressure on the stringer laminate 400 cap portion while simultaneously applying compaction pressure to the stringer laminate 400 web portions. The first material stack base portion 452 and the second material stack base portion 456 extend out of the wrap plate gap 198 and may be supported respectively above the first wrap plate 170 and second wrap plate 180. Although FIGS. 42-45 illustrate the upper forming die 254 being used to co-form the wrap material stack 450 and stringer laminate 400, in an alternative example, the upper forming die 254 may be omitted from the manufacturing system 100, and the bladder 300 may be used to co-form the wrap material stack 450 and stringer laminate 400.

Figure 46:
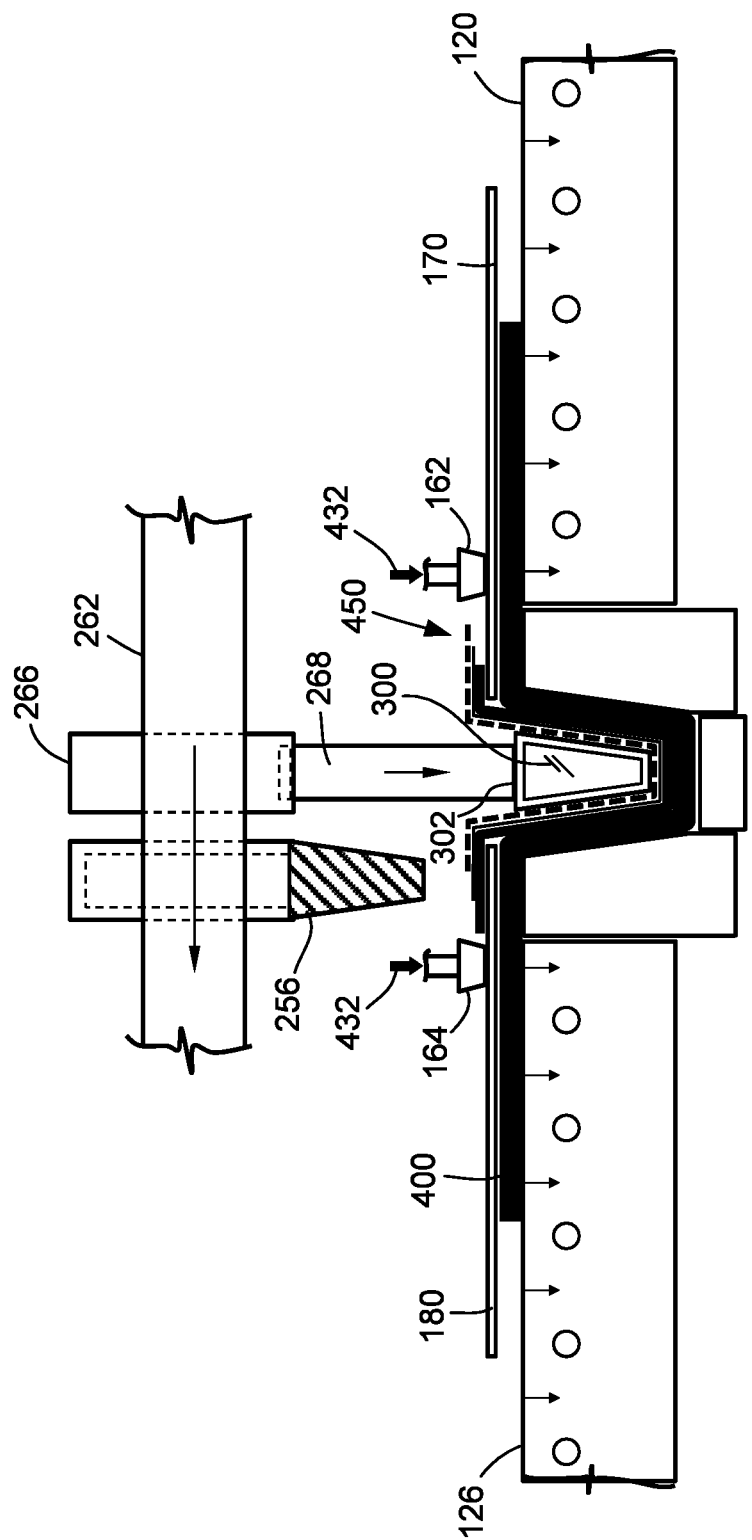
FIG. 46 is an end view of the manufacturing system showing the upper forming die removed from the wrap material stack and stringer laminate and replaced with the bladder.

Referring to FIGS. 46-47, shown is the bladder 300 replacing the upper forming die 254. The bladder 300 may be lowered into position via the bladder actuator 266. FIG. 47 shows the actuator rod 268 being detached from the bladder top side 302, leaving the bladder 300 in the cavity formed by the upper forming die 254.

Figure 49:
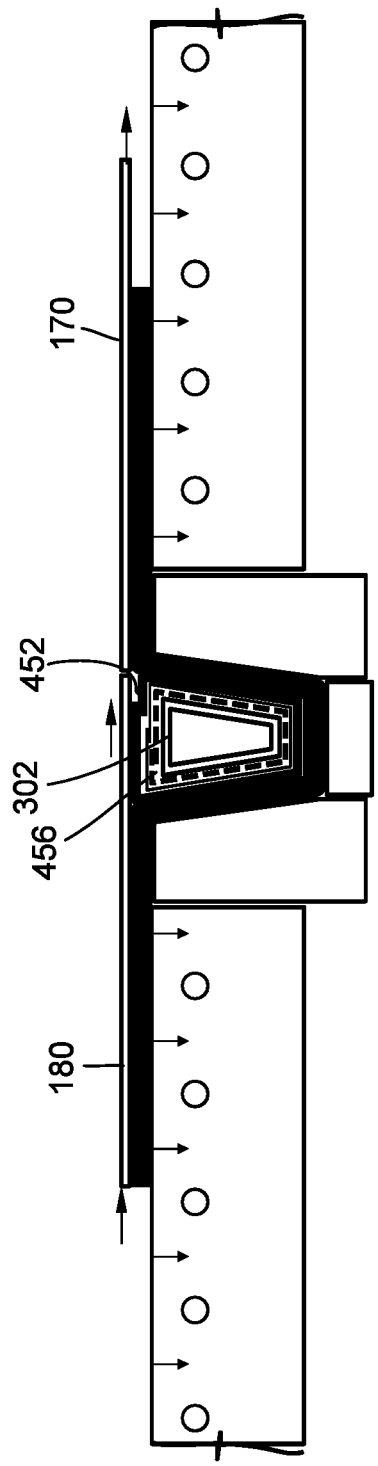
FIG. 49 is an end view of the manufacturing system showing the second wrap plate folding the second material stack base portion onto the first material stack base portion.

Referring to FIG. 48-49, step 616 of the method 600 includes folding, using the first wrap plate 170 and the second wrap plate 180, the first and second material stack base portions 452, 456 into overlapping relation with each other on the bladder top side 302 to form the stringer-wrap-bladder assembly 490. In the example shown, the first wrap plate 170 and the second wrap plate 180 translate back-and-forth over the bladder top side 302 to alternately fold the first material stack base portion 452 and second material stack base portion 456 over each other onto the bladder top side 302. Similar to the above-described example shown in FIGS. 15-16, FIGS. 48-49 shows the first wrap plate 170 being translated toward the second wrap plate 180 to fold the first material stack base portion 452 onto the bladder top side 302 (e.g., FIG. 48), after which the second wrap plate 180 is translated toward the first wrap plate 170 to fold the second material stack base portion 456 over onto the first material stack base portion 452 while the first wrap plate 170 is retracted. Alternatively, the first wrap plate 170 and the second wrap plate 180 may each have a wrap plate folding element 194 for flipping the first material stack base portion 452 and second material stack base portion 456 over on top of each other on the bladder top side 302 in a manner similar to that described above in FIGS. 21-25.

Figure 50:
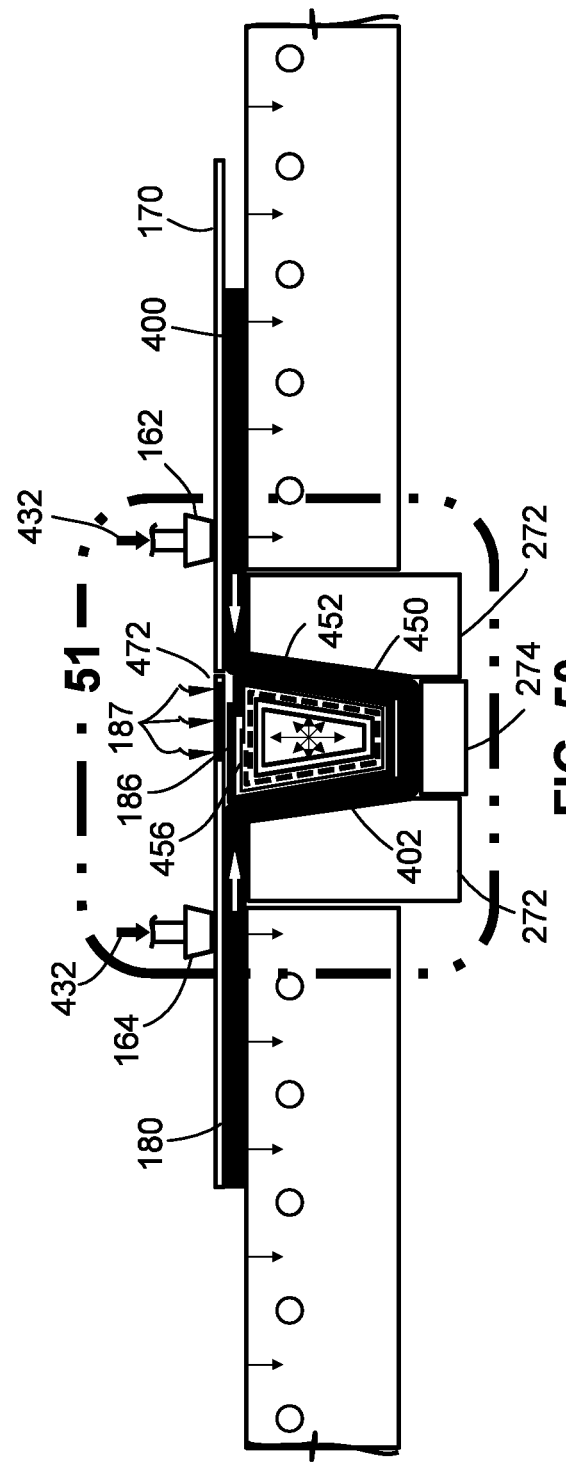
FIG. 50 is an end view of the manufacturing system showing the application of heat to the overlap of the first material stack base portion with the second material stack base portion.

Referring to FIGS. 50-51, shown is a heating device 186 that may optionally be included with the second wrap plate 180 for applying heat 187 to the overlap 474 of the second material stack base portion 456 on top of the first material stack base portion 458 to facilitate bonding of the overlapping portions of the wrap laminate 464, as described above with regard to FIGS. 17-18. The application of heat 187 may be minimized in order to avoid overly advancing the cure state of the prepreg composite plies 402 of the wrap laminate 464. FIGS. 50-51 also show the bladder 300 being internally pressurized for compacting and consolidating the wrap laminate 464 against the lower die web portions 272 and lower die cap portion 274. The second clamping bar 164 may apply clamping pressure 432 on the second wrap plate 180 to resist the internal pressurization of the bladder 300 on the bladder top side 302 as a means for consolidating the wrap material stack 450 and for improving the bond between the overlapping portions of the wrap laminate 464.

FIG. 52 shows the retraction of the first wrap plate 170 and the second wrap plate 180 to reveal the stringer-wrap-bladder assembly 490 which is supported in the lower forming die 270. FIG. 53 shows the stringer-wrap-bladder assembly 490 after removal from the manufacturing system 100. In addition to the first and second stringer flange portions 406, 408, the stringer laminate 400 also has a first stringer web portion 410 and a second stringer web portion 412 interconnected by a stringer cap portion 414, and which are respectively assembled to the first material stack web portion 458 and the second material stack web portion 460 interconnected by a material stack cap portion 462 portion, as shown in FIG. 53. FIG. 54 shows an example of a stiffened composite structure 420 produced by co-curing or co-bonding a plurality of the stringer-wrap-bladder assemblies 490 to a skin member 422. Although not shown, the co-curing or co-bonding may be performed by first vacuum bagging the assembly. During co-curing or co-bonding, the bladder 300 of each stringer-wrap-bladder assembly 490 may be internally pressurized to facilitate bonding of the wrap laminate 464 to the skin member 422. After the stiffened composite structure 420 is cured, the bladders 300 may be depressurized and removed.

Figure 58:
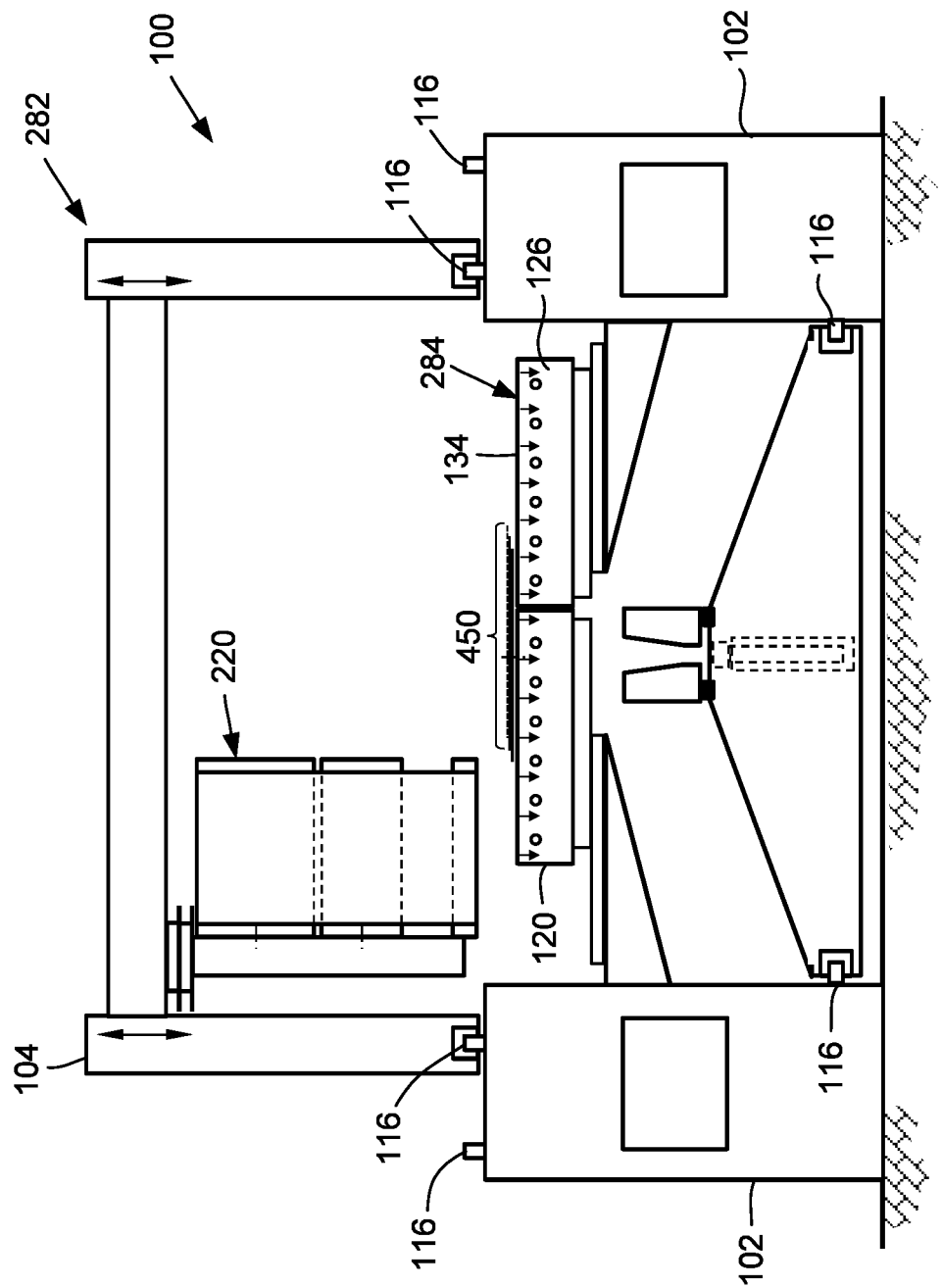
FIG. 58 is an end view of the manufacturing system of FIGS. 56-57 and illustrating a wrap material stack laid up on the first mandrel and second mandrel at the lamination station.

Referring to FIGS. 56-70, shown is an example of a manufacturing system 100 having a dedicated lamination station 282 and a dedicated forming station 286 for manufacturing a wrap-bladder assembly 480 as shown in FIG. 20. In FIGS. 56-58, the lamination station 282 and the forming station 286 are positioned in end-to-end relationship with each other. Although not shown, the manufacturing system 100 of FIGS. 56-58 may optionally include a trimming station positioned in and-to-end relationship between the lamination station 282 and the forming station 286. The lamination station 282 may be configured similar to the above-described manufacturing system 100 shown in FIGS. 1-3 with the exception that the bladder 300, the upper forming die 254, the supporting upper crossbeams 262, and the posts 252 may be omitted. If included with the manufacturing system 100, a trimming station may include a trimming device 250 similar to the above-described trimming device 250 shown in FIGS. 33-35. For example, the trimming device 250 may be supported on a gantry 104 (e.g., FIGS. 33-35) or other support means for moving the trimming device 250 along the lengthwise direction and lateral direction for trimming the wrap material stack 450 prior to forming. The forming station 286 may be configured similar to the manufacturing system 100 of FIGS. 1-3 with the exception that the lamination heads 220 and gantry 104 may be omitted.

Figure 62:
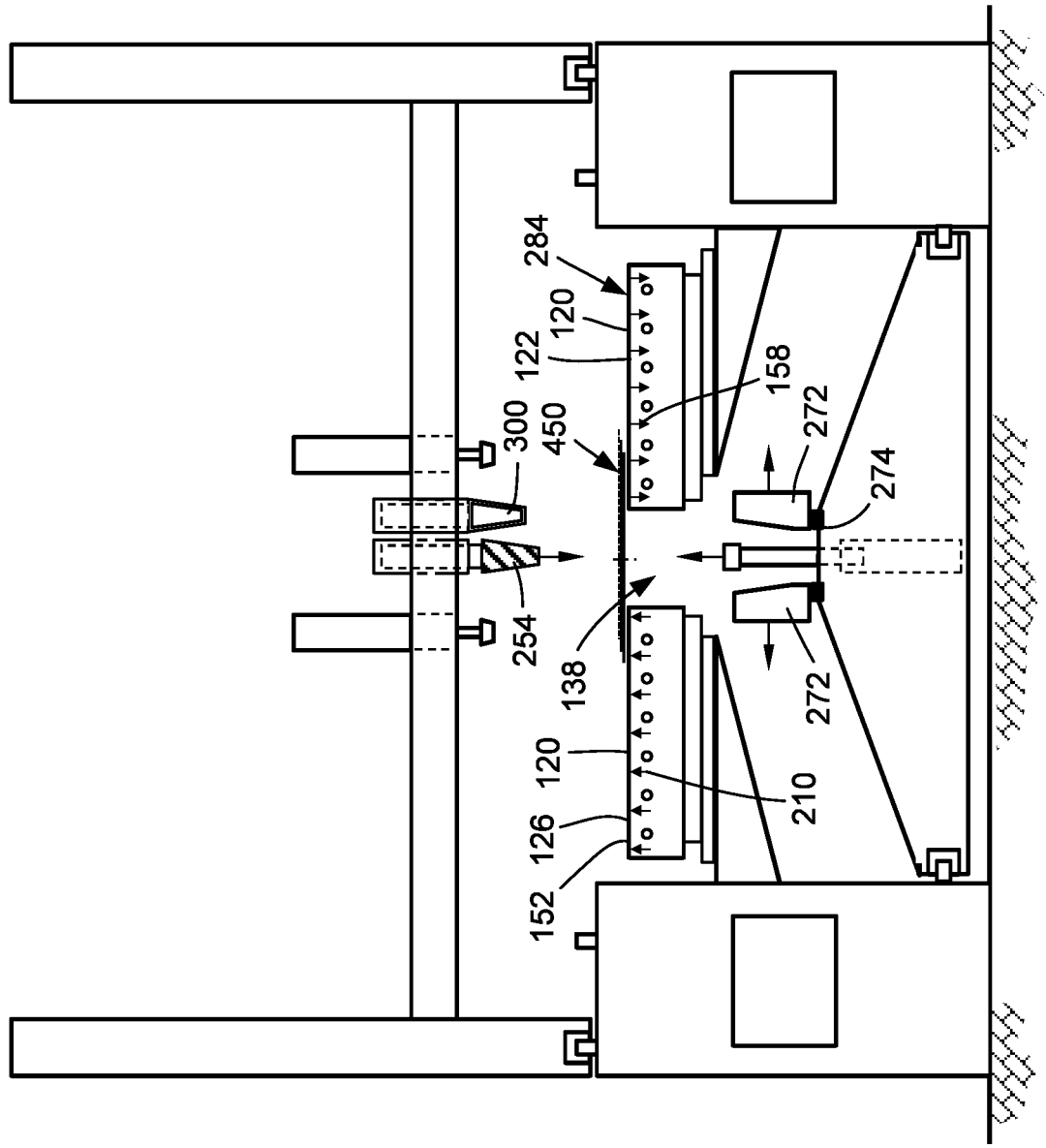
FIG. 62 is an end view of the manufacturing system showing the upper forming die and adjacently-located bladder moving into position above the wrap material stack, and further showing the lower die cap portion moving up into the mandrel gap between the first mandrel and the second mandrel.

In FIGS. 56-57, the lamination station 282 has a lamination mandrel set 284 which includes a first mandrel 120 and a second mandrel 126 positionable in side-by-side relation to form a collective mandrel surface 134 (FIG. 58) configured for laying up of the wrap material stack 450 on the collective mandrel surface 134. If included, the trimming station may have a trimming mandrel set (not shown) which may also include a first mandrel 120 and a second mandrel 126 positionable in side-by-side relation for supporting the wrap material stack 450 during trimming. The forming station 286 has a forming mandrel set 288 which also includes a first mandrel 120 and a second mandrel 126 respectively positionable below the first wrap plate 170 (FIG. 65) and the second wrap plate 180 (FIG. 65) of the forming mandrel set 288. The first mandrel 120 and second mandrel 126 of the forming mandrel set 288 are configured to translate to the mandrel open position 136 defining the mandrel gap 138 as shown in FIG. 62.

The manufacturing system 100 of FIGS. 56-70 includes an interstation transfer mechanism 290 configured to transfer the wrap material stack 450 (e.g., after layup at the lamination station 282) to the trimming station (not shown) for trimming the wrap material stack 450, and from the trimming station to the forming station 286 for forming and folding the wrap material stack 450 around the bladder 300 in the same manner as described above. The interstation transfer mechanism 290 (FIG. 57) may comprise an upper clamping member 292 and a lower clamping member 294 configured to clamp onto a portion of the wrap material stack 450. As shown in FIG. 62, the upper clamping member 292 and lower clamping member 294 may clamp onto the portion of the wrap material stack 450 spanning the mandrel gap 138 between the first mandrel 120 and the second mandrel 126 of the lamination mandrel set 284. As described below, the upper clamping member 292 and the lower clamping member 294 are configured to transfer the wrap material stack 450 from the lamination mandrel set 284 at the lamination station 282 to the trimming mandrel set (not shown) at the trimming station (not shown), and from the trimming mandrel set to the forming mandrel set 288 at the forming station 286. As shown in FIGS. 63-68, the clamping member is configured to move within the mandrel gap 138 extending along the lamination station 282, the trimming station (not shown), and the forming station 286 during the process of transferring the wrap material stack 450 from the lamination station 282 to trimming station (not shown) to the forming station 286.

In the example of FIGS. 56-70, the upper clamping member 292 may be the upper forming die 254, and the lower clamping member 294 may be the lower forming die 270. In example of FIG. 58, the posts 252 of the upper forming die 254 are movable along the gantry tracks 116 which extend along a lengthwise direction of the base members 102 between the forming station 286, the optional trimming station (not shown), and the lamination station 282. In a similar arrangement, the lower forming die 270 is configured to move along the gantry tracks 116 which extend along a lengthwise direction of the base members 102 between the forming station 286 and the lamination station 282. However, the manufacturing system 100 may be configured in an alternative arrangement having a dedicated upper clamping member 292 and dedicated lower clamping member 294 (e.g., other than the upper forming die 254 and lower forming die 270) for transferring the wrap material stack 450 from the lamination station 282 to the forming station 286.

Figure 59:
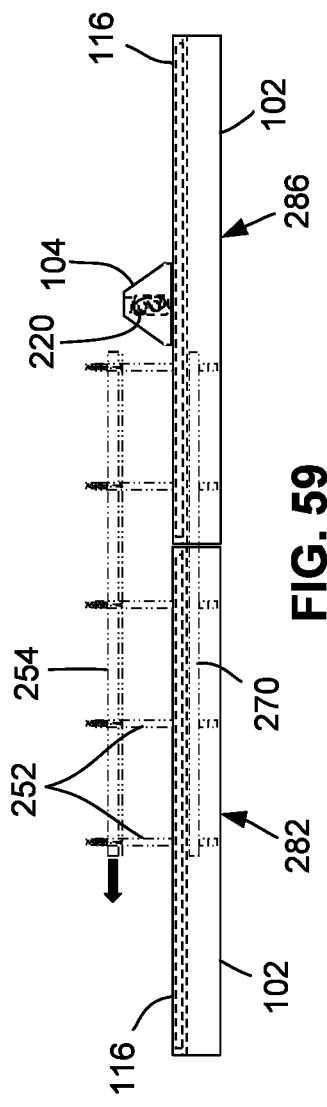
FIG. 59 is a side view of the manufacturing system showing movement of the upper forming die and lower forming die from the forming station toward the lamination station.
Figure 60:
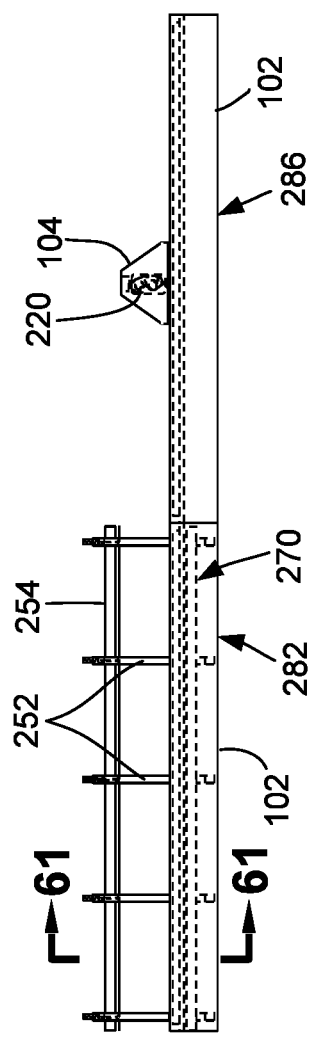
FIG. 60 is a side view of the manufacturing system showing the upper forming die and lower forming die at the lamination station and also showing the lamination head gantry temporarily moved from the lamination station to the forming station.

Referring to FIG. 58, shown is a cross-section of the manufacturing system 100 at the lamination station 282. The lamination station 282 may include one or more lamination heads 220 supported on a gantry 104 for laying up the wrap material stack 450 on the collective mandrel surface 134 in the same manner as described above. For example, the lamination station 282 may include a lamination head 220 respectively for dispensing composite material 232, release material 236, and breather material 234 in the same manner as described above and shown in FIG. 6. After the laying up of the wrap material stack 450 is complete, FIGS. 59-60 show the lamination head 220 moved along the gantry tracks 116 from the lamination station 282 to the forming station 286. Also shown is the upper forming die 254 and lower forming die 270 moving along the respective gantry tracks 116 from the forming station 286 to the lamination station 282.

Figure 61:
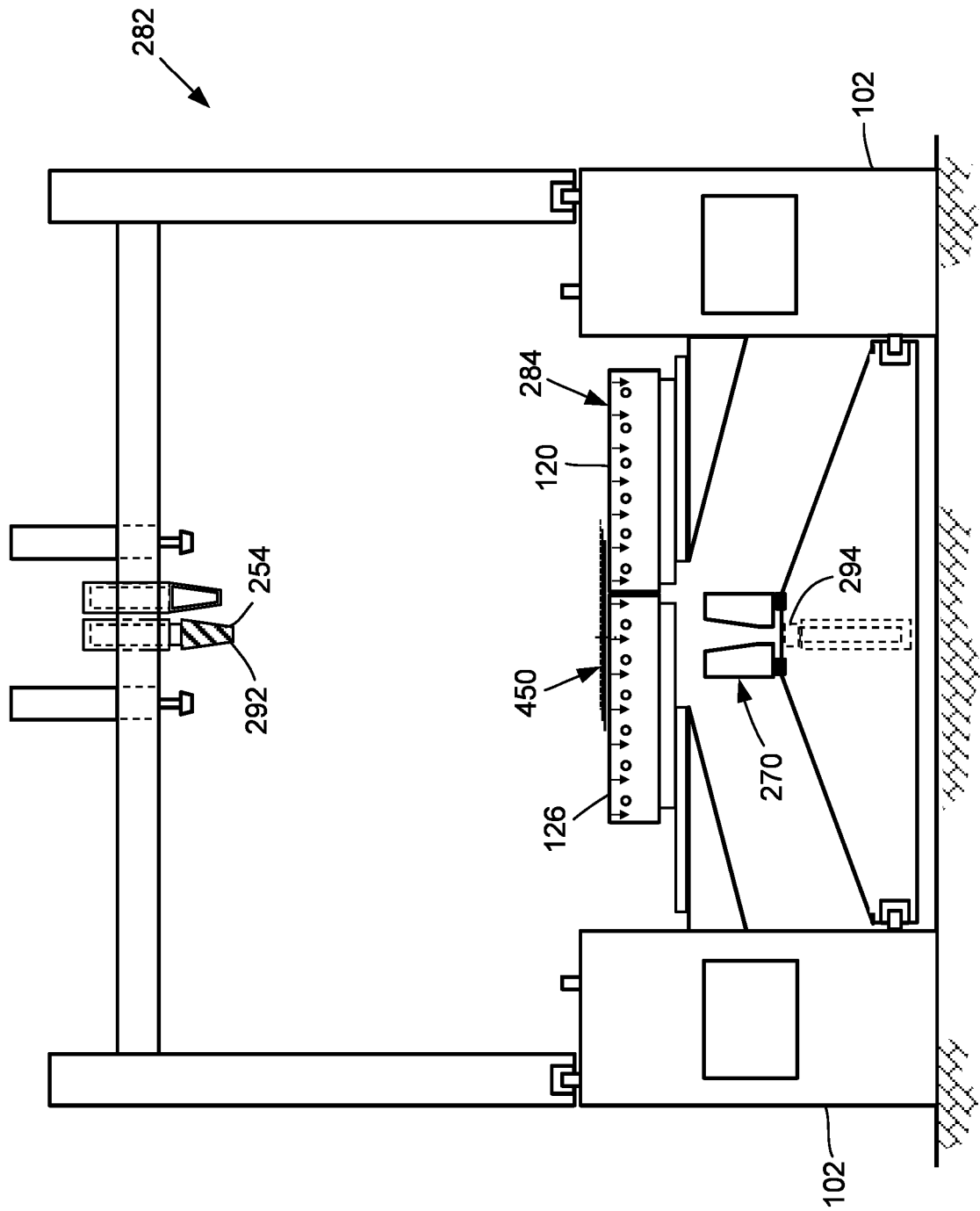
FIG. 61 is an end view of the manufacturing system showing the upper forming die and lower forming die at the lamination station and illustrating the wrap material stack supported on the first mandrel and the second mandrel.

FIG. 61 shows the upper forming die 254 and the lower forming die 270 at the lamination station 282. As shown in FIGS. 59-60, the lamination head 220 is temporarily moved out of the lamination station 282 to the forming station 286. FIG. 62 shows the upper forming die 254 and adjacently-located bladder 300 moving into position above the wrap material stack 450. The second mandrel 126 may move away from the first mandrel 120 to form the mandrel gap 138. Vacuum pressure 158 may be applied on the apertures 152 of the first mandrel surface 122 to secure the wrap laminate 464 in position on the first mandrel 120 while the second mandrel 126 translates away from the first mandrel 120. Also shown in FIG. 62 is the lower die web portions 272 moving away from each other to allow the lower die cap portion 274 to move upwardly into the mandrel gap 138 between the first mandrel 120 and the second mandrel 126.

Figure 63:
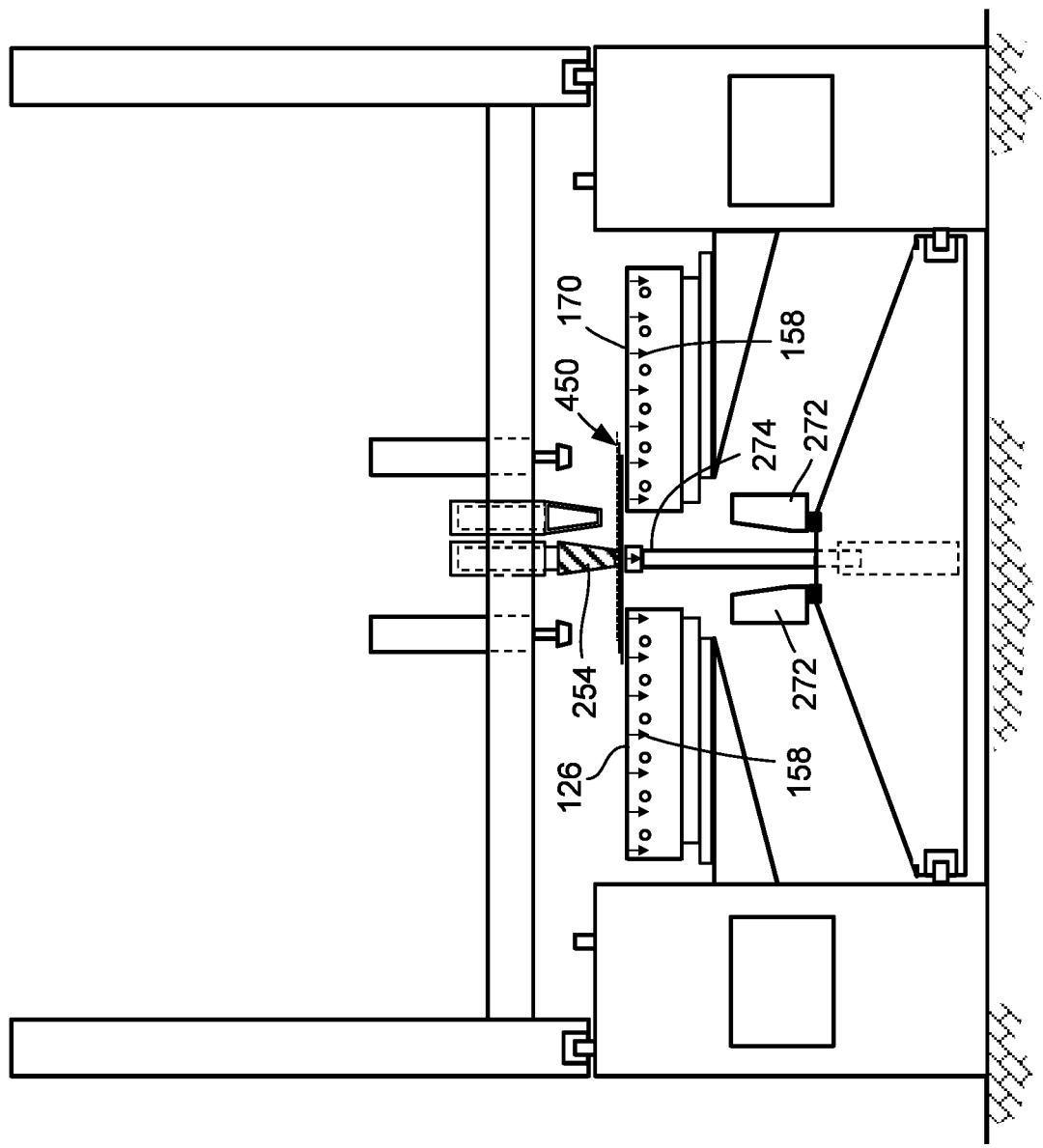
FIG. 63 is an end view of the manufacturing system showing the wrap material stack clamped between the upper forming die and the lower die cap portion.

FIG. 63 shows the wrap material stack 450 clamped between the upper forming die 254 and the lower die cap portion 274. As an alternative to both the upper forming die 254 and lower forming die 270 clamping the wrap material stack 450, the manufacturing system 100 may be configured such that either the lower forming die 270 or the upper forming die 254 includes apertures 152 coupled to a vacuum pressure source 156 for generating vacuum pressure 158 for vacuum coupling to wrap laminate 464 without clamping between the upper forming die 254 and lower forming die 270. In some examples, vacuum pressure 158 may be applied to the upper forming die 254 and/or to the lower forming die 270 to fixedly secure the wrap laminate 464 to the upper forming die 254 or lower forming die 270.

Figure 64:
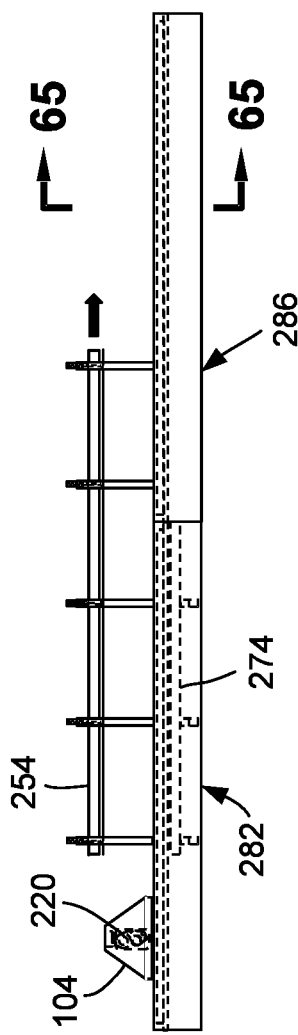
FIG. 64 is a side view of the manufacturing system showing the upper forming die and lower die cap portion transferring the wrap material stack from the lamination station toward the forming station and also showing the lamination head gantry moved back to the lamination station.

FIG. 64 shows the upper forming die 254 and lower forming die 270 transferring the wrap material stack 450 from the lamination station 282 toward the forming station 286. Also shown is the lamination head 220 gantry 104 moved back to the lamination station 282. As mentioned above, although a trimming station is not shown, the upper forming die 254 and lower forming die 270 may be configured to transfer the wrap material stack 450 from the lamination station 282 to the trimming station for trimming prior to transferring the wrap material stack 450 from the trimming station to the forming station 286.

Figure 65:
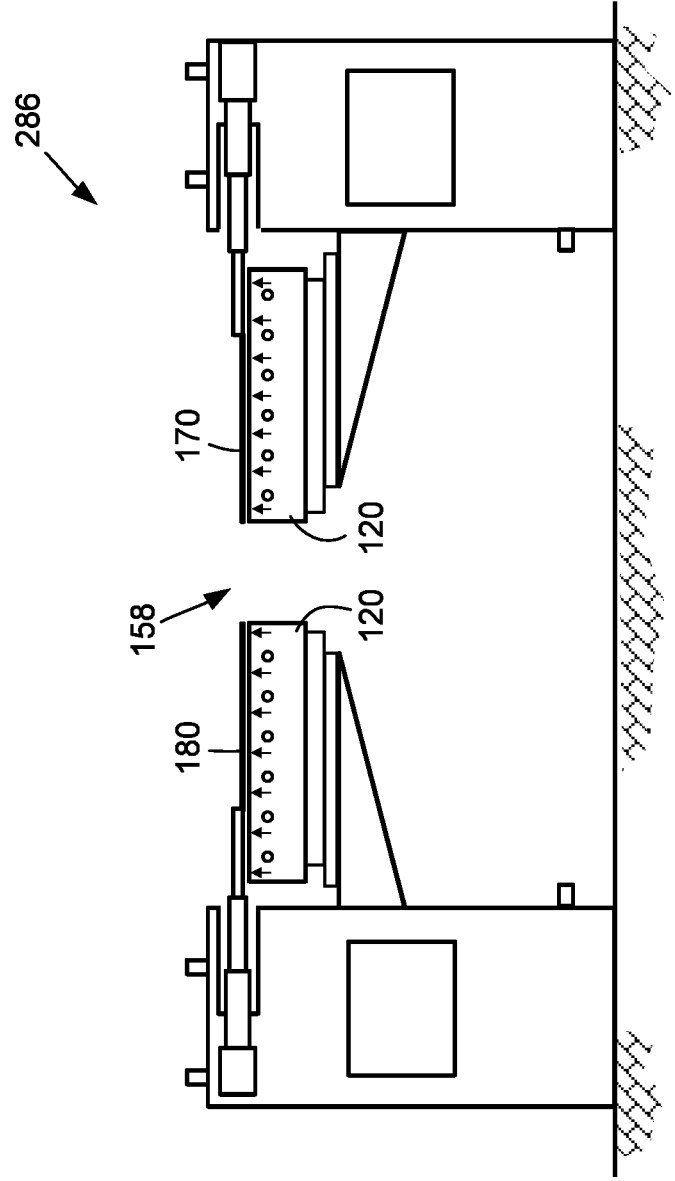
FIG. 65 is an end view of the manufacturing system showing the forming station prior to receiving the wrap material stack and showing the first and second wrap plate and the first and second mandrel moved away from each other in preparation for receiving the wrap material stack.

FIG. 65 is a sectional view of the forming station 286 prior to receiving the wrap material stack 450. The first wrap plate 170 and second wrap plate 180 are moved away from each other as are the first mandrel 120 and second mandrel 126 to allow the upper forming die 254 and lower forming die 270 to move along the mandrel gap 138 at the lamination station 282 and forming station 286 during the transferring of the wrap material stack 450. The first wrap plate 170 covers the first mandrel surface 122 and the second wrap plate 180 covers the second mandrel surface 128.

Figure 66:
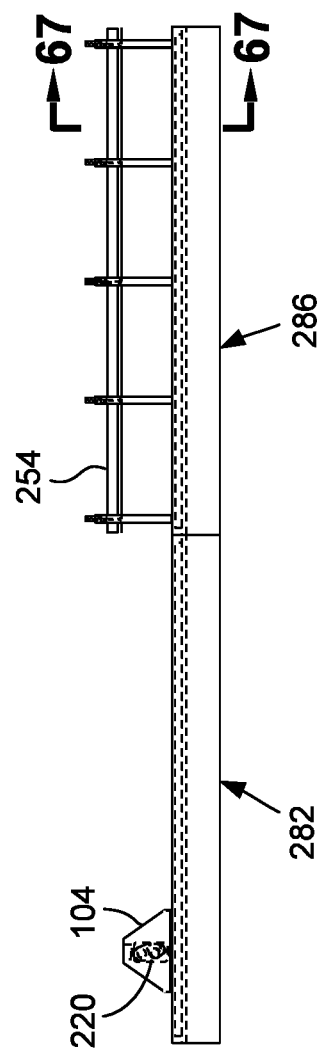
FIG. 66 is a side view of the manufacturing system showing the upper forming die and lower forming die at the forming station after the completion of the transfer of the wrap material stack from the lamination station to the forming station.
Figure 67:
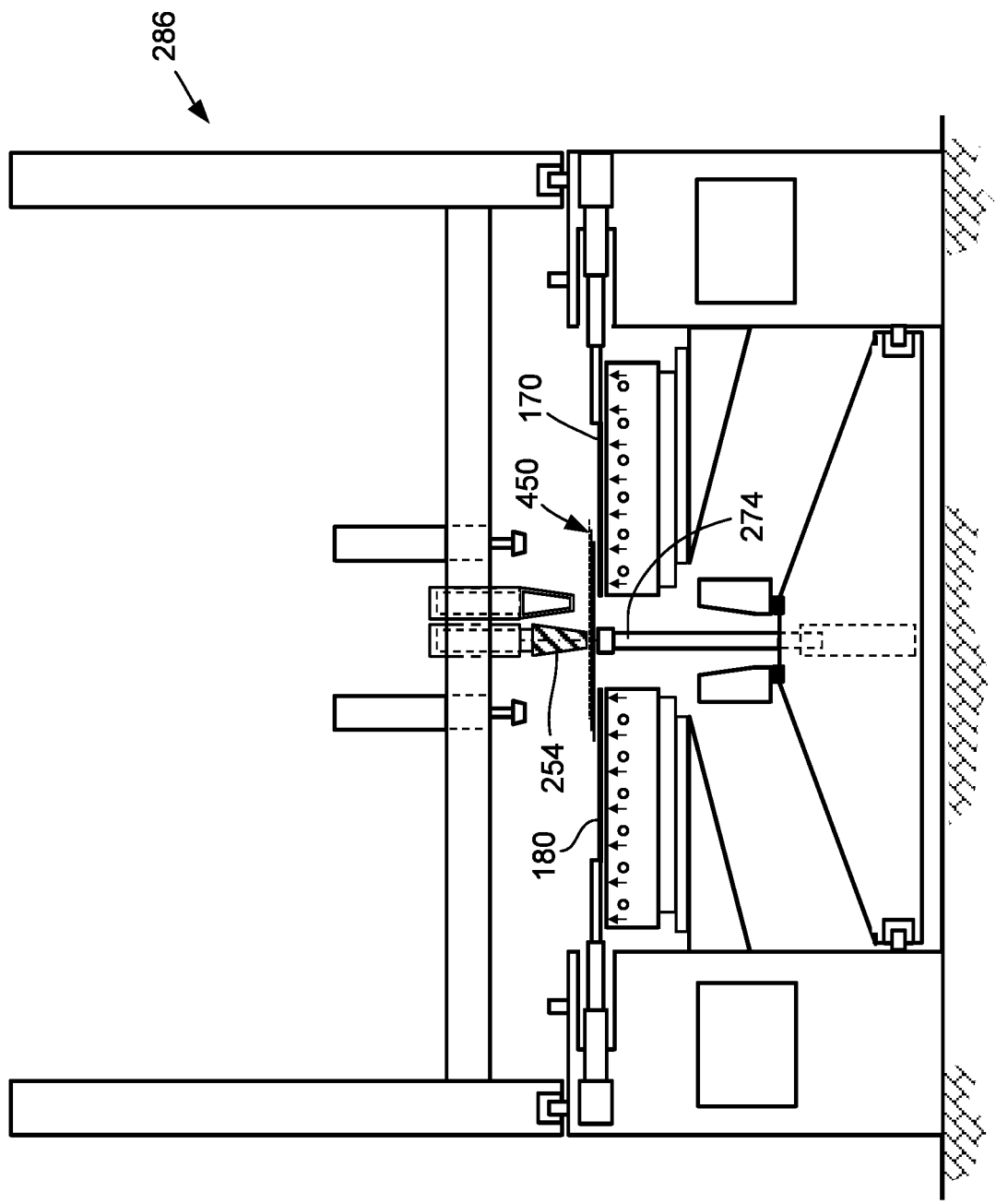
FIG. 67 is an end view of the manufacturing system showing the upper forming die and lower die cap portion releasing the wrap material stack on top of the first wrap plate and second wrap plate.
Figure 68:
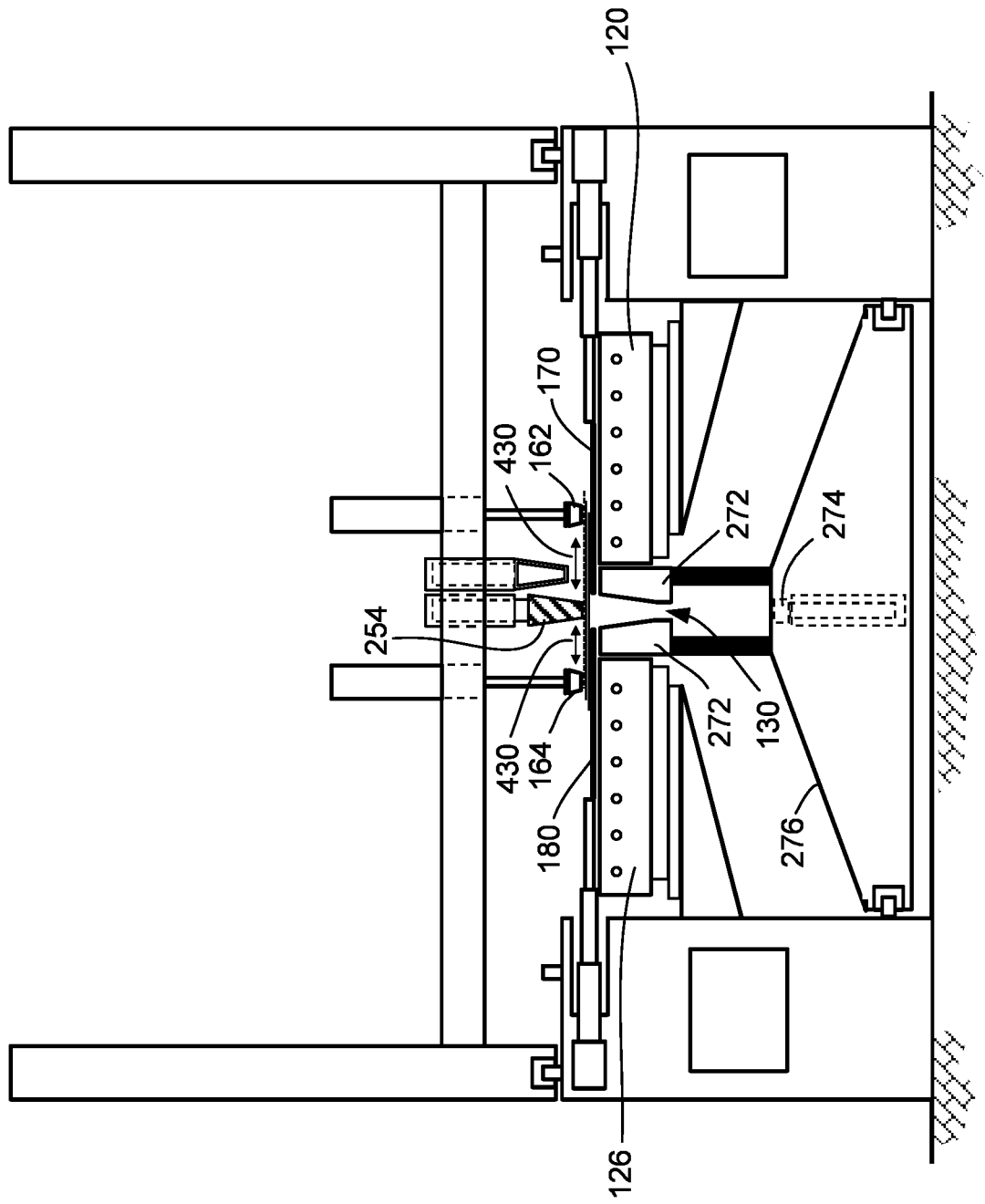
FIG. 68 is an end view of the manufacturing system showing upper forming die and lower die web portions moved in position at the initiation of forming of the wrap material stack.

FIG. 66 shows the upper forming die 254 and lower forming die 270 at the forming station 286 after the completion of the transfer of the wrap material stack 450. FIG. 67 is a sectional view of the forming station 286 showing the upper forming die 254 and lower die cap portion 274 prior to releasing the wrap material stack 450 on to the first wrap plate 170 and second wrap plate 180. FIG. 68 shows the lower die cap portion 274 retracted into the lower crossbeam 276. Also shown are the lower die web portions 272 translated upwardly into the mandrel gap 138 between the first mandrel 120 and second mandrel 126. The first clamping bar 162 and the second clamping bar 164 are shown applying clamping pressure 432 on the wrap material stack 450 for generating lateral tension 430 in the wrap material stack 450 as the upper forming die 254 urges the wrap material stack 450 through the wrap plate gap 198 and the mandrel gap 138

FIG. 69 shows the upper die cap portion 256 translated upwardly between the lower die web portions 272. The upper forming die 254 is shown compacting the wrap material stack 450 against the lower die web portions 272 and the lower die cap portion 274 and forming the wrap material stack 450 into the desired cross-sectional contour in a manner similar to that described above with regard to FIGS. 10-12. The upper forming die 254 may be removed and replaced with the bladder 300 in a manner similar to that described above in FIGS. 13-14. Although not shown, the first wrap plate 170 and the second wrap plate 180 may be actuated in a manner to fold the first material stack base portion 452 and second material stack base portion 456 into overlapping relation with each other on the bladder top side 302 in the same above-described manner shown in FIGS. 15-16 or FIGS. 21-25. FIG. 70 is an end view of the manufacturing system 100 after completion of the forming of the wrap material stack 450 around the bladder 300 to form the wrap-bladder assembly 480.

For the manufacturing system 100 configured as shown in FIGS. 56-70, in the above-described method 500 of manufacturing the wrap-bladder assembly 480, the laying up of the wrap material stack 450 may comprise laying up the wrap material stack 450 onto the collective mandrel surface 134 defined by the first mandrel 120 and the second mandrel 126 of the lamination mandrel set 284 at the lamination station 282. Step 502 of receiving the wrap material stack 450 on the first wrap plate surface 172 and the second wrap plate surface 182 may comprise transferring the wrap material stack 450 from the collective mandrel surface 134 at the lamination station 282 to the first wrap plate surface 172 and the second wrap plate surface 182 located above the first mandrel 120 and the second mandrel 126 of the forming mandrel set 288 at the forming station 286 as shown in FIGS. 64-67. The transferring of the wrap material stack 450 from the lamination station 282 to the forming station 286 may comprise translating the second mandrel 126 of the forming mandrel set 288 to the mandrel open position 136 defining the mandrel gap 138 at the lamination station 282 as shown in FIGS. 61-62. Step 502 may additionally include clamping, using an upper clamping member 292 (e.g., the upper forming die 254) and a lower clamping member 294 (e.g., the lower die cap portion 274), a portion of the wrap material stack 450 spanning the mandrel gap 138 at the lamination station 282 as shown in FIG. 63. Step 502 may also include moving the lower clamping member 294 along the mandrel gap 138 at the lamination station 282 and along a mandrel gap 138 at the forming station 286 during the transfer of the wrap material stack 450 as shown in FIG. 64-67.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A manufacturing system for manufacturing a composite assembly, comprising:
- at least one first mandrel having a first mandrel surface and a first mandrel surface edge;
- at least one second mandrel having a second mandrel surface and a second mandrel surface edge;
- a first wrap plate positionable above the first mandrel surface and having a first wrap plate surface and a first wrap plate surface edge;
- a second wrap plate positionable above the second mandrel surface and having a second wrap plate surface and a second wrap plate surface edge;
- one or more pinch mechanisms;
- wherein:
  - the first wrap plate and the second wrap plate are positionable in parallel side-by-side relation for receiving a wrap material stack having opposing first and second material stack base portions;
  - at least one of the first wrap plate and the second wrap plate is configured to translate to a wrap plate open position defining a wrap plate gap between the first wrap plate surface edge and the second wrap plate surface edge for receiving a bladder having a bladder top side;
  - the second mandrel is configured to translate to a mandrel open position defining a mandrel gap between the first mandrel surface edge and the second mandrel surface edge, the wrap plate gap and the mandrel gap is configured to receive the wrap material stack formed around the bladder;
  - the first wrap plate and the second wrap plate are configured to fold the first and second material stack base portions into overlapping relation with each other onto the bladder top side; and
  - the one or more pinch mechanisms are configured to mechanically clamp the wrap material stack against at least one of the first wrap plate and the second wrap plate during translation of at least one of the first wrap plate and the second wrap plate to the wrap plate open position.

2. The manufacturing system of claim 1, further comprising:
- one or more lamination heads supportable above the first wrap plate and the second wrap plate;
- the first wrap plate and the second wrap plate configured to translate to a wrap plate closed position in which the first wrap plate surface edge and the second wrap plate surface edge are in side-by-side abutting contact with each other and forming a collective wrap plate surface defined by the first wrap plate surface and the second wrap plate surface; and
- the one or more lamination heads configured to dispense one or more materials in stacked formation on the collective wrap plate surface to lay up the wrap material stack.

3. The manufacturing system of claim 1, wherein:
- at least one of the first wrap plate and the second wrap plate has a heating device located proximate respectively the first wrap plate surface edge and the second wrap plate surface edge and configured to apply heat to at least one of the first and second material stack base portions overlapped on the bladder top side for bonding together the first and second material stack base portions.

4. The manufacturing system of claim 1, further comprising:
- a lower forming die receivable within the mandrel gap and configured to support the wrap material stack against compaction pressure applied to the wrap material stack by the bladder.

5. The manufacturing system of claim 1, further comprising:
- an upper forming die configured to downwardly translate into contact with the wrap material stack and urge the wrap material stack into the wrap plate gap and form the wrap material stack prior to removal and replacement of the upper forming die with the bladder.

6. The manufacturing system of claim 1, wherein the at least one first mandrel comprises a first lamination mandrel and a first forming mandrel, and the at least one second mandrel comprises a second lamination mandrel and a second forming mandrel, the manufacturing system comprising:
- a lamination station having a lamination mandrel set including the first lamination mandrel and the second lamination mandrel, positionable in side-by-side relation to form a collective mandrel surface configured for laying up of the wrap material stack on the collective mandrel surface;
- a forming station having a forming mandrel set including the first forming mandrel and the second forming mandrel, positionable below the first wrap plate and the second wrap plate, the second forming mandrel of the forming mandrel set configured to translate to the mandrel open position defining the mandrel gap; and
- an interstation transfer mechanism configured to transfer the wrap material stack from the lamination station to the forming station for forming and folding the wrap material stack around the bladder.

7. The manufacturing system of claim 6, wherein the interstation transfer mechanism comprises:
- an upper clamping member and a lower clamping member configured to clamp onto a portion of the wrap material stack spanning the mandrel gap between the first lamination mandrel and the second lamination mandrel of the lamination mandrel set;
- the upper clamping member and the lower clamping member configured to transfer the wrap material stack from the lamination mandrel set at the lamination station to the forming mandrel set at the forming station; and
- the lower clamping member configured to move within the mandrel gap at the lamination station and at the forming station during the transfer of the wrap material stack.

8. The manufacturing system of claim 1, wherein:
- the at least one first mandrel and the at least one second mandrel are positionable in a mandrel closed position in which the first mandrel surface edge and the second mandrel surface edge are in side-by-side abutting contact to form a collective mandrel surface defined by the first mandrel surface and the second mandrel surface; and
- the collective mandrel surface configured to receive a stringer laminate prior to the first wrap plate surface and the second wrap plate surface receiving the wrap material stack, the stringer laminate having opposing first and second stringer flange portions.

9. The manufacturing system of claim 8, further comprising:
at least one lamination head supportable above the at least one first mandrel and the at least one second mandrel;
the first wrap plate and the second wrap plate configured to translate away from each other and expose the collective mandrel surface; and
the lamination head configured to lay up one or more composite plies of the stringer laminate on the collective mandrel surface prior to the first wrap plate surface and the second wrap plate surface translating into close proximity to each other for receiving the wrap material stack.

10. A method of manufacturing a composite assembly, comprising:
receiving a wrap material stack on a first wrap plate surface and a second wrap plate surface respectively of a first wrap plate and a second wrap plate in side-by-side relation and located above a first mandrel and a second mandrel, the wrap material stack having opposing first and second material stack base portions;
translating at least one of the first wrap plate and the second wrap plate to a wrap plate open position defining a wrap plate gap between a first wrap plate surface edge and a second wrap plate surface edge;
translating the second mandrel to a mandrel open position defining a mandrel gap between a first mandrel surface edge and a second mandrel surface edge;
urging, using one of an upper forming die and a bladder, the wrap material stack at least partially into the wrap plate gap and the mandrel gap;
forming the wrap material stack in response to urging the wrap material stack at least partially into the wrap plate gap and the mandrel gap; and
folding, using the first wrap plate and the second wrap plate, the first and second material stack base portions into overlapping relation with each other onto a bladder top side to form a wrap-bladder assembly.

11. The method of claim 10, wherein folding the first and second material stack base portions using the first wrap plate and the second wrap plate comprises at least one of:
translating the first wrap plate and the second wrap plate back-and-forth over the bladder top side; and
rotating at least a portion of at least one of the first wrap plate and the second wrap plate about a pivot axis located respectively proximate the first wrap plate surface edge and the second wrap plate surface edge.

12. The method of claim 10, wherein receiving the wrap material stack on the first wrap plate surface and the second wrap plate surface comprises:
translating the first wrap plate and the second wrap plate to a wrap plate closed position in which the first wrap plate surface edge and the second wrap plate surface edge are in side-by-side abutting contact with each other and forming a collective wrap plate surface defined by the first wrap plate surface and the second wrap plate surface; and
dispensing, from one or more lamination heads, one or more materials in stacked formation on the collective wrap plate surface to lay up the wrap material stack.

13. The method of claim 10, further comprising:
receiving a lower forming die within the mandrel gap between the first mandrel and the second mandrel in the mandrel open position; and
supporting the wrap material stack against compaction pressure applied to the wrap material stack by at least one of the upper forming die and the bladder.

14. The method of claim 13, further comprising:
translating the upper forming die downwardly into contact with the wrap material stack;
urging, using the upper forming die, the wrap material stack into the wrap plate gap and mandrel gap and against the lower forming die to at least partially form the wrap material stack;
removing the upper forming die from the wrap material stack inside the lower forming die; and
installing the bladder into the wrap material stack inside the lower forming die.

15. The method of claim 13, wherein the first mandrel and the second mandrel respectively comprise a first lamination mandrel and a second lamination mandrel, the method further comprising:
laying up the wrap material stack onto a collective mandrel surface defined by flail the first lamination mandrel and flail the second lamination mandrel of a lamination mandrel set at a lamination station; and
wherein the step of receiving the wrap material stack on the first wrap plate surface and the second wrap plate surface comprises transferring the wrap material stack from the collective mandrel surface at the lamination station to the first wrap plate surface and the second wrap plate surface located above a first forming mandrel and a second forming mandrel of a forming mandrel set at a forming station.

16. The method of claim 15, wherein the step of transferring the wrap material stack from the lamination station to the forming station comprises:
translating the second mandrel of the forming mandrel set to the mandrel open position defining the mandrel gap at the lamination station;
clamping, using an upper clamping member and a lower clamping member, a portion of the wrap material stack spanning the mandrel gap at the lamination station; and
moving the lower clamping member along the mandrel gap at the lamination station and along a mandrel gap at the forming station during the transfer of the wrap material stack.

17. A method of manufacturing a composite assembly, comprising:
receiving a stringer laminate on a collective mandrel surface defined by a first mandrel surface and a second mandrel surface respectively of a first mandrel and a second mandrel, the stringer laminate having one or more uncured composite plies and having opposing first and second stringer flange portions;
positioning a first wrap plate and a second wrap plate in parallel side-by-side relation to each other above the stringer laminate;
receiving a wrap material stack on a first wrap plate surface and a second wrap plate surface respectively of a first wrap plate and a second wrap plate, the wrap material stack having opposing first and second material stack base portions;
translating at least one of the first wrap plate and the second wrap plate to a wrap plate open position defining a wrap plate gap between a first wrap plate surface edge and a second wrap plate surface edge;
translating the second mandrel to a mandrel open position defining a mandrel gap between a first mandrel surface edge and a second mandrel surface edge;
urging, using one of an upper forming die and a bladder, the wrap material stack and the stringer laminate at least partially into the wrap plate gap and the mandrel gap;

co-forming the wrap material stack and the stringer laminate in response to urging the wrap material stack and the stringer laminate at least partially into the wrap plate gap and the mandrel gap; and folding, using the first wrap plate and the second wrap plate, the first and second material stack base portions into overlapping relation with each other on a bladder top side to form a wrap-bladder assembly.

18. The method of claim 17, wherein receiving the stringer laminate on the collective mandrel surface comprises:

dispensing, from a lamination head, a composite material onto the collective mandrel surface to lay up the one or more composite plies of the stringer laminate.

19. The method of claim 17, wherein receiving the wrap material stack on the first wrap plate surface and the second wrap plate surface comprises:

dispensing, from one or more lamination heads, one or more materials in stacked formation on the first wrap plate surface and the second wrap plate surface to lay up the wrap material stack.

20. The method of claim 17, further comprising:

moving a lower forming die into the mandrel gap between the first mandrel and the second mandrel prior to urging, using the bladder or the upper forming die, the wrap material stack and the stringer laminate at least partially into the wrap plate gap and the mandrel gap; and supporting, using the lower forming die, the wrap material stack and the stringer laminate against forming pressure applied by the bladder or the upper forming die.

* * * * *